United States Patent
Valli et al.

(10) Patent No.: US 12,407,806 B2
(45) Date of Patent: Sep. 2, 2025

(54) METHOD AND SYSTEM FOR NEAR-EYE FOCAL PLANE OVERLAYS FOR 3D PERCEPTION OF CONTENT ON 2D DISPLAYS

(71) Applicant: InterDigital VC Holdings, Inc., Wilmington, DE (US)

(72) Inventors: Seppo T. Valli, Espoo (FI); Pekka K. Siltanen, Helsinki (FI); Louis Kerofsky, San Diego, CA (US); Ralph Neff, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/738,979

(22) Filed: Jun. 10, 2024

(65) Prior Publication Data
US 2024/0333907 A1    Oct. 3, 2024

Related U.S. Application Data

(63) Continuation of application No. 18/197,591, filed on May 15, 2023, now Pat. No. 12,047,552, which is a
(Continued)

(51) Int. Cl.
*G02B 27/00* (2006.01)
*G02B 27/01* (2006.01)
(Continued)

(52) U.S. Cl.
CPC ....... *H04N 13/344* (2018.05); *G02B 27/0172* (2013.01); *G02B 30/52* (2020.01);
(Continued)

(58) Field of Classification Search
CPC .. H04N 13/344; H04N 13/139; H04N 13/395; H04N 13/398; G02B 27/0172;
(Continued)

(56) References Cited

U.S. PATENT DOCUMENTS 5,793,985 A * 8/1998 Natarajan ............. H04N 19/51
375/240.18
7,116,324 B2  10/2006 Kaye
(Continued)

FOREIGN PATENT DOCUMENTS

CA       2950429 A1   12/2015
CN     102611909 A    7/2012
(Continued)

OTHER PUBLICATIONS

Huang, F. C. et al., "The Light Field Stereoscope—Immersive Computer Graphics via Factored Near-Eye Light Field Displays with Focus Cues" SIGGRAPH emerging technologies, 2015 (12 pages).
(Continued)

*Primary Examiner* — Frank F Huang
(74) *Attorney, Agent, or Firm* — Klintworth & Rozenblat LLP

(57) ABSTRACT

Some embodiments of a method may include: identifying two-dimensional (2D) content present in an image of a real-world scene; retrieving metadata comprising depth information associated with the 2D content; generating a plurality of focal plane images using the metadata, the plurality of focal plane images comprising depth cues for the 2D content; and displaying the plurality of focal plane images as a see-through overlay synchronized with the 2D content.

18 Claims, 25 Drawing Sheets

Related U.S. Application Data continuation of application No. 17/256,983, filed as application No. PCT/US2019/040187 on Jul. 1, 2019, now Pat. No. 11,689,709.

(60) Provisional application No. 62/694,343, filed on Jul. 5, 2018.

(51) Int. Cl.

| | | |
|---|---|---|
| *G02B 30/52* | (2020.01) | |
| *H04N 13/139* | (2018.01) | |
| *H04N 13/344* | (2018.01) | |
| *H04N 13/395* | (2018.01) | |
| *H04N 13/398* | (2018.01) | |

(52) U.S. Cl.
CPC ......... *H04N 13/139* (2018.05); *H04N 13/395* (2018.05); *H04N 13/398* (2018.05); *G02B 2027/0127* (2013.01); *G02B 2027/0134* (2013.01); *G02B 2027/0138* (2013.01); *G02B 2027/014* (2013.01)

(58) Field of Classification Search
CPC ............ G02B 30/52; G02B 2027/0127; G02B 2027/0134; G02B 2027/0138; G02B 2027/014; G02B 27/017
See application file for complete search history.

(56) References Cited

U.S. PATENT DOCUMENTS

| | | | |
|---|---|---|---|
| 8,120,547 B2 | 2/2012 | Seymour | |
| 8,432,434 B2 | 4/2013 | Veeraraghavan | |
| 8,576,276 B2 | 11/2013 | Bar-Zeev | |
| 8,717,423 B2 | 5/2014 | Vesely | |
| 8,730,354 B2* | 5/2014 | Stafford ........... | H04N 21/41407 348/239 |
| 8,885,025 B2 | 11/2014 | Iwabuchi | |
| 9,030,749 B2 | 5/2015 | Lescure | |
| 9,035,943 B1 | 5/2015 | Han | |
| 9,077,986 B2 | 7/2015 | Singh | |
| 9,213,405 B2 | 12/2015 | Perez | |
| 9,223,138 B2 | 12/2015 | Bohn | |
| 9,362,994 B2 | 6/2016 | Seol | |
| 9,407,904 B2 | 8/2016 | Sandrew | |
| 9,437,038 B1 | 9/2016 | Costello | |
| 9,547,174 B2 | 1/2017 | Gao | |
| 9,667,327 B2 | 5/2017 | Lee | |
| 9,804,395 B2 | 10/2017 | Wu | |
| 10,901,291 B1 | 1/2021 | Sulai | |
| 11,689,709 B2* | 6/2023 | Valli ................... | G02B 27/017 348/51 |
| 2001/0028516 A1 | 10/2001 | Noguchi | |
| 2002/0113752 A1 | 8/2002 | Sullivan | |
| 2005/0190180 A1 | 9/2005 | Jin | |
| 2006/0007301 A1 | 1/2006 | Cho | |
| 2006/0088211 A1* | 4/2006 | Kusakabe ................. | G06T 5/70 382/167 |
| 2007/0183675 A1* | 8/2007 | Morohashi ............. | H04N 19/80 375/E7.19 |
| 2008/0123738 A1* | 5/2008 | Katsavounidis ..... | H04N 19/142 375/E7.17 |
| 2008/0252556 A1 | 10/2008 | Tseng | |
| 2009/0003714 A1* | 1/2009 | Subramaniam ...... | H04N 19/184 375/E7.184 |
| 2009/0034616 A1* | 2/2009 | Abe ..................... | H04N 19/159 382/233 |
| 2009/0125291 A1* | 5/2009 | Mohandas ................ | G06T 7/00 703/13 |
| 2009/0245688 A1 | 10/2009 | Robinson | |
| 2010/0034480 A1* | 2/2010 | Rao ........................... | G06T 5/70 382/261 |
| 2010/0128145 A1 | 5/2010 | Pitts | |
| 2010/0238366 A1 | 9/2010 | Chang | |
| 2011/0075257 A1 | 3/2011 | Hua | |
| 2011/0273466 A1 | 11/2011 | Imai | |
| 2011/0316981 A1 | 12/2011 | Iwabuchi | |
| 2012/0084652 A1 | 4/2012 | Martinez Bauza | |
| 2012/0120192 A1 | 5/2012 | Alregib | |
| 2012/0127062 A1 | 5/2012 | Bar-Zeev | |
| 2012/0127284 A1 | 5/2012 | Bar-Zeev | |
| 2012/0128244 A1* | 5/2012 | Singh ........................ | G06T 5/70 382/167 |
| 2012/0200676 A1 | 8/2012 | Huitema | |
| 2012/0307108 A1 | 12/2012 | Forutanpour | |
| 2013/0050432 A1 | 2/2013 | Perez | |
| 2013/0113984 A1 | 5/2013 | Shimamoto | |
| 2013/0183021 A1* | 7/2013 | Osman ................. | G07F 17/3216 386/239 |
| 2014/0118509 A1 | 5/2014 | Kroon | |
| 2014/0132724 A1 | 5/2014 | Choi | |
| 2014/0192281 A1* | 7/2014 | Smithwick ............. | G02B 30/52 345/426 |
| 2014/0267852 A1 | 9/2014 | Bluzer | |
| 2014/0292812 A1 | 10/2014 | Fink | |
| 2014/0307952 A1 | 10/2014 | Sweeney | |
| 2014/0355707 A1 | 12/2014 | Kim | |
| 2015/0062370 A1 | 3/2015 | Shroff | |
| 2015/0098126 A1 | 4/2015 | Keller | |
| 2015/0145977 A1 | 5/2015 | Hoffman | |
| 2015/0153559 A1 | 6/2015 | Sato | |
| 2015/0205135 A1 | 7/2015 | Border | |
| 2015/0222884 A1 | 8/2015 | Cheng | |
| 2015/0235467 A1 | 8/2015 | Schowengerdt | |
| 2015/0243102 A1 | 8/2015 | Schowengerdt | |
| 2015/0254905 A1 | 9/2015 | Ramsby | |
| 2015/0277121 A1* | 10/2015 | Fridental ............... | H04N 13/322 348/54 |
| 2015/0331237 A1 | 11/2015 | Itani | |
| 2015/0341093 A1 | 11/2015 | Ji | |
| 2015/0346495 A1 | 12/2015 | Welch | |
| 2016/0014350 A1 | 1/2016 | Osman | |
| 2016/0080717 A1 | 3/2016 | Reiss | |
| 2016/0148416 A1* | 5/2016 | Wu ....................... | H04N 13/395 345/419 |
| 2016/0191893 A1 | 6/2016 | Gewickey | |
| 2016/0277725 A1* | 9/2016 | Ellsworth ............ | H04N 13/344 |
| 2016/0307368 A1 | 10/2016 | Akeley | |
| 2017/0039686 A1 | 2/2017 | Miura | |
| 2017/0054967 A1 | 2/2017 | Zhang | |
| 2017/0085863 A1 | 3/2017 | Lopez | |
| 2017/0102545 A1 | 4/2017 | Hua | |
| 2017/0127046 A1 | 5/2017 | Das | |
| 2017/0181132 A1 | 6/2017 | Xiao | |
| 2017/0301313 A1* | 10/2017 | Perreault ................... | G02B 3/14 |
| 2017/0323485 A1 | 11/2017 | Samec | |
| 2018/0039084 A1 | 2/2018 | Schowengerdt | |
| 2018/0048882 A1 | 2/2018 | Eash | |
| 2018/0075659 A1* | 3/2018 | Browy ................. | G02B 27/017 |
| 2018/0095284 A1 | 4/2018 | Welch | |
| 2018/0098051 A1 | 4/2018 | Emberger | |
| 2018/0114328 A1 | 4/2018 | Jin | |
| 2018/0115700 A1 | 4/2018 | Ryan | |
| 2018/0259743 A1 | 9/2018 | Sasaki | |
| 2019/0073778 A1 | 3/2019 | Lee | |
| 2019/0187474 A1 | 6/2019 | Bhargava | |
| 2019/0339526 A1 | 11/2019 | Welch | |
| 2020/0007760 A1 | 1/2020 | Yokokawa | |

FOREIGN PATENT DOCUMENTS

| | | |
|---|---|---|
| CN | 103076156 A | 5/2013 |
| CN | 103634588 A | 3/2014 |
| CN | 104639930 A | 5/2015 |
| CN | 104899870 A | 9/2015 |
| CN | 105474622 A | 4/2016 |
| CN | 106125246 A | 11/2016 |
| CN | 106233189 A | 12/2016 |
| CN | 106537219 A | 3/2017 |
| CN | 106875436 A | 6/2017 |
| CN | 107203045 A | 9/2017 |
| CN | 107272199 A | 10/2017 |

(56) References Cited

FOREIGN PATENT DOCUMENTS

| | | |
|---|---|---|
| CN | 107924104 A | 4/2018 |
| EP | 3149939 A1 | 4/2017 |
| JP | 2000156876 | 6/2000 |
| JP | 2010217859 | 9/2010 |
| JP | 2017529635 | 10/2017 |
| JP | 2017229037 | 12/2017 |
| WO | 0135154 | 5/2001 |
| WO | 0135154 A1 | 5/2001 |
| WO | 2008038205 A2 | 4/2008 |
| WO | 2009155688 A1 | 12/2009 |
| WO | 2012175939 | 12/2012 |
| WO | 2012175939 A1 | 12/2012 |
| WO | 2014119555 | 8/2014 |
| WO | 2015192117 A1 | 12/2015 |
| WO | 2016138313 A1 | 9/2016 |
| WO | 2017055894 A1 | 4/2017 |

OTHER PUBLICATIONS

Pan, H. et al., "3D video disparity scaling for preference and prevention of discomfort." Stereoscopic Displays and Applications XXII, vol. 7863, International Society for Optics and Photonics, 2011 (8 pages).

Zannoli, M. et al., "Blur and the perception of depth at occlusions." Journal of Vision 16, No. 6 (2016):17 pp. 1-25 (25 pages).

Hong, H., "Advances in Head-Mounted Light-Field Displays for Virtual and Augmented Reality", Information Display 4/16, SID 2016, pp. 14-21 (8 pages).

Liu, S et al., "A Novel Prototype for an Optical See-Through Head-Mounted Display with Addressable Focus Cues", IEEE Transactions On Visualization and Computer Graphics, vol. 16, No. 3, May/Jun. 2010, pp. 381-393 (13 pages).

Lavalle, S. M., et al., "Head tracking for the Oculus Rift." In 2014 IEEE International Conference on Robotics and Automation (ICRA),IEEE, 2014 (8 pages).

Wikipedia, "Multiscopy" last accessed Feb. 1, 2019, available at https://web.archive.org/web/20190201002402/https://en.wikipedia.org/wiki/Multiscopy (3 pages).

Wikipedia, "Light field" last accessed May 29, 2018, available at https://web.archive.org/web/20180529074855/https://en.wikipedia.org/wiki/Light_field (8 pages).

Wikipedia Commons, "'File: 2D plus depth.png" last accessed Feb. 22, 2019, available at https://commons.wikimedia.org/w/index.php?curid=5489771 (3 pages).

Shibata, T et al., "Visual discomfort with stereo displays: effects of viewing distance and direction of vergence-accommodation conflict." In Stereoscopic Displays and Applications XXII, vol. 7863, p. 78630P. International Society for Optics and Photonics, 2011 (9 pages).

Wikipedia, "Photographic Filter" last accessed on May 3, 2019, available at: https://en.wikipedia.org/wiki/Photographic_filter#Diffusion (10 pages).

"Oculus Rift Vs. HTC Vive Vs. PlayStation VR" http://www.tomshardware.com/reviews/vive-rift-playstation-vr-comparison,4513-3.html. May 16, 2016 last accessed Dec. 13, 2021 (16 pages).

"Oculus Rift vs HTC Vive VR headset" http://www.avadirect.com/blog/oculus-rift-vs-htc-vive-vs-rift/ Jan. 26, 2016 last accessed Dec. 13, 2016 (9 pages).

List, U. H. "Nonlinear prediction of head movements for helmet-mounted displays" Air Force Human Resources Lab Brooks AFB TX, 1983 (24 pages).

NVIDIA Announces GamesWorks VR Branding, Adds Mutli-Res Shading, last accessed Dec. 16, 2017, available at https://web.archive.org/web/20171216213416/https://www.anandtech.com/show/9305/nvidia-announces-gameworks-vr-branding-adds-multires-shading , May 31, 2015 (6 pages).

"Samsung Gear VR Headset Lens Review & QR Code" last accessed Nov. 4, 2017, available at https://web.archive.org/web/20171104201025/http://www.sitesinvr.com/viewer/gearvr/index.html (7 pages).

La Rosa, F. et al., "Optical Image Stabilization (OIS)." STMicroelectronics. available online: http://www. st. com/resource/en/white_paper/ois_white_paper. pdf last accessed on Oct. 12, 2017 2015 (26 pages).

Aflaki, M., et al. "Rendering stereoscopic video for simultaneous 2D and 3D presentation," 2013 3DTV Vision Beyond Depth (3DTV-CON), 2013, pp. 1-4. Available online at: https://ieeexplore.ieee.org/document/6676658 (4 pages).

Crayola, "Color Alive" Last accessed May 9, 2019, [http://www.crayola.com/splash/products/ColorAlive] (8 pages).

Llull, P., et al. "Design and optimization of a near-eye multifocal display system for augmented reality." Applied Industrial Optics: Spectroscopy, Imaging and Metrology. Optical Society of America, 2015 (3 pages).

Wang, X., "Different multi-focal-plane method" Dec. 8, 2016, available at https://wp.optics.arizona.edu/optomech/wp-content/uploads/sites/53/2016/12/Tutorial_Wang_Xuan.pdf. (8 pages).

Wagner, D., et al., "Real-Time Detection and Tracking for Augmented Reality on Mobile Phones", IEEE Trans. on Visualization and Computer Graphics, vol. 16, No. 3, May/Jun. 2010, pp. 355-368 (14 pages).

Crecente, B., "Magic Leap: Founder of Secretive Start-Up Unveils Mixed-Reality Goggles" last accessed Mar. 30, 2018, available at https://web.archive.org/web/20180330030004/https://www.rollingstone.com/glixel/features/lightwear-introducing-magic-leaps-mixed-reality-goggles-w514479 (30 pages).

Tatham, E., "Getting the best of both real and virtual worlds," Communications of the ACM, vol. 42 No. 9, 1999, pp. 96-98 (3 pages).

Itoh, Y., et al., "Semi-parametric color reproduction method for optical see-through head-mounted displays." IEEE transactions on visualization and computer graphics vol. 21, No. 11, Nov. 2015, pp. 1269-1278 (10 pages).

Wang, Y. J., et al., "Augmented reality with image registration, vision correction and sunlight readability via liquid crystal devices." Scientific reports 7, No. 1, 2017, pp. 1-12 (12 pages).

Wikipedia, "Depth of field" last accessed Mar. 8, 2018, available at https://web.archive.org/web/20180308123938/https://en.wikipedia.org/wiki/Depth_of_field (29 pages).

Honnungar, S. et al., "Focal-sweep for Large Aperture Time-of-Flight Cameras", IEEE International Conference on Image Processing (ICIP), 2016, (5 pages).

Narayanan, P. J., et al., "Depth+ Texture Representation for Image Based Rendering." In Centre for Visual Information Technology, International Institute of Information Technology, 2004 (6 pages).

Pertuz, S. et al., "Generation of all-in-focus images by noise-robust selective fusion of limited depth-of-field images." IEEE Transactions on Image Processing 22, No. 3 (2012, (10 pages).

Billiot, B. et al., "3D image acquisition system based on shape from focus technique." Sensors 13, No. 13, 2013 pp. 5040-5053 (14 pages).

Oskiper, T. et al., "Augmented reality binoculars." IEEE transactions on visualization and computer graphics 21, No. 5, 2015, (10 pages).

Balram, N., "Fundamentals of light field imaging and display systems." Display Week 2016, (210 pages).

Liu, S., et al., "3-1: A Multi-plane Volumetric Optical See-through Head Mounted 3D Display." In SID Symposium Digest of Technical Papers, vol. 47, No. 1, 2016 (3 pages).

"Rendering" (https://developer.oculus.com/design/latest/concepts/bp-rendering/ Original date unknown); archived at Wayback Machine (https://web.archive.org/) citing a capture dated Feb. 18, 2018, last visited Apr. 7, 2022.

Ryan, L. "Multiple-focal-planes 3D displays: A practical solution to the vergence-accommodation conflict?." In 2012 International Conference on 3D Imaging (IC3D), pp. 1-6. IEEE, 2012 (6 pages).

Wang, Z. "Studies on Integral Imaging 3D Display" A dissertation for doctor's degree, University of Science and Technology of China, May 2017 (115 pages).

Zhuo, S. et al., "Defocus map estimation from a single image", Pattern Recognition 44, Mar. 4, 2011, (19 pages).

(56) References Cited

OTHER PUBLICATIONS

Akeley, K. et al., "A Stereo Display Prototype with Multiple Focal Distances", ACM Transactions on Graphics (TOG), vol. 23 No. 3, Aug. 2004, pp. 804-813 (10 pages).
J. P. Rolland, M. Krueger, and A. Goon (2000), "Multifocal planes head-mounted displays," Appl. Opt. 39, 3209-3215, 2000, pp. 3209-3215 (7pages).
Liu, S. et al., "A systematic method for designing depth-fused multi-focal plane three-dimensional displays", Optics Express 11562, vol. 18, No. 11, 2010 (12 pages).
Watt, S. J., et al., "Real-world stereoscopic performance in multiple-focal-plane displays: How far apart should the image planes be?." Stereoscopic Displays and Applications XXIII, vol. 8288, p. 82881E. International Society for Optics and Photonics, 2012 (11 pages).
Johnson, P. V. et al., "Dynamic lens and monovision 3D displays to improve viewer comfort", Optics express, vol. 24 No. 11, 2016 pp. 11808-11827 (20 pages).
Narain, R. et al., "Optimal presentation of imagery with focus cues on multi-plane displays." ACM Transactions on Graphics (TOG) vol. 34, No. 4 Article 59, Aug. 2015 (12 pages).
W. Wu et. al., "Content-adaptive focus configuration for near-eye multi-focal displays", Proc. IEEE Int. Conf. Multimedia Expo (ICME), Jul. 2016 (6 pages).
Liu, S. et al., "A Novel Prototype for an Optical See-Through Head-Mounted Display with Addressable Focus Cues", IEEE Transactions On Visualization and Computer Graphics, vol. 16, No. 3, May/Jun. 2010, pp. 381-393 (14 pages).
Cheng, D. et al., "Design of an optical see-through head-mounted display with a low f-No. and large field of view using a freeform prism." Applied optics vol. 48 No. May 14, 2009 pp. 2655-2668 (14 pages).
Xinda Hu (2014), "Development of the Depth-Fused Multi-Focal-Plane Display Technology", PHD Thesis, University of Arizona, 2014, (130 pages).
Hu, X et al., "Design and assessment of a depth-fused multi-focal-plane display prototype" Journal of Display Technology. vol. 10 No. 4, Apr. 2014, pp. 308-316 (9 pages).
Mackenzie, K. et al., "Accommodation to multiple-focal-plane displays: Implications for improving stereoscopic displays and for accommodation control." Journal of vision 10, No. 8, 2010 (20 pages).
Brunet, F. "Contributions to parametric image registration and 3d surface reconstruction." European Ph. D. in Computer Vision, Université dAuvergne, Clérmont-Ferrand, France, and Technische Universitat Munchen, Germany, Nov. 2010 (234 pages).
Hu, X et al., "High-resolution optical see-through multi-focal-plane head-mounted display using freeform optics" Optics Express 13896, vol. 22, No. 11, May 2014 (8 pages).
Sheng Liu, et al., "Time-multiplexed dual-focal plane head-mounted display with a liquid lens", Optics Letters vol. 34, No. 11, Jun. 1, 2009, published on May 21, 2009 (3 pages).
Sheng Liu, et al. "An Optical See-Through Head Mounted Display with Addressable Focal Planes", IEEE International Symposium on Mixed and Augmented Reality Sep. 15-18, 2008, pp. 33-42 (10 pages).
Siltanen, Sanni, "Theory and Applications of Marker-Based Augmented Reality". VTT Science 3, Espoo, (2012), (246 pages).
Baker, E. "144Hz Monitor vs 60Hz Monitor—See The Difference" https://www.144hzmonitors.com/other/144hz-monitor-vs-60hz-monitor-see-the-difference (last accessed Nov. 4, 2017) 3 pages.
International Search Report and Written Opinion of the International Searching Authority for PCT/US2019/013803 mailed Apr. 18, 2019, (11 pages).
International Search Report and Written Opinion of the International Searching Authority for PCT/US2019/023149, mailed Jun. 18, 2019, 10 pages.
Lee, Namjeong., et. al., "A New Codebook Structure for Enhanced Multi-User MIMO Transmission in mmWave Hybrid-Beamforming System". IEEE Globecom Workshops (GC Wkshps), (2015), pp. 1-6 (6 pages).
International Search Report and Written Opinion of the International Searching Authority for PCT/US2019/040187 mailed Sep. 23, 2019, 12 pages.
International Search Report and Written Opinion of the International Searching Authority for PCT/US2019/039746 mailed Oct. 9, 2019, 11 pages.
Chang, Jen-Hao, et. al., "Towards Multifocal Displays with Dense Focal Stacks". arxiv.org, Cornell University Library, ACM Transactions on Graphics, vol. 37, No. 6, Art. 198, Nov. 2018, pp. 198:1-198:17 (17 pages).
Grubert, J., et al., "A Survey of Calibration Methods for Optical See-Through Head-Mounted Displays", IEEE Transactions on Visualization and Computer Graphics, Early Access Article available in IEEE Xplore, vol. 13 No. 9, 2017 (14 pages).
International Preliminary Report on Patentability for PCT/US2019/040187 dated Jan. 5, 2021 (8 pages).
International Preliminary Report on Patentability for PCT/US2019/013803 issued on May 7, 2020, (11 pages).
International Preliminary Report on Patentability PCT/US2019/023149 issued on Sep. 29, 2020, 7 pages.
International Preliminary Report on Patentability for PCT/US2019/039746 issued on Jan. 12, 2021, 7 pages.
Maimone, A. et al., "Computational augmented reality eyeglasses." In 2013 IEEE International Symposium on Mixed and Augmented Reality (ISMAR), IEEE, 2013. (10 pages).
Bos, P. J., et al., "A Simple Method to Reduce Accommodation Fatigue in Virtual Reality and Augmented Reality Displays", SID 2016, (4 pages).
Wilson, A., et al., "Design and prototype of an augmented reality display with per-pixel mutual occlusion capability." Optics express vol. 25, No. 24, Nov. 2017 pp. 30539-30549 (11 pages).
Itoh Y., et al., "Occlusion Leak Compensation for Optical See-Through Displays using a Single-layer Transmissive Spatial Light Modulator", IEEE Transactions on Visualization and Computer Graphics, vol. 23, No. 11, Nov. 2017, pp. 2463-2473 (11 pages).
Sukhanov, S. A., "3D content production" St. Petersburg Electrotechnical University, St. Petersburg, Russia, Mar. 12, 2011 https://www.slideshare.net/mikhailvink/sergey-a-sukhanov-3d-content-production last accessed on Feb. 26, 2019 (12 pages).
Padmanaban, N., et al., "Optimizing virtual reality for all users through gaze-contingent and adaptive focus displays." Proceedings of the National Academy of Sciences vol. 114 No. 9, Feb. 28, 2017 pp. 2183-2188 (6 pages).
"VR AR Judder is Visible Latency" https://medium.com/siliconvalley-global-news/vr-ar-judder-is-visible-latency-2631aa393ebf, Apr. 9, 2016 last accessed Dec. 13, 2021 (6 pages).
Kiyokawa, K., et al., "An occlusion-capable optical see-through head mount display for supporting co-located collaboration", ISMAR 2003 (9 pages).
Yamaguchi, Y., et al., "See-through integral imaging display with background occlusion capability", Applied Optics vol. 55, No. 3, Jan. 20, 2016, (6 pages).
Jamali, A., et al., "Design of a large aperture tunable refractive Fresnel liquid crystal lens", Applied Optics, vol. 57, No. 7, 2018, (10 pages).
Wikipedia "3D Projection". Wikipedia article modified on Jul. 11, 2017, available at: https://en.wikipedia.org/w/index.php?title=3D_projection&oldid=790065385 (5 pages).
Linwei, Z. et al., "View-spatial-temporal post-refinement for view synthesis in 3D video systems", Signal Processing: Image Communication 28, 2013, pp. 1342-1357 (16 pages).
Xuyuan, X. et al., "Depth map misalignment correction and dilation for DIBR view synthesis", Signal Processing: Image Communication 28, 2013, pp. 1023-1045 (23 pages).
Kristoph F., A 3D-TV Approach Using Depth-Image-Based Rendering (DIBR), Proceedings of VIIP vol. 3 No. Sep. 3, 2003 (6 pages).
Hong, H., "Enabling Focus Cues in Head-Mounted Displays", Proceedings of the IEEE 2017 (18 pages).
Kramida, G. et al., "Resolving the Vergence-Accommodation Conflict in Head-Mounted Displays", IEEE transactions on visualization and computer graphics. 2015 (20 pages).

(56) References Cited

OTHER PUBLICATIONS

Suyama, S. et al., "Apparent 3-D image perceived from luminance-modulated two 2-D images displayed at different depths", Vision Research, vol. 44, 2004, pp. 785-793 (9 pages).

Lee, C. et al., "View Synthesis using Depth Map for 3D Video", Asia-Pacific Signal and Information Processing Association, 2009 Annual Summit and Conference, International Organizing Committee, Sapporo, Japan, Oct. 2009, pp. 350-357 (9 pages).

Watt, S. J. et al., "Achieving near-correct focus cues in a 3-D display using multiple image planes", In Human vision and electronic imaging X, vol. 5666, pp. 393-401. International Society for Optics and Photonics, 2005 (9 pages).

Shibata, T. et al., "The zone of comfort: Predicting visual discomfort with stereo displays." Journal of vision 11(8):11, 2011, pp. 1-29 (29 pages).

\* cited by examiner

IDENTIFYING, USING A CAMERA COUPLED TO THE HMD, TWO-DIMENSIONAL (2D) CONTENT DISPLAYED ON A SCREEN EXTERNAL TO THE HMD
2202

OBTAINING DEPTH INFORMATION ASSOCIATED WITH THE 2D CONTENT
2204

GENERATING A PLURALITY OF FOCAL PLANE IMAGES USING THE DEPTH INFORMATION, THE PLURALITY OF FOCAL PLANE IMAGES COMPRISING DEPTH CUES FOR THE 2D CONTENT
2206

DISPLAYING THE PLURALITY OF FOCAL PLANE IMAGES AS A SEE-THROUGH OVERLAY SYNCHRONIZED WITH THE 2D CONTENT
2208

CAPTURING, WITH A CAMERA COUPLED TO THE HMD, A VIDEO IMAGE OF A REAL-WORLD SCENE;
2402

IDENTIFYING AN IMAGE PATTERN PRESENT IN THE CAPTURED VIDEO IMAGE
2404

DETERMINING A DEPTH ADJUSTMENT ASSOCIATED WITH THE IDENTIFIED IMAGE PATTERN
2406

GENERATING A PLURALITY OF FOCAL PLANE IMAGES COMPRISING DEPTH CUES FOR THE IDENTIFIED IMAGE PATTERN, THE DEPTH CUES REFLECTING A MODIFIED DEPTH OF THE IDENTIFIED IMAGE PATTERN BASED ON THE DETERMINED DEPTH ADJUSTMENT
2408

DISPLAYING A 3D REPRESENTATION OF THE IDENTIFIED IMAGE PATTERN COMPRISING THE PLURALITY OF FOCAL PLANE IMAGES
2410

METHOD AND SYSTEM FOR NEAR-EYE FOCAL PLANE OVERLAYS FOR 3D PERCEPTION OF CONTENT ON 2D DISPLAYS

CROSS-REFERENCE TO RELATED APPLICATIONS

The present application is a continuation of U.S. patent application Ser. No. 18/197,591, entitled "METHOD AND SYSTEM FOR NEAR-EYE FOCAL PLANE OVERLAYS FOR 3D PERCEPTION OF CONTENT ON 2D DISPLAYS" and filed May 15, 2023, which is a continuation of U.S. patent application Ser. No. 17/256,983, entitled "METHOD AND SYSTEM FOR NEAR-EYE FOCAL PLANE OVERLAYS FOR 3D PERCEPTION OF CONTENT ON 2D DISPLAYS" and filed Dec. 29, 2020, which is a national stage application under 35 U.S.C. § 371 of International Patent Application No. PCT/US2019/040187, entitled "METHOD AND SYSTEM FOR NEAR-EYE FOCAL PLANE OVERLAYS FOR 3D PERCEPTION OF CONTENT ON 2D DISPLAYS" and filed Jul. 1, 2019, which claims benefit under 35 U.S.C. § 119 (e) from U.S. Provisional Patent Application Ser. No. 62/694,343, entitled "Method and System for Near-Eye Focal Plane Overlays for 3D Perception of Content on 2D Displays," filed Jul. 5, 2018, all of which are hereby incorporated by reference in their entirety.

BACKGROUND

Many external displays, computer screens, TV sets, and near-eye displays contribute to decoupling of focus and accommodation responses of a viewer, causing vergence accommodation conflict (VAC). VAC becomes more prominent by generally enlarging display sizes and higher resolutions, causing viewers to see the content, on average, from closer distances, both relative and absolute.

SUMMARY

An example method performed by a head-mounted display (HMD) in accordance with some embodiments may include: identifying, using a camera coupled to the HMD, two-dimensional (2D) content displayed on a screen external to the HMD; obtaining depth information associated with the 2D content; generating a plurality of focal plane images using the depth information, the plurality of focal plane images comprising depth cues for the 2D content; and displaying the plurality of focal plane images as a see-through overlay synchronized with the 2D content.

For some embodiments of the example method, the screen is part of a real-world scene.

For some embodiments of the example method, the depth cues for the 2D content may include information regarding at least one of distance and texture.

For some embodiments of the example method, each of the plurality of focal plane images may include high-spatial-frequency image information for an associated image depth.

For some embodiments of the example method, the high-spatial-frequency image information may include accommodation cues for focusing at varying distances.

In some embodiments, the example method may further include: low-pass-filtering the 2D content; and displaying the low-pass-filtered 2D content, wherein displaying the plurality of focal plane images displays the plurality of focal plane images as an overlay over the low-pass-filtered 2D content.

In some embodiments, the example method may further include capturing the 2D content with the camera.

In some embodiments, the example method may further include identifying a spatial position of the screen, wherein displaying the plurality of focal plane images may include aligning the plurality of focal plane images with the spatial position of the screen.

For some embodiments of the example method, obtaining the depth information may include retrieving metadata that may include the depth information, wherein the metadata may include timing information to enable synchronously aligning the displayed plurality of focal plane images with the 2D content, and wherein displaying the plurality of focal plane images may include synchronously aligning the plurality of focal plane images with the 2D content using the timing information.

For some embodiments of the example method, obtaining the depth information may include retrieving metadata comprising the depth information, wherein the metadata may include three-dimensional (3D) depth information for the 2D content, and wherein the 3D depth information for the 2D content may include a time sequence of depth maps synchronized to the 2D content.

In some embodiments, the example method may further include converting a resolution of the depth maps to match a resolution of the 2D content, wherein the resolution of the depth maps may be different than the resolution of the 2D content.

In some embodiments, the example method may further include detecting an asymmetry of the 2D content displayed on the screen, wherein displaying the plurality of focal plane images may include adjusting the plurality of focal plane images based on the asymmetry of the 2D content.

For some embodiments of the example method, displaying the see-through overlay may enable a user to view the screen via a direct optical path.

An example apparatus in accordance with some embodiments may include: a camera; a multi-focal plane display; a processor; and a non-transitory computer-readable medium storing instructions that are operative, when executed by the processor, to perform any of the methods listed above.

In some embodiments, the example apparatus may further include: an optical lens structure configured to adjust direct optical viewing of the screen; and an optical low-pass filter.

Another example method performed by a head-mounted display (HMD) in accordance with some embodiments may include: detecting, using a camera coupled to the HMD, presence, spatial position, and orientation information relating to 2D video content displayed on a 2D display external to the HMD; receiving 3D video information corresponding to the 2D video content; synchronizing in time the 3D video information with the 2D video content; tracking the spatial position information and orientation information relating to the 2D video content; decomposing the 3D video information into a plurality of focal plane images; filtering one or more of the plurality of focal plane images to remove one or more respective low frequency representations from the plurality of focal plane images; and displaying the filtered focal plane images.

For some embodiments of another example method, filtering one or more of the plurality of focal plane images may include high-pass-filtering at least one of the plurality of focal plane images.

For some embodiments of another example method, decomposing the 3D video information into the plurality of focal plane images may include: determining a depth of the 3D video information; forming a plurality of 2D weighting planes by processing the depth of the 3D video information with one or more depth-blending functions; and forming the plurality of focal plane images by weighting the 2D video content with the plurality of 2D weighting planes.

For some embodiments of another example method, the 3D video information may include depth information.

For some embodiments of another example method, the 3D video information may include 2D texture information.

For some embodiments of another example method, the 3D information may include a plurality of high-frequency focal plane images and positions in a common axial coordinate system of the plurality of high-frequency focal plane images.

For some embodiments of another example method, detecting presence, spatial position, and orientation information relating to 2D video content may include detecting presence, spatial position, and orientation information relating to the 2D display, and tracking the spatial position information and orientation information relating to the 2D video content may include tracking the spatial position information and orientation information relating to the 2D display.

Another example apparatus in accordance with some embodiments may include: a camera; a multi-focal plane display; a processor; and a non-transitory computer-readable medium storing instructions that are operative, when executed by the processor, to perform any of the methods listed above.

A further example method performed by a head-mounted display (HMD) in accordance with some embodiments may include: capturing video data with a camera coupled to a multi-focal plane (MFP) display of the HMD; detecting a viewing angle between the HMD and a two-dimensional (2D) display present within the captured video data, the 2D display being external to the HMD and in a field of view of the video camera; receiving depth data corresponding to the captured video data; forming a plurality of high-frequency focal plane images corresponding to 2D content shown on the 2D display using the depth data; forming one or more low-frequency focal plane images corresponding to the 2D content shown on the 2D display; and rendering, via the MFP display, the plurality of adjusted high-frequency focal plane images and the one or more low-frequency focal plane images.

In some embodiments, the further example method may further include synchronizing the depth data with the 2D content shown on the 2D display.

For some embodiments of the further example method, receiving depth data corresponding to the captured video data further may include receiving the depth data and the captured video data corresponding to the 2D content shown on the 2D display.

For some embodiments of the further example method, adjusting the plurality of high-frequency focal plane images with respect to the viewing angle may include applying a coordinate transformation in real time.

For some embodiments of the further example method, receiving depth data corresponding to the captured video data further may include receiving additional 3D video information comprising texture information corresponding to the 2D content.

For some embodiments of the further example method, receiving depth data corresponding to the captured video data further may include receiving additional 3D video information comprising the plurality of high-frequency focal plane images.

In some embodiments, the further example method may further include forming a stereoscopic stack of two pluralities of high-frequency focal plane images if the plurality of high-frequency focal plane images is a monoscopic stack by shifting the plurality of high-frequency focal plane images into the two pluralities of high-frequency focal plane images to thereby form the stereoscopic stack.

A further example apparatus in accordance with some embodiments may include: a camera; a multi-focal plane display; a processor; and a non-transitory computer-readable medium storing instructions that are operative, when executed by the processor, to perform any of the methods listed above.

For some embodiments of the further example method, the multi-focal plane display is a near-eye multi-focal plane display.

Another further example method performed by a head-mounted display (HMD) in accordance with some embodiments may include: capturing, with a camera coupled to the HMD, an image of two-dimensional (2D) content displayed on a screen external to the HMD; identifying the 2D content present in the image; retrieving metadata comprising depth information associated with the 2D content; generating a plurality of focal plane images using the metadata, the plurality of focal plane images comprising depth cues for the 2D content; and displaying the 2D content and an overlay comprising the plurality of focal plane images synchronized with the 2D content.

Another further example apparatus in accordance with some embodiments may include: a camera; a multi-focal plane display; a processor; and a non-transitory computer-readable medium storing instructions that are operative, when executed by the processor, to perform any of the methods listed above.

An additional example method performed by a head-mounted display (HMD) in accordance with some embodiments may include: capturing, with a camera coupled to the HMD, a video image of a real-world scene; identifying an image pattern present in the captured video image; determining a depth adjustment associated with the identified image pattern; generating a plurality of focal plane images comprising depth cues for the identified image pattern, the depth cues reflecting a modified depth of the identified image pattern based on the determined depth adjustment; and displaying a 3D representation of the identified image pattern comprising the plurality of focal plane images.

An additional example apparatus in accordance with some embodiments may include: a camera; a multi-focal plane display; a processor; and a non-transitory computer-readable medium storing instructions that are operative, when executed by the processor, to perform any of the methods listed above.

A further additional example method performed by a mobile device in accordance with some embodiments may include: identifying, using a camera coupled to the mobile device, content present in an image of a real-world scene; retrieving metadata comprising depth information associated with the content; generating a plurality of focal plane images using the metadata, the plurality of focal plane images comprising depth cues for the content; and displaying an overlay comprising the plurality of focal plane images synchronized with the content.

For some embodiments of the further additional example method, the image of the real-world scene may include an image of content displayed on a screen external to the mobile device, and the overlay may include a see-through overlay.

In some embodiments, the further additional example method may further include capturing the content with the camera.

For some embodiments of the further additional example method, displaying the overlay enables a user to view the screen via a direct optical path.

In some embodiments, the further additional example method may further include: capturing, with the camera coupled to the mobile device, the image of the real-world scene; and displaying the content, wherein the image of the real-world scene may include an image of content displayed on a screen external to the mobile device.

In some embodiments, the further additional example method may further include identifying a spatial position of the screen, wherein displaying the overlay may include aligning the plurality of focal plane images to align with the spatial position of the screen.

In some embodiments, the further additional example method may further include detecting an asymmetry of the content displayed on the screen, wherein displaying the overlay may include adjusting the plurality of focal plane images based on the asymmetry of the content.

In some embodiments, the further additional example method may further include: determining an original depth field for the real-world scene; and adjusting, based on the metadata, a portion of the original depth field corresponding to the identified content to produce an adjusted depth field, the identified content corresponding to an image pattern recognized in the image, wherein the plurality of focal plane images are generated using the adjusted depth field.

For some embodiments of the further additional example method, generating the plurality of focal plane images creates a three-dimensional depth effect.

For some embodiments of the further additional example method, each of the plurality of focal plane images may include high-spatial-frequency image information for an associated image depth.

For some embodiments of the further additional example method, the high-spatial-frequency image information may include accommodation cues for focusing at varying distances.

In some embodiments, the further additional example method may further include: low-pass-filtering the content; and displaying the low-pass-filtered content, wherein displaying the plurality of focal plane images displays the plurality of focal plane images as an overlay over the low-pass-filtered content.

For some embodiments of the further additional example method, the metadata may include timing information to enable synchronously aligning the displayed plurality of focal plane images with the content, and displaying the overlay may include synchronously aligning the plurality of focal plane images with the content using the timing information.

For some embodiments of the further additional example method, the metadata may include three-dimensional (3D) depth information for the content, and the 3D depth information for the content may include a time sequence of 2D depth maps synchronized to the content.

For some embodiments of the further additional example method, the depth maps have a different resolution than the content.

For some embodiments of the further additional example method, the mobile device may include a hand-held multiple focal plane-enabled mobile phone.

For some embodiments of the further additional example method, the mobile device may include a head-mounted display.

A further additional example apparatus in accordance with some embodiments may include: a camera; a multi-focal plane display; a processor; and a non-transitory computer-readable medium storing instructions that are operative, when executed by the processor, to perform any of the methods listed above.

In some embodiments, the further additional example apparatus may further include: one or more optical lenses configured to adjust direct optical viewing of a screen external to the apparatus; and an optical low-pass filter.

For some embodiments of the further additional example apparatus, the apparatus may be a hand-held multiple focal plane-enabled mobile device.

For some embodiments of the further additional example apparatus, the apparatus may be a head-mounted display that may include the multi-focal plane display.

BRIEF DESCRIPTION OF THE DRAWINGS

FIG. 22 is a flowchart illustrating an example MFP generation and rendering process according to some embodiments.

FIG. 24 is a flowchart illustrating a further example MFP generation and rendering process according to some embodiments.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . " For brevity and clarity of presentation, this implied leading clause is not repeated ad nauseum in the detailed description.

Example Networks for Implementation of the Embodiments

A wireless transmit/receive unit (WTRU) may be used, e.g., as a head mounted display (HMD) device in some embodiments described herein.

Figure 1A:
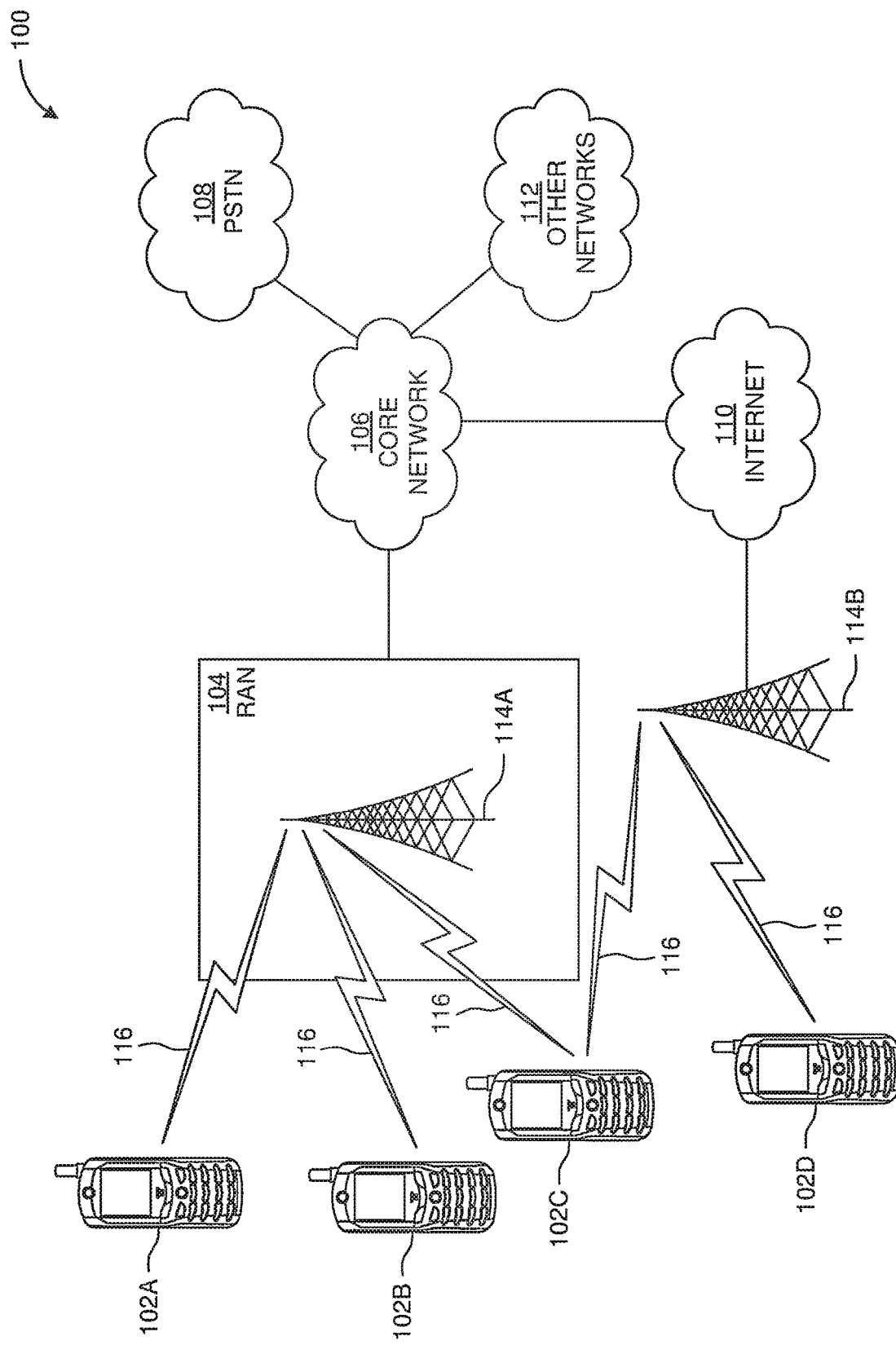
FIG. 1A is a system diagram illustrating an example communications system according to some embodiments.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
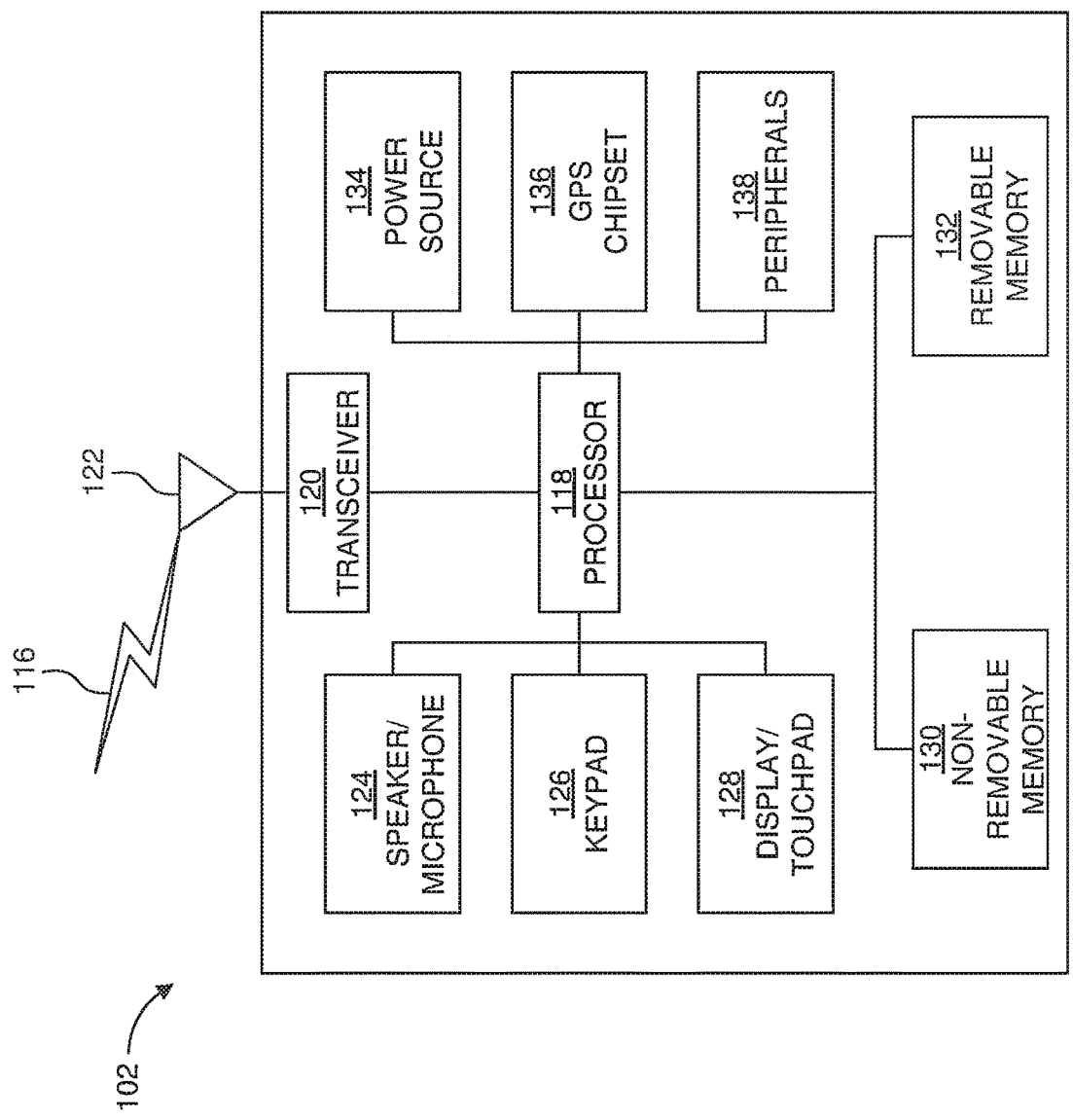
FIG. 1B is a system diagram illustrating an example wireless transmit/receive unit (WTRU) that may be used within the communications system illustrated in FIG. 1A according to some embodiments.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

In view of FIGS. 1A-1B, and the corresponding description of FIGS. 1A-1B, one or more, or all, of the functions described herein with regard to one or more of: WTRU 102a-d, Base Station 114a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

Systems and methods described relate to external displays enhanced by focal plane overlays, supporting 3D accommodation with near-eye glasses display. Bare eyes with some displays do not suffer from VAC due to monoscopy; stereoscopic displays or viewing glasses cause VAC due to not adding focal planes in 3D. Embodiments herein enable viewing of the same display both with bare eyes and with viewing glasses. Both options are free from vergence-accommodation conflict. Specifically, some embodiments include an extension that supports three-dimensional viewing accommodations. The extension for supporting 3D accommodation may be provided either as part of 3D content distribution (broadcast) or as an additional service using a separate transmission channel.

Figure 2:
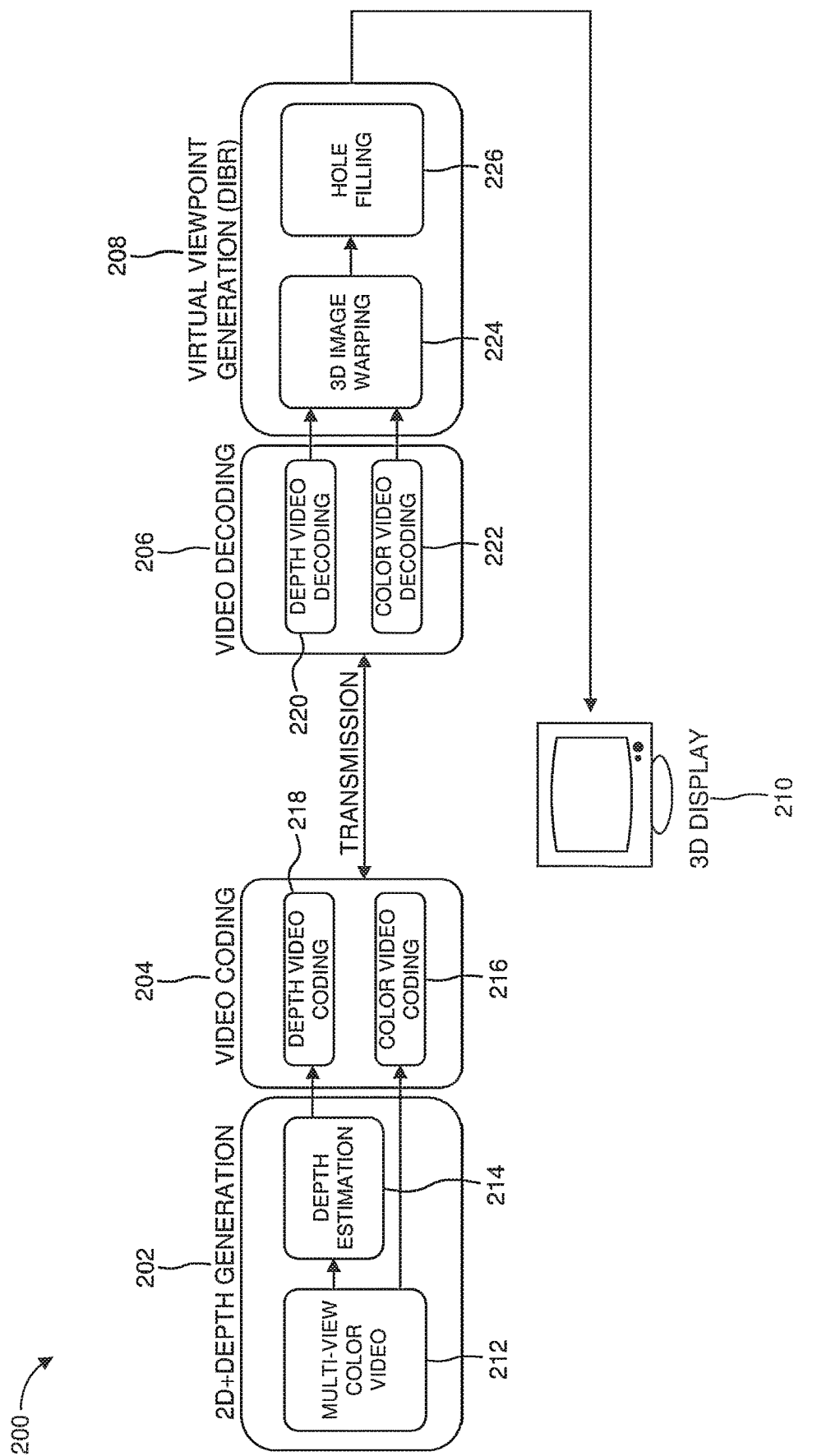
FIG. 2 is a system diagram illustrating an example set of interfaces for depth image-based rendering (DIBR).

FIG. 2 is a system diagram illustrating an example set of interfaces for depth image-based rendering (DIBR). A commonly used system for stereoscopic 3D uses a depth image based rendering (DIBR) approach. A schematic block diagram 200 illustrates a DIBR based 3D transmission system. As shown, FIG. 2 illustrates a 2D plus depth generation block 202, a video coding block 204, and after transmission, a video decoding block 206 and a virtual viewpoint generation (e.g., DIBR) block 208 coupled to a 3D display.

Within the 2D plus depth generation block 202, there is a multi-view color video block 212 and a depth estimation block 214. Within the video coding block 204, there is a depth video coding block 218 and a color video coding block 216. The video coding block 204 and the video decoding block 206 are coupled to transmit and receive. The video decoding block 206 includes a depth video decoding block 220 and a color video decoding block 222. Virtual viewpoint generation (DIBR) block 208 includes a 3D image warping block 224 coupled to both the depth video decoding block 220 and the color video decoding block 222. The virtual viewpoint generation (DIBR) block 208 also includes a hole-filling block 226 coupled to the 3D image warping block 224. The output of virtual viewpoint generation (DIBR) block 208 is coupled to a 3D display 210.

In one example of a DIBR system, at the receiving side, the virtual viewpoint generation of stereoscopic 3D (S3D) consists of 3D warping 224 and hole filling 226 stages, as shown in the virtual viewpoint generation (DIBR) block 208. 3D warping is used to form two virtual views to the 3D view (textured depth map), as seen from the two eye-points of a viewer.

3D warping may be made by computer graphics algorithms. A description of related 3D operations is available at the website 3D Projection, WIKIPEDIA (last visited May 3, 2019), available at en.wikipedia<dot>org/wiki/3D_projection.

Human eyes are able to scan freely in the real-world space and to pick information by focusing and accommodating to different depths in 3D space. When viewing, the (con) vergence of the eyes varies between seeing in parallel directions, such as objects at "infinity", and seeing to very crossed directions, such as objects close to the eyes. In normal viewing, the convergence and accommodation are very strongly coupled, so that most of the time, by nature, the accommodation/focal points and the convergence point of the two eyes meet at the same 3D point. In stereoscopic viewing, however, the eyes are always focused on the same image/display plane, while the human visual system (HVS) and the brain form the 3D perception by detecting disparity of the images, such as the small distances of corresponding pixels in the two 2D image planes.

Figure 3:
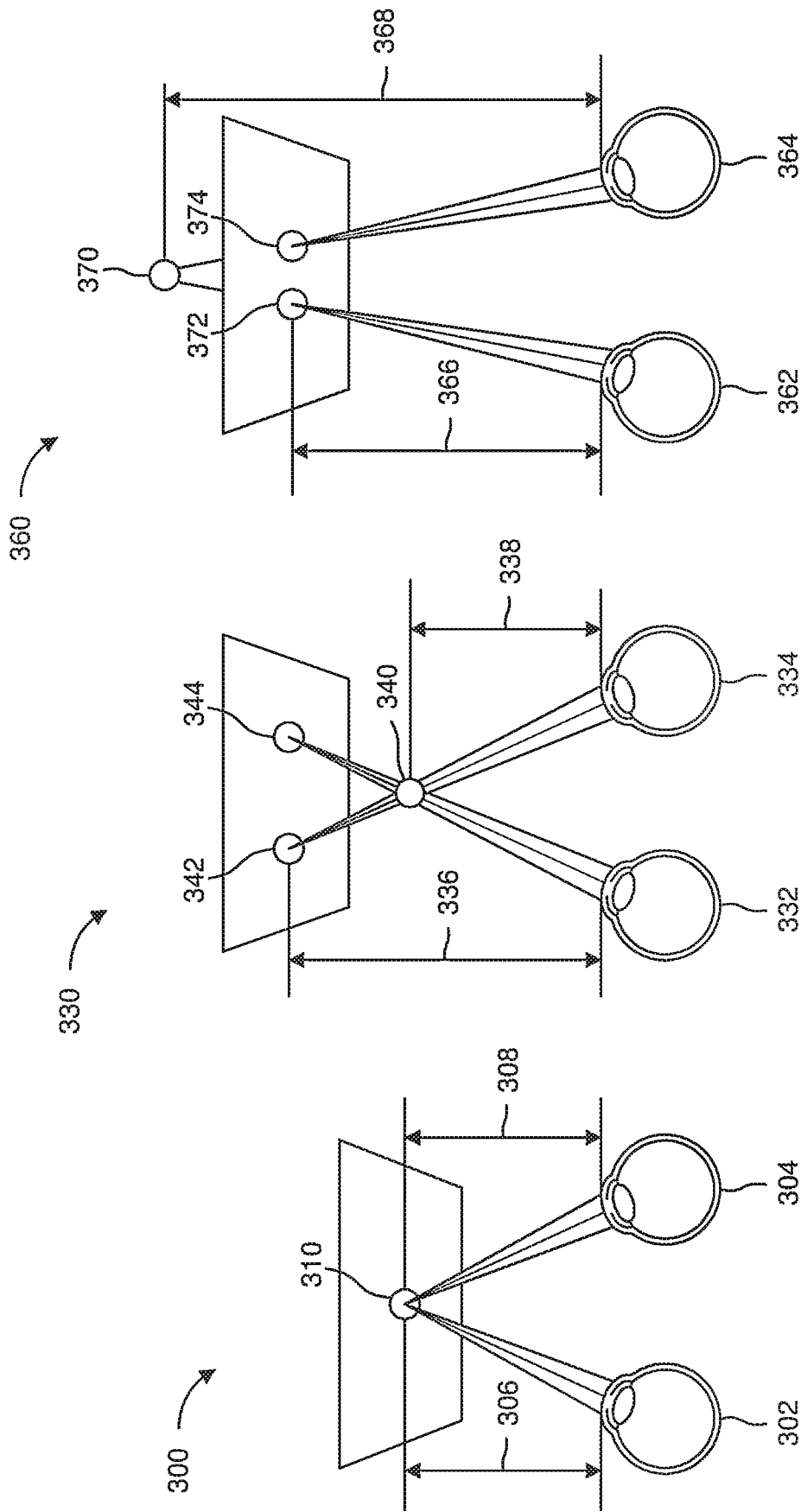
FIGS. 3A-3C are schematic plan views illustrating an example of vergence-accommodation conflict (VAC) in stereoscopic viewing.

FIGS. 3A-3C are schematic plan views illustrating an example of vergence-accommodation conflict (VAC) in stereoscopic viewing. The three different examples 300, 330, 360 illustrate the difference of natural perception and the stereoscopic viewing. The first example 300 in FIG. 3A illustrates natural viewing in the real world with focal distance 306 and vergence distance 308 being the same distance, such that the crossing point 310 of the views of the left eye 302 and right eye 304 is the same as the focal point 302 of each eye 302, 304. The second example 330 in FIG. 3B illustrates stereo viewing on S3D displays as crossed viewing with a focal distance 336 and a vergence distance 338 that are at different distances, such that the crossing point 340 of the views of the left eye 332 and right eye 334 is closer to the eyes 332, 334 than the focal points 342, 344 of each eye 332, 334. The third example 360 in FIG. 3C illustrates stereo viewing on S3D displays with uncrossed viewing with a focal distance 366 and a vergence distance 368 that are at different distances, such that the crossing point 370 of the views of the left eye 362 and right eye 364 is further from the eyes 362, 364 than the focal points 372, 374 of each eye 362, 364. In stereoscopic viewing, as illustrated by FIGS. 3A-3C, the vergence and accommodation points are different, which is the cause for the vergence-accommodation conflict (VAC). These differences cause visual strain, nausea, and other types of discomfort, generally referred to as simulator sickness.

Multifocal plane (MFP) displays create a stack of discrete focal planes, composing a 3D scene from layers along a viewer's visual axis. A view to the 3D scene is formed by projecting all those pixels (more precisely: voxels), which are visible to the user at different depths and spatial angles.

Each focal plane essentially samples (e.g., projections of) the 3D view within a depth range centered on it. Depth blending is a method used to smooth out the otherwise many times perceived quantization steps and contouring when seeing views compiled from discrete focal planes. Multifocal planes may be implemented either by spatially multiplexing a stack of 2D displays, or by sequentially switching, for example, in a time-multiplexed way, the focal distance of a single 2D display by a high-speed birefringent (or more generally, e.g., varifocal element), while spatially rendering the visible parts of corresponding multifocal image frames. Without depth blending, the required number of focal planes is high, for example, 14 or more. With depth blending, the number may be reduced down to around five without degrading the quality too much.

Figure 4:
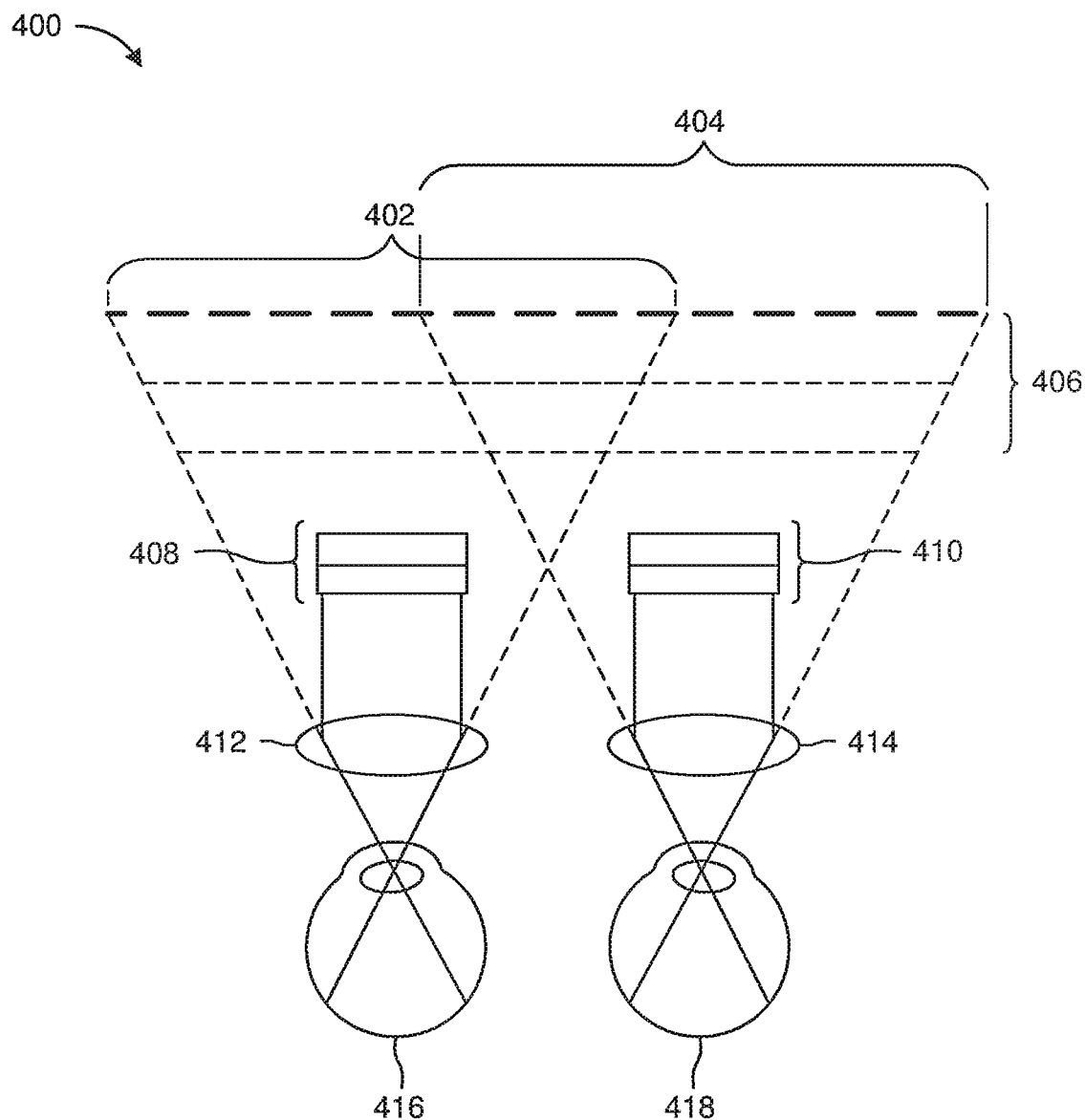
FIG. 4 is a schematic plan view illustrating an example multi-focal near-eye display according to some embodiments.

FIG. 4 is a schematic plan view illustrating an example multi-focal near-eye display according to some embodiments. A schematic diagram 400 illustrates a multi-focal near-eye display. Multi-focal plane (MFP) near-eye displays create an approximation for the light-field of the displayed scene. Due to near-eye-displays movement along with a user's head movements, only one viewpoint needs to be supported. Correspondingly, the approximation for the light field is easier, as capturing a light-field for large number of viewpoints is not needed. As shown in FIG. 4, a left eye 416 and a right eye 418 are shown with associated eye pieces 412, 414 and display stacks 408, 410. The virtual focal planes 406 are shown with the left eye image 402 and right eye image 404 with overlapping area between the two.

High frequency components of an image are parts of the image where the image data is changing rapidly within short distances. High frequency components dominate in perceiving depth from focal properties. Low frequency components, for example slowly varying luminance or color, generate few cues for depth perception. Forming MFPs distributes image information into a chosen number of focal planes, which is described, for example, in Rahul Narain, et al., *Optimal Presentation of Imagery with Focus Cues on Multi-Plane Displays,* 34:4 ACM TRANSACTIONS ON GRAPHICS, 59:1-59-12 (August 2015), and redistribution of low frequency contents may improve accommodation to and between focal planes. As described, a complex redistribution procedure for stereoscopic MFP-stacks (such as representation planes), may be based on a human visual system (HVS).

Figure 5:
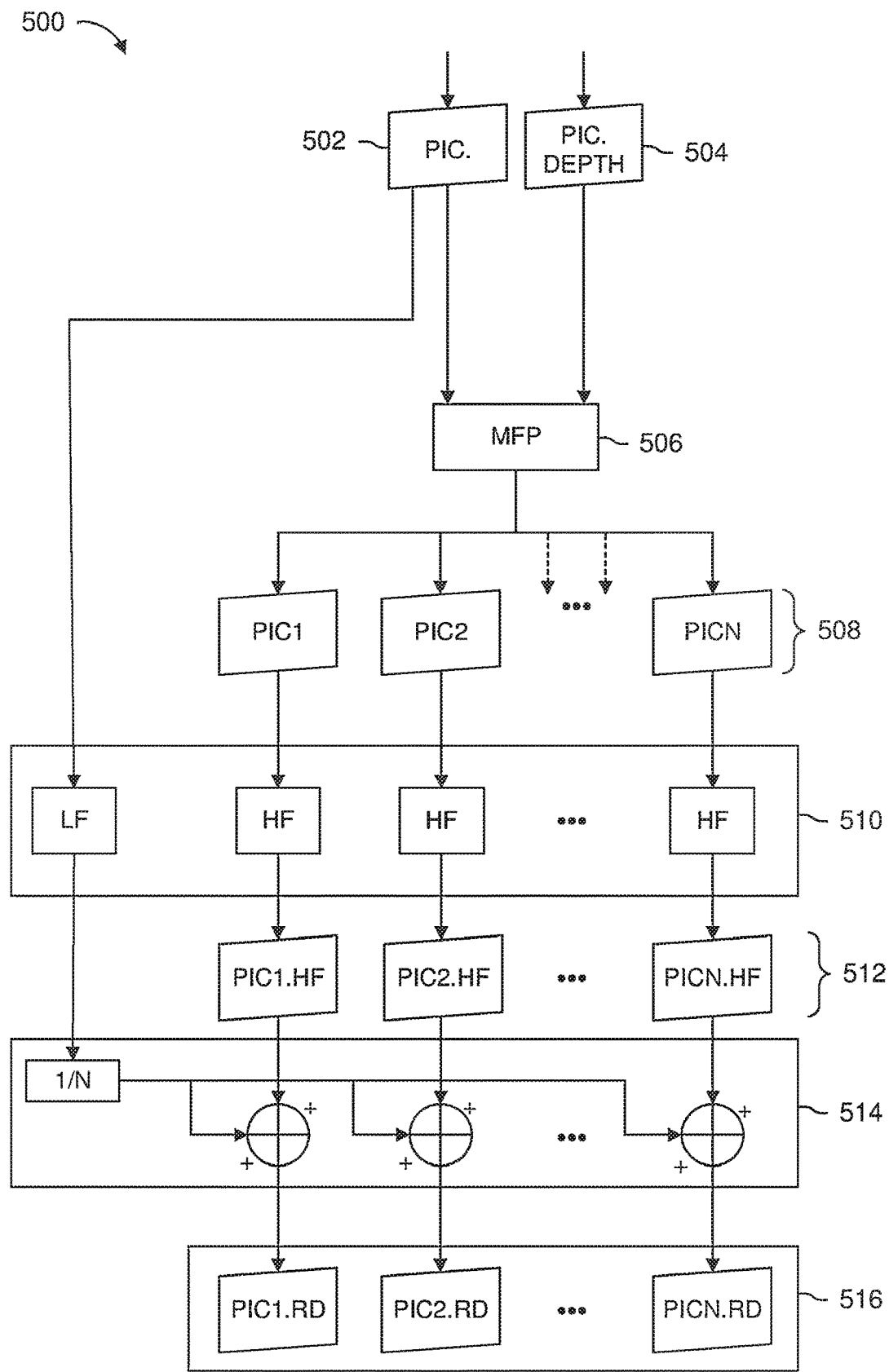
FIG. 5 is a process diagram illustrating an example MFP generation process according to some embodiments.

FIG. 5 is a process diagram illustrating an example MFP generation process according to some embodiments. A process diagram 500 in accordance with some embodiments illustrates that a redistribution process may produce modified MFPs so that each focal plane is a sum of a specified fraction of the low-frequency contents of the whole scene, and high frequency components specific for the said focal plane, such as at the corresponding accommodation distance. The process replaces the MFP (distance) specific low-frequency components with a specified part of the overall sum of low frequency components in the scene.

As shown, FIG. 5 illustrates picture and picture depth inputs to an MFP decomposition module. Image data, which may include 2D pixel data 502 and depth data 504, is received from a source. For some embodiments, picture and picture depth inputs correspond, respectively, to texture and depth inputs (or video plus depth for a sequence of images, respectively). At MFP step 506, the process, in some embodiments, provides for forming N focal planes, illustrated as pic1 . . . picN, that may be grouped as an MFP stack 508. Forming N focal planes may use an applicable depth blending method, as will be appreciated by those of skill in the art with the benefit of this disclosure, such as linear blending described in, for example, Kurt Akeley, et al., *A Stereo Display Prototype with Multiple Focal Distances,* 23:3 ACM TRANSACTIONS ON GRAPHICS (TOG) 804-813 (August 2004) ("Akeley").

Next, the process continues to provide filtered focal planes 510 for removing low-frequency components of each focal plane by filtering with a low-pass filter and N high pass filters shown in FIG. 5 as block LF and blocks HF, representing HF versions of MFPs. The output 512 is shown as pic1.hf, pic2.hf, to picN.hf.

FIG. 5 also illustrates the low pass filter output being provided to a 1/N block (division by N) 514 and receiving pic1.hf, pic2.hf, . . . picN.hf as well as the output of the 1/N block at N different adders. Note that division by N also may be multiplication by 1/N. More particularly, in some embodiments, forming a low-pass filtered version of the input image may include, optionally in one or more embodiments, compiling the low-pass (LP) filtered version by summing LP-filtered MFP components LF. Thus, in some embodiments, low-frequency components may be redistributed equally to each high pass (HF) component layer by multiplying the sum of LF components by 1/N and adding the resulting fraction to each of N HF layers.

FIG. 5 also illustrates, for some embodiments, producing an output of N redistributed MFPs 516 (pic1.rd, pic2.rd . . . picN.rd) for (large disparity) virtual viewpoint generation, and/or, in some embodiments, rendering redistributed MFPs to support accommodation.

Figure 6A:
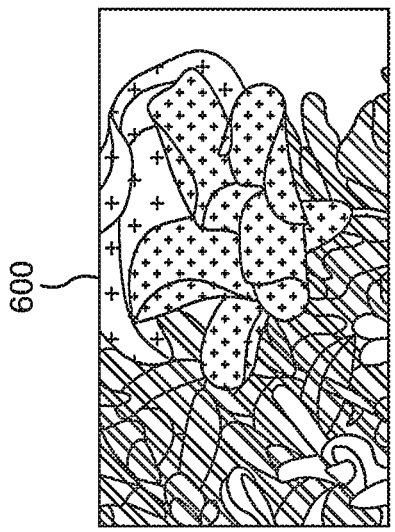
FIGS. 6A-6C are illustrations showing an example set of images of linearly blended MFPs before redistribution according to some embodiments.
Figure 6D:
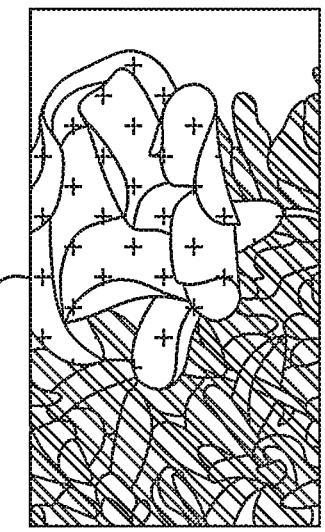
FIGS. 6D-6F are illustrations showing an example set of images of redistributed MFPs according to some embodiments.
Figure 6B:
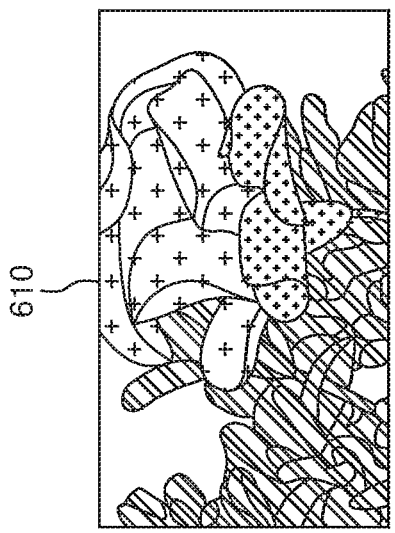
Figure 6E:
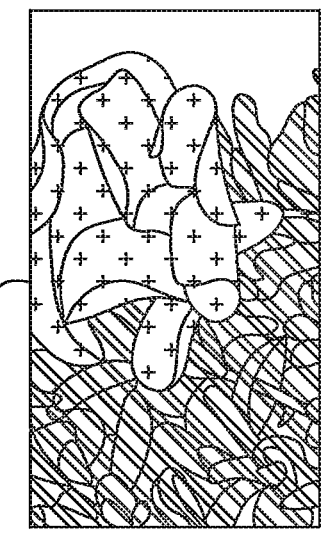
Figure 6C:
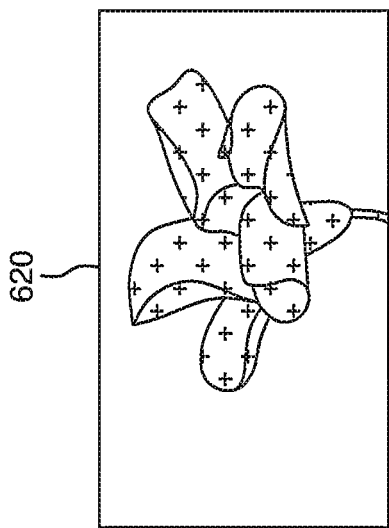

FIGS. 6A-6C are illustrations showing an example set of images of linearly blended MFPs before redistribution according to some embodiments. FIGS. 6A-6C illustrate three linearly blended MFPs 600, 610, 620 before redistribution. The images illustrate that redistribution preserves high frequency components (details) of each focal plane, while bringing low-frequency components to areas originally with no information (appearing as a solid white "fill" pattern).

Figure 6F:
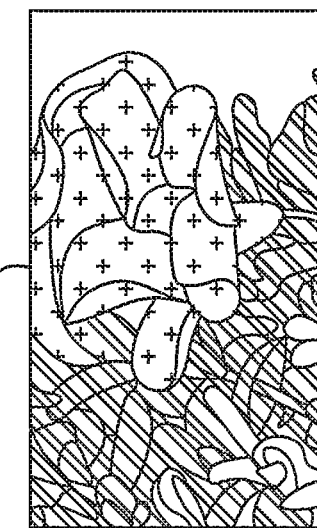

FIGS. 6D-6F are illustrations showing an example set of images of redistributed MFPs according to some embodiments. FIGS. 6D-6F illustrate redistributed versions 630, 640, 650 of the same MFPs shown in FIGS. 6A-6C. Image resolution in both examples is 436×157 pixels. Specifically, with FIGS. 6D-6F, a Gaussian filter with a radius of 20 pixels, both horizontally and vertically, was used in low-pass filtering with high frequencies obtained as a complement. In accordance with one or more embodiments, redistribution may be used to reduce disocclusions (holes) in virtual viewpoint changes. In some embodiments, the purpose of redistribution may be different, and low frequencies may be distributed differently.

Stereoscopic 3D (S3D) displays or TV systems have not gained popularity due several reasons. For example, when seeing S3D content, viewers are prone to VAC, which degrades viewing experience and limits depth perception by disparity. Also, VAC becomes more prominent with generally enlarging display sizes and reducing relative viewing distances. Further, the incompatibility of glasses based and glasses free viewing is reducing S3D viewing as a shared or social experience, especially when watching TV. To see S3D content, all spectators need to wear (typically shutter) glasses, prone to VAC. Largely due to the above-mentioned reasons, monoscopic displays are still widely preferred over S3D alternatives. Patents and applications that are understood to attempt to address some of the issues include U.S.

Pat. No. 8,730,354, U.S. Patent Application No. 2013/0183021, and U.S. Patent Application No. 2014/0192281.

Figure 7:
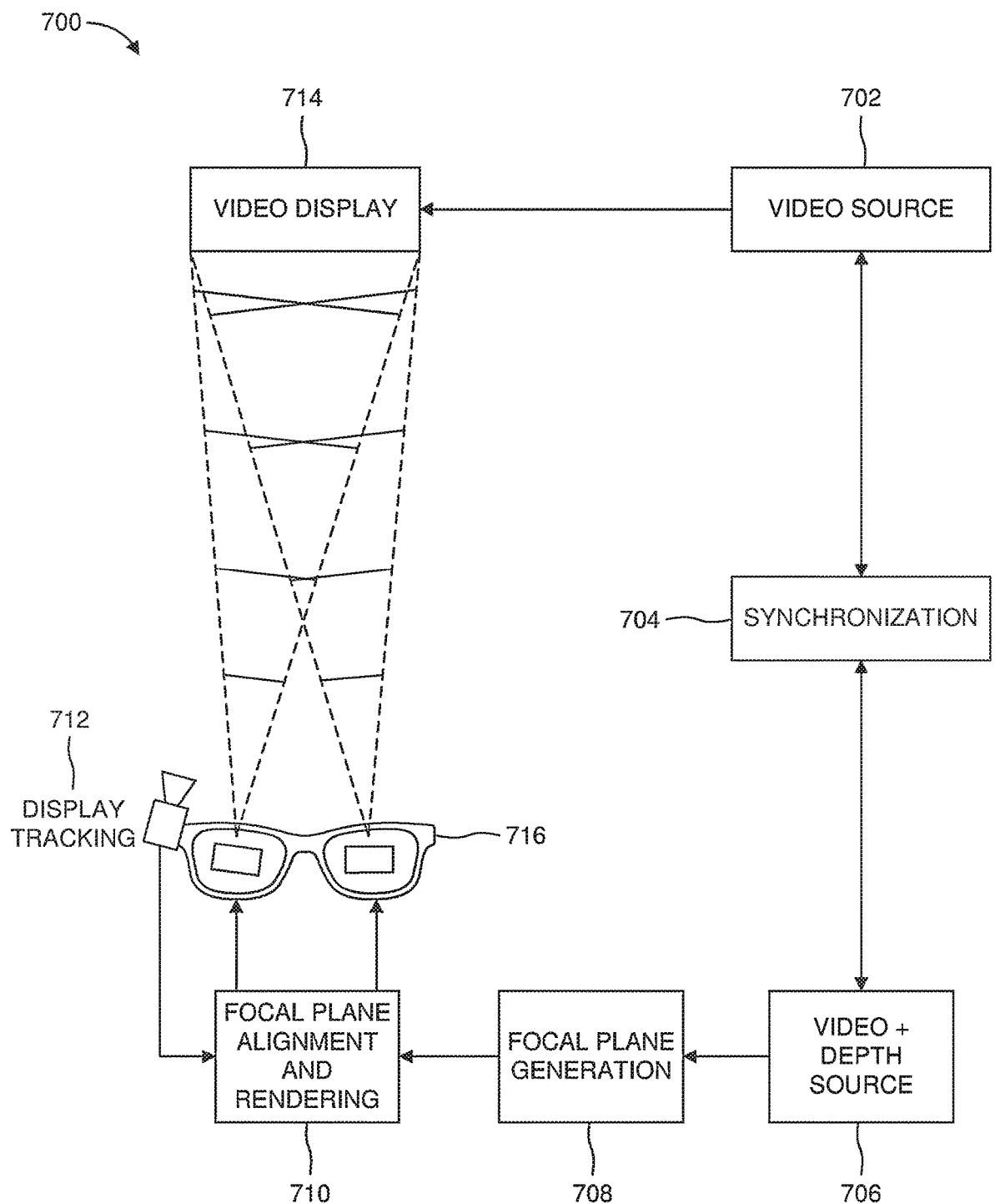
FIG. 7 is a process diagram illustrating an example MFP generation, alignment, and rendering process according to some embodiments.

FIG. 7 is a process diagram illustrating an example MFP generation, alignment, and rendering process according to some embodiments. Some embodiments may be directed to enhancing a normal monoscopic display image with stereoscopic focal planes to provide that a user perceives a 3D effect and is able to naturally accommodate to the 3D content. FIG. 7 illustrates a block schema 700 of a system in accordance with one or more embodiments.

More specifically, a video display 714 is shown with wearable glasses 716 in viewing vicinity. The wearable glasses include a display tracking device 712 that is coupled to a focal plane alignment and rendering block 710 that receives information from display tracking device 712 and provides the focal plane alignment and rendering 710 to each glass of the wearable glasses. A video source 702 may provide video information to a synchronization block 704, and receive timing information back from block 704. In the exemplary arrangement 700, the synchronization block 704 also may receive video and depth information from block 706 and correspondingly send timing information back to block 706. In the exemplary arrangement, the synchronization block 704 compares the timings of both video source 702 and video and depth source 706, and provides both blocks with information for synchronizing their outputs (for which purpose they have adjustable length signal delays). The block 706 outputs synchronized video and depth information to a focal plane generation block 708, which may be also coupled to focal plane alignment and rendering block 710. The video display 714 correspondingly receives synchronized video information from the video source 702. In an alternative arrangement for 700, instead of block 704 determining the timing of outputs from blocks 702 and 706, for example block 702 may determine the timing, i.e. act as the master for synchronization.

In some embodiments, enhancing of the content is enabled by using wearable glasses (near-eye display), which detect and track the content on the screen being viewed, and overlay the content with focal planes producing depth and disparity. Because the same content is shown simultaneously on the external display in 2D, the content may be viewed with or without glasses.

For some embodiments, the 3D video information 706 may comprise texture and/or depth information. For some embodiments, the content shown on the 2D display 714 may be synchronized (e.g., via a synchronization module 704) with the received 3D video information (or vice versa, such that either one may act as the master). For some embodiments, the process of receiving depth data corresponding to the captured video data may include receiving the depth data and video data corresponding to the content shown on the 2D display. For some embodiments, the video source 702 may be retrieved from a network, such as a broadcast network. For some embodiments, the 3D video information 706 may be retrieved from a network, such as an add-on service network. For some embodiments, the video source 702 may be synchronized with respect to the 3D video information, with either one being the master controller.

For some embodiments, a process (such as a process 700 shown in FIG. 7) may be performed by a mobile device including a hand-held multiple focal plane-enabled mobile phone. For some embodiments, a process (such as a process 700 shown in FIG. 7) may be performed by a mobile device including a head-mounted display.

Figure 8:
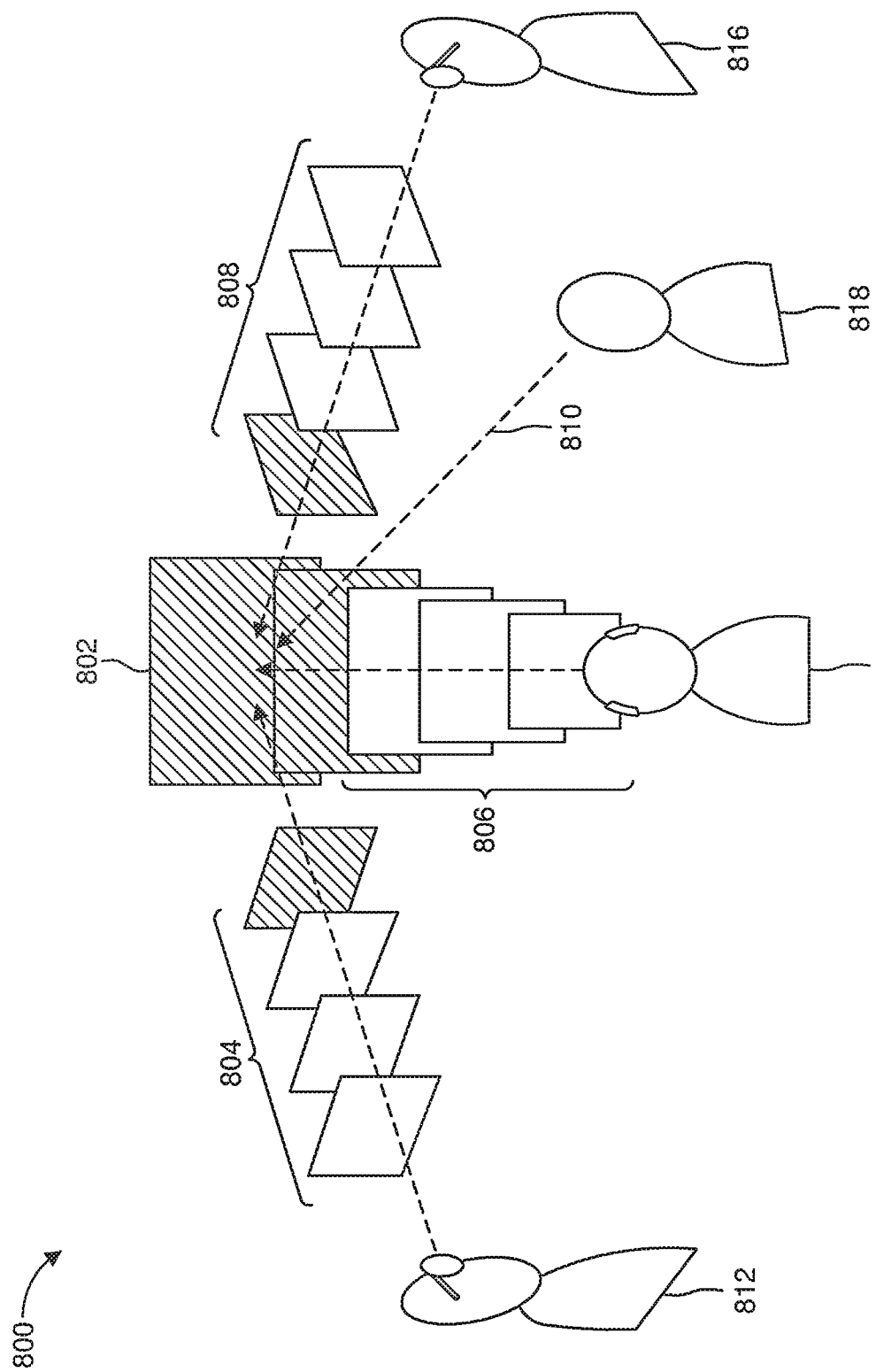
FIG. 8 is a schematic perspective view illustrating an example MFP viewing scenario according to some embodiments.

FIG. 8 is a schematic perspective view illustrating an example MFP viewing scenario according to some embodiments. Three persons 812, 814, 816 are shown wearing MFP glasses in accordance with some embodiments and see the display content in 3D. One spectator 818 sees 810 conventional monoscopic 2D video content on the display 802. Geometry of the focal planes 804, 806, 808 shown to the three persons 812, 814, 816 wearing the MFP glasses are aligned (skewed) along the respective perspective to the display 802. For some embodiments, the screen 802 that displays 2D video content may be part of a real-world scene 800.

Figure 9:
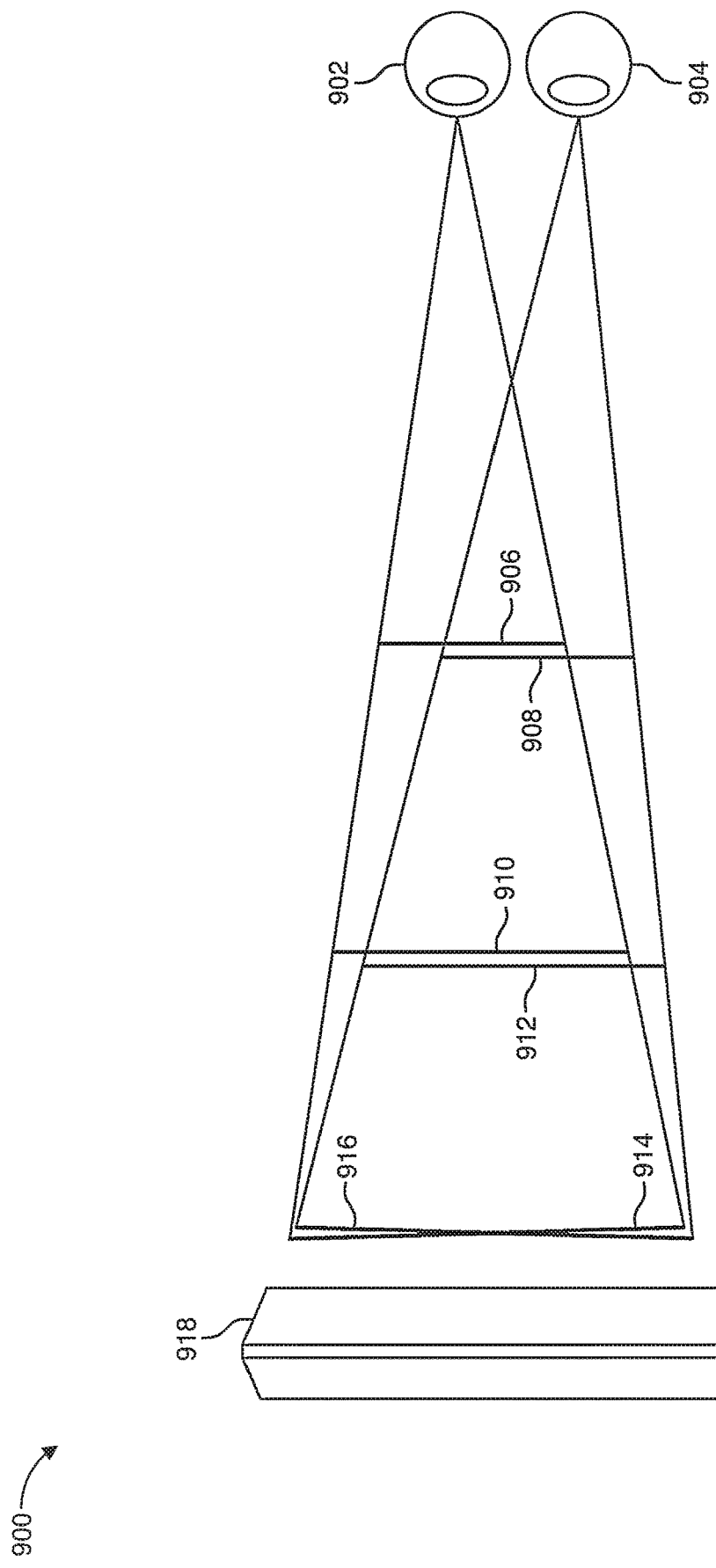
FIG. 9 is a schematic plan view illustrating an example viewing of focal planes for each eye according to some embodiments.

FIG. 9 is a schematic plan view illustrating an example viewing of focal planes for each eye according to some embodiments. Some embodiments may support stereopsis by providing a separate set of focal planes formed and rendered similarly for each eye. As shown, FIG. 9 illustrates two eyes 902, 904 and separate focal planes 906, 908,910, 912, 914, 916 adding 3D cues over a monoscopic 2D image (video) on an external display 918 (for example a TV set). Some embodiments for forming and rendering of high frequency focal planes are given for one eye only, although the process may be made separately for both eyes. In practice, the processes may have common stages.

Figure 10:
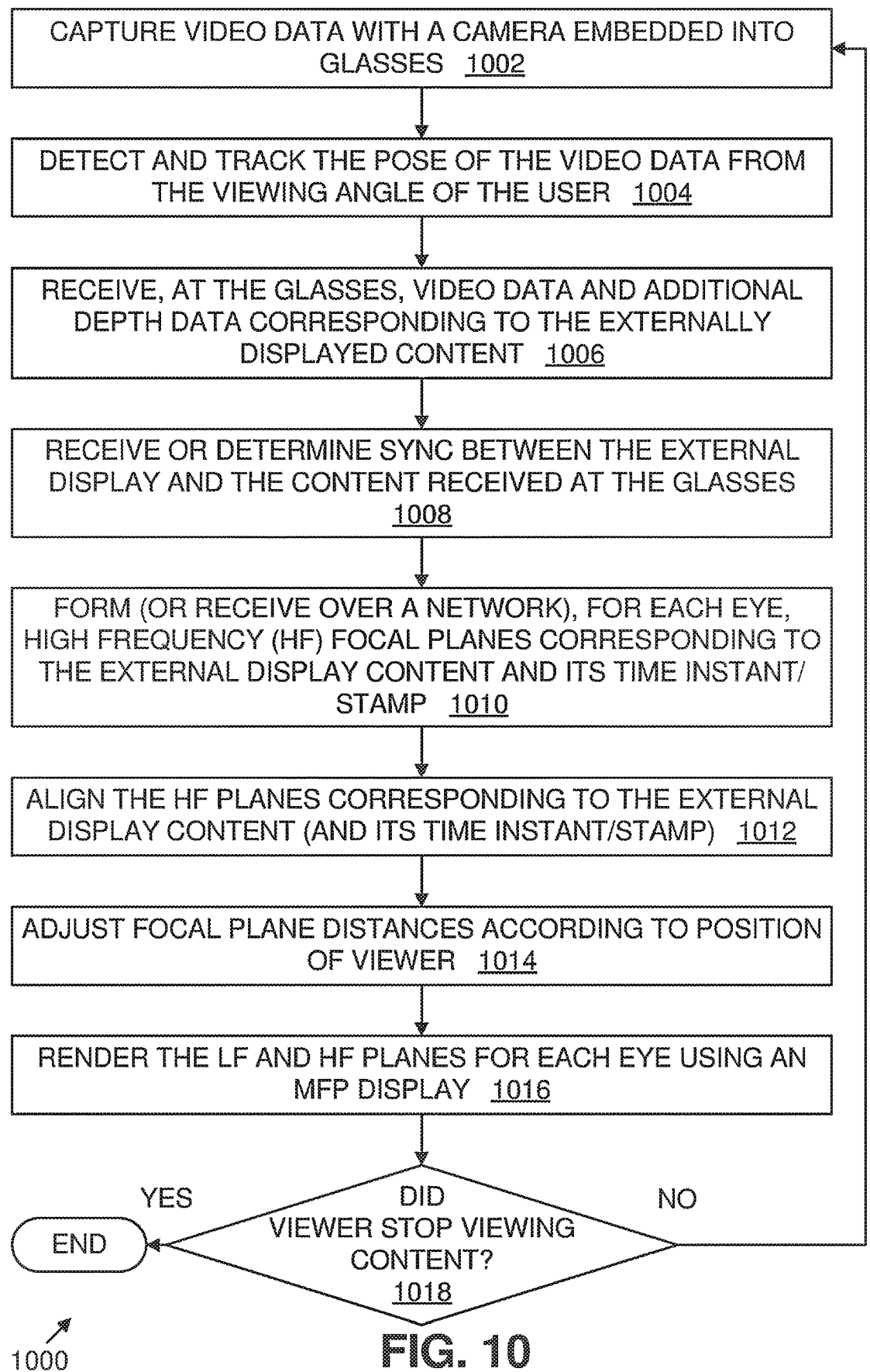
FIG. 10 is a flowchart illustrating an example process for MFP generation, alignment, and rendering according to some embodiments.

FIG. 10 is a flowchart illustrating an example process for MFP generation, alignment, and rendering according to some embodiments. The flow diagram illustrates one or more methods 1000 appropriate for some embodiments. In accordance with some embodiments, video data may be captured 1002 with a camera embedded to the glasses. The method 1000 continues with in some embodiments, detecting and tracking 1004 a pose of the video data from a user's viewing angle. The method 1000 continues with receiving 1006 to the glasses video data and additional depth data corresponding to the externally displayed content. For some embodiments, the video data may be received at the glasses substantially optically, from the external display. In some embodiments, the video data received at the glasses may be received entirely via an optical path, such that the user is directly seeing light from the external display passed to the user's eyes through optics in the user device. For some embodiments, the additional depth data corresponding to externally displayed content may be received over a network. For some embodiments, video data may be received at the glasses via a capture device, such as a camera built into the user device, such that the capture device captures the 2D imagery from its view of the external display, and the 2D imagery is displayed to the user via a display device built into the user device. For some embodiments, additional video data may be received over the network, and this additional video data supplements or replaces the imagery seen from (or captured from) the external 2D display. The method 1000 continues in some embodiments with receiving and/or determining 1008 the sync between the external display and the content received to glasses (e.g., content received over the network). In some embodiments, high-frequency focal planes (HF), for each eye, corresponding to the external display content and a time instant/stamp may be formed 1010 or received over a network.

The method 1000 continues with, in some embodiments, aligning 1012 the HF planes corresponding to the external display content and a time instant/stamp. In some embodiments, the method 1000 adjusts 1014 focal plane distances according to a viewer's position. In some embodiments, the low frequency (LF) and high frequency (HF) planes may be rendered 1016 for each eye using an MFP display. The method 1000 may determine 1018 if the viewer stopped viewing the content. If the viewer is still viewing the content, the method 1000 returns to capture 1002 video data. Otherwise, the method ends.

In some embodiments, near-eye display glasses may have a camera embedded that captures the content displayed on the screen. The pose, meaning position, orientation and size, of the screen may be, with respect to the screen, in some embodiments, calculated based on the captured content. In some embodiments, tracking the screen enables the 3D content to be displayed from varying viewing distances and angles. Characteristic for some embodiments is that a major part of the viewed content may be received from the external display, either optically through the near-eye display structure, or as a variation in some embodiments, by capturing the content by a camera embedded to the glasses.

Some embodiments provide for synchronizing in time, geometry, and brightness, the latter expressed for example by luminance and contrast values, the external content received optically to the glasses with the additional focal planes received over the network or generated from depth data or focal plane information received over the network. Based on the display pose tracking, in some embodiments, the distance of the viewer from the display may be computed. Further, in some embodiments, focal plane distances may be adjusted to provide correct accommodation cues.

In some embodiments, a three-dimensional (3D) effect is created by displaying for the user a 3D scene projected to a set of focal planes from the viewing angle and a distance corresponding to his/her viewpoint. In some embodiments, 3D information to display on MFP glasses is transmitted over a network and processed or formed electronically before rendering to the focal planes. In some embodiments, each eye has its own focal planes stack. In some embodiments, a method provides for spatially multiplexing a stack of 2D displays, while (spatially) rendering the visible parts of corresponding multifocal image frames.

For some embodiments, the process 1000 (as with any of the processes disclosed herein in accordance with some embodiments) may, e.g., be performed by an apparatus that includes a processor and a non-transitory computer-readable medium storing instructions that are operative, when executed by the processor, to perform the process 1000. For some embodiments, the apparatus may be configured to perform one or more of the methods described herein.

For some embodiments, a modified process (which may be performed by an HMD) may include: capturing video data with a camera coupled to a multi-focal plane (MFP) display; detecting a viewing angle with respect to a two-dimensional (2D) display present within the captured video data; receiving depth data corresponding to the captured video data; forming a plurality of high-frequency focal planes corresponding to content shown on the 2D display using the depth data; and rendering, via the MFP display, the plurality of adjusted high-frequency focal planes and one or more low-frequency focal planes.

For some embodiments, an example apparatus may include a camera, a multi-focal plane display; a processor, and a non-transitory computer-readable medium storing instructions that are operative, when executed by the processor, to perform a method disclosed herein.

For some embodiments, an example process may include detecting an asymmetry of the content displayed on the screen, wherein displaying the overlay may include adjusting the plurality of focal plane images based on the asymmetry of the content.

For some embodiments, another example process may include: determining an original depth field for the real-world scene; and adjusting, based on the metadata, a portion of the original depth field corresponding to the identified content to produce an adjusted depth field, the identified content corresponding to an object or image pattern recognized in the image, such that the plurality of focal plane images may be generated using the adjusted depth field.

In general, one challenge with seeing monoscopic content on screen is that users may lack many important cues for 3D perception. When viewing S3D content, users are prone to vergence-accommodation conflict (VAC), which degrades viewing experience and limits depth perception by disparity. In some embodiments, methods include decomposing and rendering the views as focal planes on an MFP display to support natural accommodation. Some embodiments include enabling users to perceive 3D without VAC. VAC becomes more prominent with generally enlarging display sizes and reducing relative viewing distances. In some embodiments, by mitigating the VAC, different display sizes, including larger display sizes may be enabled.

Typically, to see S3D content, spectators need to wear (typically shutter) glasses. Using shutter glasses and a time-multiplexed display reduces S3D viewing as a shared or social experience, as for example a S3D TV cannot be watched properly with bare eyes. According to some embodiments, users may watch a monoscopic video (such as a program on TV) normally, with bare eyes, and other users may effectively see the same display and content in 3D.

In some embodiments, the viewing experience is not degraded for users (temporarily or for other reasons) unwilling/unable to wear glasses and avoids VAC for those viewing with 3D glasses. In some embodiments, both compatibility and quality to viewing situations is improved. While doing so, some embodiments may alleviate the lack of popularity of current S3D displays and services (such as TV, virtual reality, and 360-degree videos and services).

Some embodiments include receiving enhancing, high-frequency focal plane information at glasses over network, without the monoscopic base layer. In some embodiments, detection and tracking of the base display is made by an embedded camera in the glasses, and the base layer information is seen optically (OST) through the glasses display. For some embodiments, referring to FIG. 11, the base layer 1102, for example, may be received from a network, or by capturing optically or by a camera 1116 from a screen 1114 or, e.g., any combination of these.

In some embodiments, only high-frequency content for focal planes needs to be received and rendered in glasses. In some embodiments, the overlaying focal plane information does not make any change to the average luminance or color of the base layer, thus the glasses are transparent. In some embodiments, overlaying focal plane information includes providing that the layered near-eye display structure is able to both attenuate and (actively) lighten certain parts of the view. In some embodiments, the attenuation and lightening of certain parts of a view is performed, for example by OLED display technologies. In some embodiments, MFP display manufacture is performed by allowing some attenuation of the overall luminance and generating focal planes by modulating their attenuation by more conventional LCD-structures.

Figure 11:
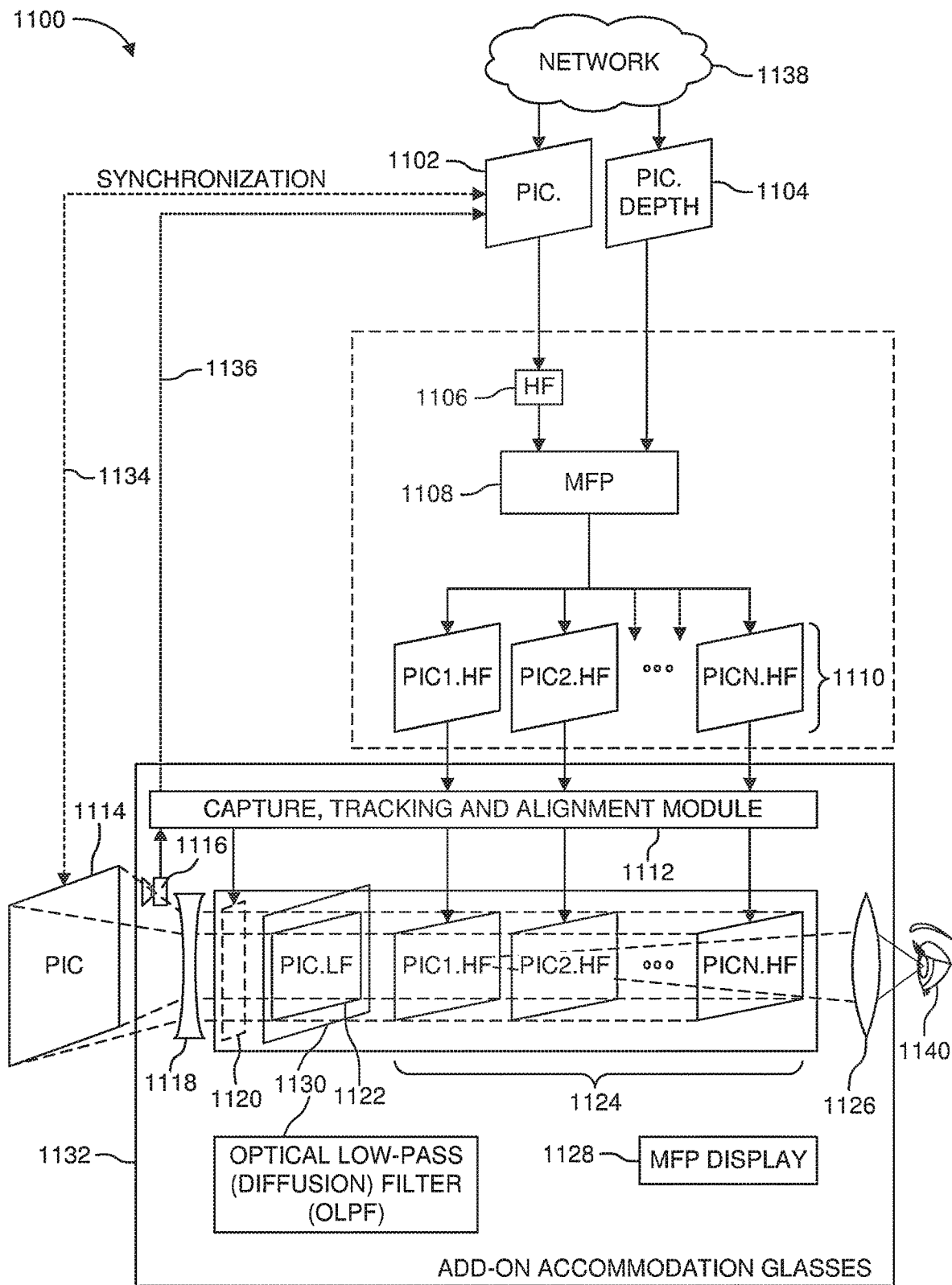
FIG. 11 is a schematic process diagram illustrating an example optical see-through MFP generation, alignment, and rendering process according to some embodiments.

FIG. 11 is a schematic process diagram illustrating an example optical see-through MFP generation, alignment, and rendering process according to some embodiments. A process 1100 according to some embodiments is illustrated, including processing of the low frequency (LF) and high frequency (HF) components. In FIG. 11, two options are shown for receiving an input image ("PIC") 1102. For some embodiments, an input image 1102 (and image depth data 1104 for some embodiments) is obtained via a network connection 1138 (for example, over a metadata channel). For some embodiments, an input image 1102 (and image depth data 1104 for some embodiments) is obtained 1136 by capturing the contents from an external display 1114 by a tracking camera 1116.

According to some embodiments, an input image ("PIC") 1102 is received by the process 1100 and is filtered to form the HF components 1106 to be decomposed into focal planes. In some embodiments, the process 1100 includes forming a low frequency version (LF) and subtracting the low frequency version (LF) (not shown) from an original image 1102 to obtain the high frequency component 1106. In some embodiments, the process 1100 includes requiring image components to be complementary to enable summing up to an original image 1102 (also known as partition of unity).

In some embodiments, the high pass filtered (HF) image is received as an input, and high frequency components may be decomposed in block MFP 1108 into focal planes (MFPs) at varying distances relating the viewer and the scene, corresponding to high frequency components' distances in the scene indicated by the received depth map 1104. In some embodiments, a depth map 1104 captured from the original view may be received. In some embodiments, a depth map is not needed, if, e.g., high frequency focal planes are formed already in the transmitter, and brought to the receiver together with data on their positions (distances in depth) in the scene. In some embodiments, depth blending, such as by interpolation methods, may be used to support accommodation between the discrete focal planes. Depth blending methods such as interpolation are discussed in Akeley and in Hu, X., & Hua, H., *Design and Assessment of a Depth-Fused Multi-Focal-Plane Display Prototype,* 10 (4) IEEE/OSA J. DISPLAY TECH. 308-316 (2014).

In some embodiments, generating MFPs 1108 may include requiring partition of unity, which results in a chosen number of focal planes at chosen distances, in the same quadrilateral geometry as the input images. The output 1110 of the MFP forming step 1108 includes N high frequency images, pic1.hf, pic2.hf, . . . picN.hf. Generating high-frequency (HF) components 1106 and generating MFPs 1108 may be considered a single block in some embodiments.

The set of images pic1.hf, pic2.hf . . . picN.hf 1110 are received, in some embodiments, by the capture, tracking and alignment module block 1112, which may include reception by a computational low-pass filter (such as an optical low-pass filter (OLPF) 1130). In some embodiments, the geometry of high-frequency focal planes 1124 may be changed according to the viewpoint of the user 1140 to the external HW (or projected) display 1114. In some embodiments, the process 1100 uses a tracking camera 1116 shown in FIG. 11 as an input to the capture, tracking and alignment module block 1112 and computational low-pass filter (for example in effect implementing the function of an optical low-pass filter (OLPF) 1130). A computational filter may be used to generate one or more low-frequency focal planes 1122. In some embodiments, assisting sensors (e.g., Inertial Measurement Unit (IMU) or alike) capture a view containing the environment and the external display 1114 in each position and orientation with respect to the viewer 1140. In some embodiments, the display area and its geometry are detected from a captured view, and the geometry of the focal planes 1124 are aligned to overlay with the display area 1120. For some embodiments, the generated high-frequency focal planes 1110 are shown with an arranged geometry 1124. In some embodiments, detection and tracking of the display area, and the corresponding geometry transformations are made continually and in real-time. As will be appreciated by those of skill in the art with the benefit of this disclosure, the transformation generally requires mathematics, as described herein.

Some embodiments provide for assuming that the same monoscopic content shown on the external display 1114 (such as "PIC" shown in FIG. 11) is also available to the add-on accommodation glasses 1132 over a network 1138. In addition, in some embodiments, a depth map ("PIC.DEPTH" in FIG. 11) 1104 corresponding to the monoscopic (texture) image is available to the glasses 1132 but, e.g., is not required for an external display 1114.

In some embodiments, a first formation of a low-pass version of the optically seen external display is shown as pic.lf 1122. In some embodiments, pic.lf 1122 approximates a low-frequency component (LF), which may be complementary to the high-frequency component (HF) 1106 and illustrated as pic1.hf, pic2.hf . . . picN.hf 1110, 1124. The low-pass component 1122 may be, in some embodiments, a low frequency version formed using a suitable optical diffuser or low-pass filter element (OLPF) 1130 used to form low pass filtered version 1122 of the optically seen content 1114. Rather than being absorbed, in some embodiments, incoming light is scattered or diffused by the low-pass filter element (see, e.g., the website Photographic Filter, WIKIPEDIA visited 3, (last May 2019), available at en.wikipedia<dot>org/wiki/Photographic_filter #Diffusion).

In some embodiments, for a user to see the view outside the external display area undistorted (unfiltered), the filtering needs to be used only within the detected display area, which could be accomplished by an active optical element. In some embodiments, a passive diffuser is applicable, if filtering of the whole view is acceptable. Note that in the latter case, after overlaying the high frequency contents, only the area inside the display is seen sharp.

In some embodiments rendering of the focal planes may be synchronized 1134 with the corresponding content on the external display 1114. In some embodiments, synchronization 1134 uses timestamps from both sources, synchronizing (marker) patterns embedded in the external video, and/or a content identification approach, as described in, for example, U.S. Patent Application No. 2013/0183021.

As described, FIG. 11 provides an optical see-through (OST) variation, that, in some embodiments, includes optical components, such as an eyepiece near the eye, and objective lens(es) towards the external display. FIG. 11 illustrates a direct optical path along a viewing axis as shown by the eye on the right and multiple focal plane images at various depths. FIG. 11 is a schematic illustration for the propagation of light rays through main system components, and is not meant to be detailed or accurate regarding an optical structure. For some embodiments, add-on accommodation glasses 1132 may include, for each eye, an MFP display 1128 for showing focal plane images 1124, and optical lenses 1118, 1126. In some embodiments, implementations may use compact off-axis reflectors to position focal plane rendering displays more to the side in order to enable a flatter implementation. Compare, a free-form prism-based implementation described in U.S. Pat. No. 9,547,174. For some embodiments, a direct optical path may include use of reflectors for deviating the optical path sideways and/or transversally, in order to make a shallower display structure.

For some embodiments, each of the plurality of focal plane images (such as PIC1.HF, PIC2.HF, . . . , PICN.HF 1110) may include high-spatial-frequency image information for an associated image depth. For some embodiments, the high-spatial-frequency image information may include accommodation cues for focusing at varying distances. For some embodiments, metadata corresponding to a captured or received image may include timing information used to synchronously align the displayed plurality of focal planes with the 2D content. For some embodiments, displaying the plurality of focal plane images may include synchronously aligning the plurality of focal plane images with the 2D content using the timing information. For some embodiments, metadata corresponding to a captured or received 2D image content may include three-dimensional (3D) depth information for the 2D content, and the 3D depth information for the 2D content may include a time sequence of 2D depth maps synchronized to the 2D content. For some embodiments, metadata corresponding to a captured or received image may include timing information to enable synchronously aligning the displayed plurality of focal planes with the content and displaying the overlay may include synchronously aligning the plurality of focal plane images with the content using the timing information. For some embodiments, metadata corresponding to a captured or received image may include three-dimensional (3D) depth information for the content, and the 3D depth information for the content may include a time sequence of 2D depth maps synchronized to the content.

For some embodiments, displaying a plurality of focal plane images as a see-through overlay may enable a user to view the screen via a direct optical path. For some embodiments, an apparatus may include optical lenses (such as the optical lenses 1118, 1126 of FIG. 11) configured to adjust direct optical viewing of a screen external to the device or HMD; and an optical low-pass filter (such as the OLPF 1130 of FIG. 11), producing a low-pass filtered image 1122.

For some embodiments, an example process may include: detecting presence, spatial position, and orientation information of a 2D display; detecting presence, spatial position, and orientation information of 2D video displayed on the 2D display; receiving 3D video information corresponding to the 2D video content; synchronizing in time the 3D video information with the 2D video content; tracking the spatial position and orientation of the 2D display; decomposing the 3D video information into a plurality of focal plane images; filtering one or more of the plurality of focal plane images to remove one or more low frequency representations from the plurality of focal plane images; and displaying the plurality of focal plane images after filtering one or more of the plurality of focal plane images.

For some embodiments, the multi-focal plane display may be a near-eye multi-focal plane display. For some embodiments, an image of a real-world scene may include an image of content displayed on a screen external to the mobile device, and the overlay may include a see-through overlay. For some embodiments, a method may include capturing content with a camera 1116 attached to a wearable display device 1132. For some embodiments, displaying the overlay may enable a user to view the screen via a direct optical path. For some embodiments, an apparatus may include: one or more optical lenses configured to adjust direct optical viewing of a screen; and an optical low-pass filter.

Referring back to FIG. 10, details of a process 1000 in accordance with embodiments are described. In some embodiments, an external display is detected and tracked 1004 from the video being captured 1002 by a tracking camera in the glasses. A display area may be detected in some embodiments by the luminosity of the screen in the video, and knowledge on the size and geometry of the display area, when seen from varying viewpoints. In some embodiments, an outcome of video data capture is whether there is, or is not, a display in the view. In some embodiments, when detecting an external display with high enough probability, the captured video is passed to the next processing step.

In some embodiments, detection and tracking 1004 of the display area within the captured video may be based on the geometry and luminance of the screen and may be assisted by visual means (e.g. markers on or in relation to the display). Detection and tracking may also be assisted by, in some embodiments, electronic means in the glasses (IMU sensor or the like), and/or by data communicated between the display and the glasses. According to some embodiments, tracking the display uses, in effect, similar techniques as detection and tracking of visible markers (fiducials) in augmented reality. Marker tracking is a traditional approach in AR and is well supported by existing technologies. Similar to AR applications, accuracy and stability of tracking may generally be important for the disclosed systems in accordance with some embodiments.

In some embodiments, low frequency content, which makes up a major part of the viewed content, may be received 1006 optically through the near-eye display structure, or as a variation, by capturing the content by a camera embedded to the glasses, while additional video and depth information is received over a network. For some embodiments, HF video and depth may be received. In some embodiments, full video (LF and HF) plus depth may be received, and filtering may be used to remove the LF portion, corresponding to the optically received low frequency content. Additional content may, in some embodiments, be broadcasted by a content provider as part of TV broadcast stream or via Internet. In some embodiments, content may be delivered to the glasses using wireless techniques such as WIFI or Bluetooth.

In some embodiments, transferring additional video and depth information (which may be a sequence of texture plus depth images) may be via depth plus texture as a source format. In some embodiments, depth plus texture as a source format enables providing the monoscopic (texture) video and forming the required focal planes (such as low-pass filtering the texture image and decomposing the corresponding high-frequency components/planes in depth). Some embodiments provide for receiving readily formed focal planes via a dedicated channel and service. In addition to detecting and tracking the base display, some embodiments include providing for the receiving terminal (glasses) to know the channel/program/content being watched (and synchronize the two sources). For some embodiments, the base display may be image data that may be retrieved from a server, such as the picture data 1102 of FIG. 11. For some embodiments, the base display may be image data captured by a camera, such as the external display data 1114 captured by the camera 1116 of FIG. 11.

In some embodiments, part of the rendering includes synchronizing 1008 the focal planes with the corresponding content on the external display. Synchronizing, in some embodiments, may use time-stamps from both sources, synchronizing (marker) patterns embedded in the external video, or even, e.g., some content identification approach, as described in, for example, U.S. Patent Application 2013/0183021.

Synchronization is made normally by adjusting a variable delay (FIFO memory) so that signals to the external display and glasses are at the same phase when rendering. In practice, rendering of the content to the external display may be delayed with some fixed amount, and a variable delay for synchronizing the renderings may be implemented and controlled in the glasses (or in a separate receiver terminal, if used in the implementation). For the purposes of this disclosure, applicable ways to synchronize the two sources are considered familiar to an expert in the field.

In some embodiments, a method 1000 includes a procedure for forming 1010 high frequency focal planes using, inter alia, known methods for MFP formation, including depth blending. Differing from, e.g., some conventional approaches, however, in some embodiments, focal planes are formed for the high-frequency content of a part of the captured scene. In the following, a more detailed description for the required filtering operations according to one or more embodiment is provided.

As will be appreciated by one of skill in the art with the benefit of this disclosure, high frequency and low frequency components are complementary so that deriving either one also defines the other component by subtraction. In practice, the high frequency image used for forming focal planes (HF MFPs) may be produced in some embodiments by performing low-pass filtering (e.g., Gaussian filtering with adjustable radius or window) and subtracting the result from the original image. The low-pass filtered result may, in some embodiments, be coupled to the system optically from the external display, using the see-through property of an MFP display. The high-pass filtered result may, in some embodiments, be produced from the content captured by the camera from the external display.

Figure 12:
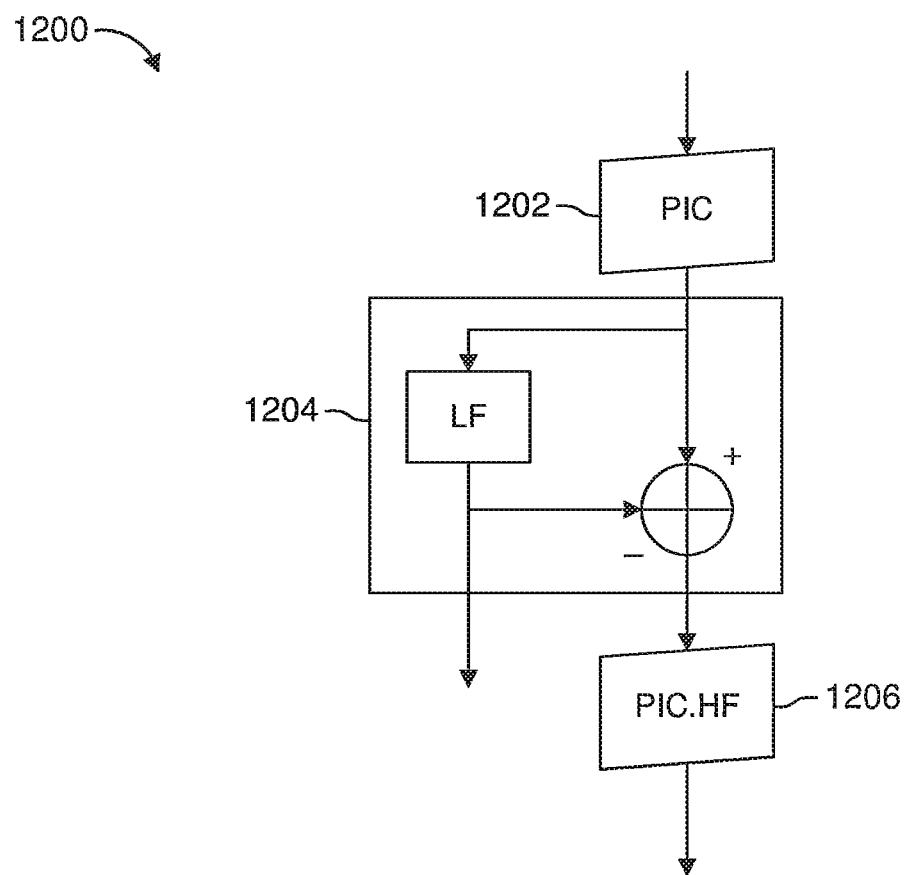
FIG. 12 is a process diagram illustrating an example filtering process according to some embodiments.

FIG. 12 is a process diagram illustrating an example filtering process according to some embodiments. An example practical implementation 1200 of high-pass filtering is shown. An image 1202 is received by a filtering process 1204 that processes the image 1202 with a low frequency, low pass filter and with a summer that subtracts the low pass filtered result from the image 1202 and provides a high frequency image (pic.hf) 1206.

More generally, the complementary filtering approach, in some embodiments, may be based on either high frequency or low frequency filtering. Both components may also be obtained directly with two separate filters, having complementary transfer functions in frequency domain. Note that as user's accommodation distance is not captured and known when rendering, a valid assumption is to use the same filter functions with all focal planes. Correspondingly, if a user's accommodation distance is captured and stored (not described for some embodiments), using different filter functions for each focal plane may be more optimal.

If MFPs are formed before filtering, in some embodiments, it is beneficial for the end result, that the filtering operation is applied only to those pixels which do not belong to the steep transitions between non-zero-valued (colored) areas and zero-valued (transparent or void) areas. On an individual focal plane image, a void area may show up as black, due to not adding any luminance. A filter type working well in practice is, in some embodiments, a so-called selective or guided filter, which does not filter image areas having bigger color differences than a set threshold. Due to the typically high contrast between colored and black areas, their borders are reliably detected, and the detection is not sensitive to the threshold value.

Figure 13:
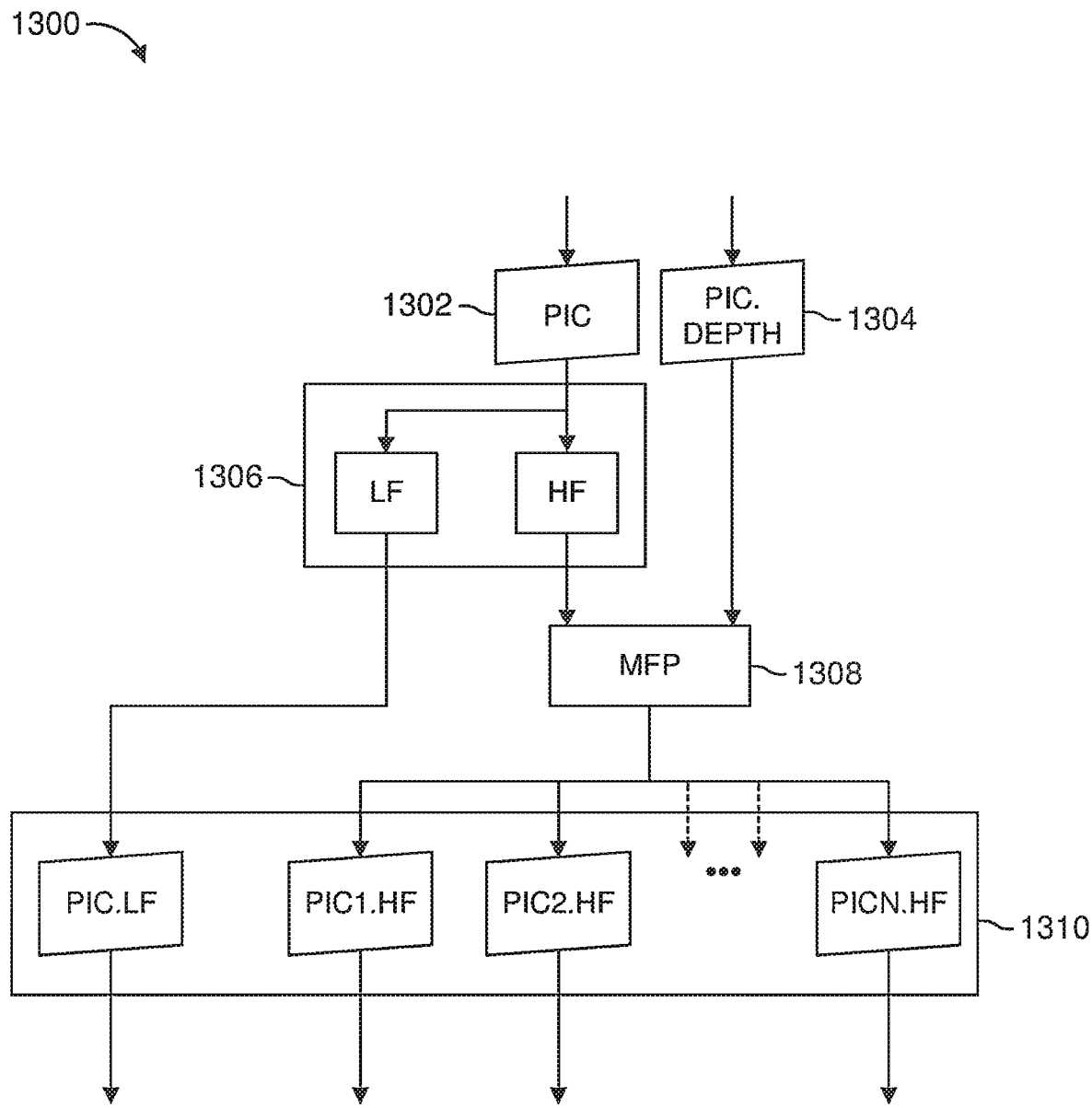
FIG. 13 is a process diagram illustrating an example MFP formation process according to some embodiments.

FIG. 13 is a process diagram illustrating an example MFP formation process according to some embodiments. A process diagram 1300 illustrates formation of the focal planes in accordance with some embodiments. As shown an image ("PIC") 1302 is provided to both a low pass filter and a high pass filter (LF and HF) 1306. The image depth map ("PIC.DEPTH") 1304 and the high frequency output are provided to an MFP block 1308. The output of the low-pass filter and the MFP block 1308 is shown as a series of 1+N focal planes PIC1.LF, PIC1.HF, PIC2.HF, . . . , PICN.HF 1310.

Partition of unity, meaning that the low and high frequency images may be summed up to (or close to) the original image, applies both if filtering an input image 1302 to its LF and HF components 1306 and if decomposing the HF component into a corresponding set of focal planes at step 1308. The description for forming and rendering low- and high-frequency focal planes 1310 has been given for one eye only, although a similar process may be performed for each eye. For some embodiments, a process may receive stereoscopic depth and texture data as input or start with virtual viewpoint generation using a mutual input, for example, using, e.g., known DIBR methods. In practice, one of skill in the art will appreciate that two parallel processes with corresponding steps are performed to align and render a separate (stereoscopic) set of focal planes for each eye.

For some embodiments, a process may include: low-pass-filtering the content (which may be, e.g., a 2D image of a display, a 2D image of a 3D real-world scene, or a 2D image of a 3D object); and displaying the low-pass-filtered content such that displaying the plurality of focal plane images displays the plurality of focal plane images as an overlay over the low-pass-filtered content. For some embodiments, filtering one or more of the plurality of focal plane images may include high-pass-filtering at least one of the plurality of focal plane images. For some embodiments, the 3D video information may include 2D texture information. For some embodiments, receiving depth data corresponding to the captured video data may include receiving additional 3D video information that includes 2D texture information.

Referring back to FIG. 10, some embodiments of a method 1000 provide for alignment 1012 of focal planes. Specifically, some embodiments provide that the separate low-frequency layer may be positioned rather freely within the supported depth-of-field (DoF). In some embodiments, positioning is (relatively) invariant for the low-frequency content/layer, which does not practically provide any depth cues.

For the same reason, when seeing the display from a sideways viewing angle, in some embodiments, it is enough to skew or align the low-frequency focal plane in 2D, discarding pixel position changes in the third, depth dimension. In some embodiments, the low-frequency plane may be considered perpendicular to the viewing axis. Correspondingly, the alignment of high-frequency focal planes may be made without changing their orientation with respect to the viewing axis (from the original perpendicular).

Note that viewing distance from the low-frequency content (and the external display) in some embodiments, may not vary independently of rendering the additional focal planes. Thus, the implementation of the MFP display used for rendering high frequency focal planes in the glasses may be affected in some embodiments. Note that fixed display and optics structure relates to fixed positions for focal planes. Various policies to adjust the positions of high-frequency focal planes with respect to viewing distance may be used in some embodiments. MFP display may be implemented, in some embodiments, to support variable rendering distances for the focal planes. For example, using variable-focal eyepiece and objective lenses could support variable rendering distances in some embodiments. Alignment of HF focal planes with the external display may involve solving in real-time the transformation between world coordinates and the observed coordinates.

Figure 14:
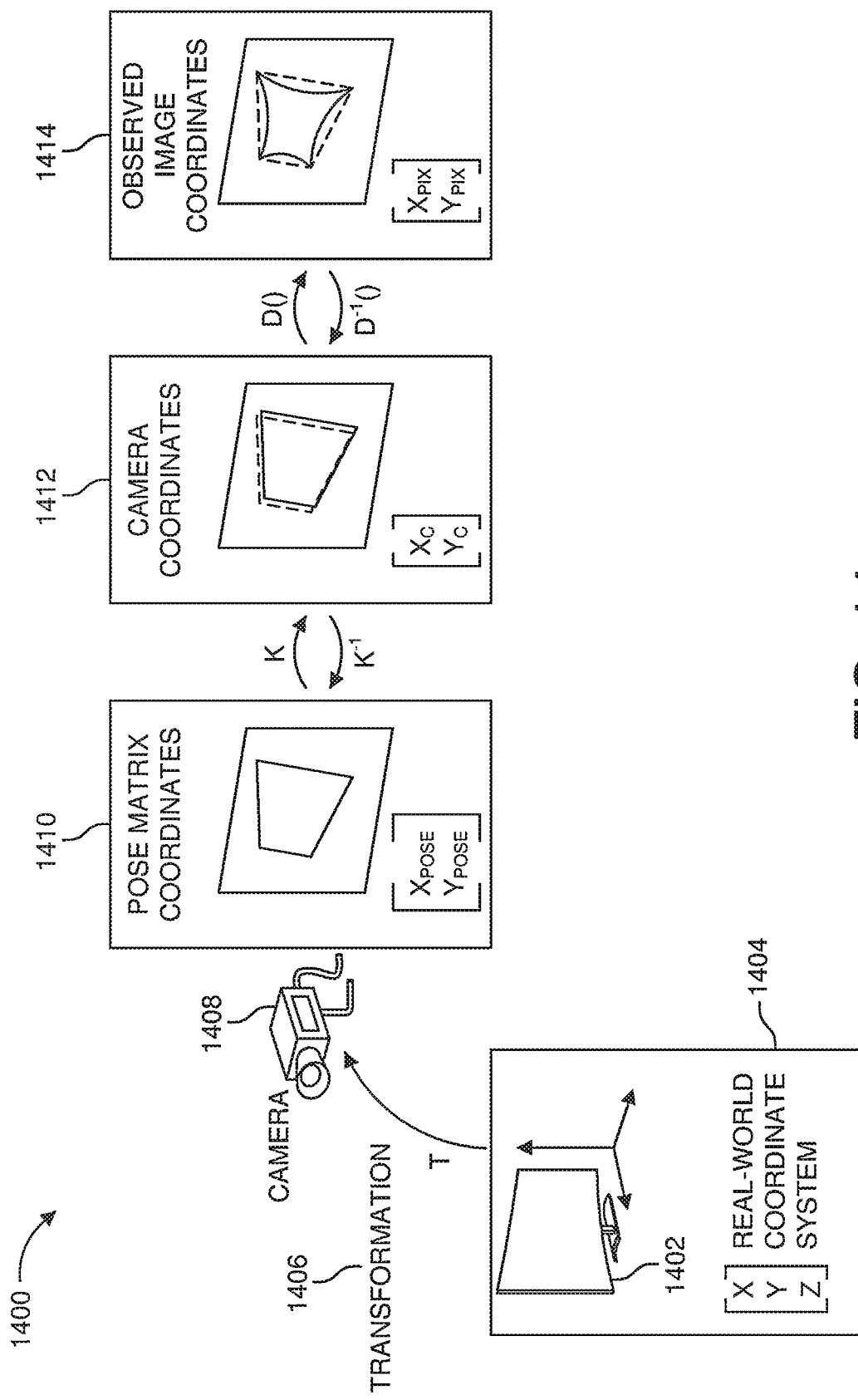
FIG. 14 is a process diagram illustrating an example image coordinate transformation process according to some embodiments.

FIG. 14 is a process diagram illustrating an example image coordinate transformation process according to some embodiments. A real-time solving of a transformation is illustrated in the flow diagram. As shown, FIG. 14 illustrates a tracking and transformation process 1400 that determines camera pose relative to real-world coordinates 1404 of a display 1402. For further generic information regarding transformations, see Sanni Siltanen, *Theory and Applications of Marker-Based Augmented Reality*, VTT SCIENCE 3 (2012).

In some embodiments, a relationship between real-world coordinates 1404 and observed image coordinates 1414 may be provided by, e.g., projective transformation or by homography, as shown in Eq. 1:

$$\begin{bmatrix} x_{pix} \\ y_{pix} \end{bmatrix} = D\left(KT\begin{bmatrix} x \\ y \\ z \end{bmatrix}\right) \quad \text{Eq. 1}$$

where, for some embodiments, T is the extrinsic camera matrix (also known as a transformation or pose matrix), K is an (intrinsic) camera calibration matrix, and D is a camera distortion function. D may be solved by a separate camera calibration stage, typically using specific calibration pattern plates. For some embodiments, a camera 1408 may perform a transformation 1406 to convert real-world coordinates $$\begin{bmatrix} x \\ y \\ z \end{bmatrix} 1404$$

into pose matrix coordinates $$\begin{bmatrix} x_{pose} \\ y_{pose} \end{bmatrix} 1410,$$

may perform a calibration conversion to convert pose matrix coordinates $$\begin{bmatrix} x_{pose} \\ y_{pose} \end{bmatrix} 1410$$

into camera coordinates $$\begin{bmatrix} x_c \\ y_c \end{bmatrix} 1412,$$

and may perform a distortion process to convert camera coordinates $$\begin{bmatrix} x_c \\ y_c \end{bmatrix} 1412$$

into observed image coordinates $$\begin{bmatrix} x_{pix} \\ y_{pix} \end{bmatrix} 1414.$$

Information on display pose may be used in some embodiments to render HF focal planes (additional 3D information) in right scale and perspective. Display pose may be derived, in some embodiments, by capturing (by the tracking camera in glasses), as a minimum, four (typically corner) points on the screen ($x_i$, i=1, 2, 3, 4) and solving Eq. 1 (homography), by using, for example, an iterative method. For more details of an iterative procedure, see, for example, Sanni Siltanen, *Theory and Applications of Marker-Based Augmented Reality*, VTT SCIENCE 3 198 (2012).

Note that, for simplicity, the above description omits the mapping required due to the tracking camera being physically aside from the (one or two) near-eye display stacks, and the corresponding optical paths. Deriving the whole transformation process, including this step, will be appreciated by those of skill in the art with the benefit of the present disclosure.

In addition to geometric adjustment, another adjustment according to some embodiments that may be performed at this process step is brightness (here both luminance and contrast) adjustment. Brightness adjustments may be used to compensate for: loss of brightness in the optical see-through coupling of the external display content (such as optical low-pass filter); loss of brightness in the MFP display stack/elements; and/or changes in the brightness settings for the external display (personal preferences, responses to ambient lighting).

For some embodiments, an example process may include identifying a spatial position of the screen, such that displaying the plurality of focal plane images includes aligning the plurality of focal planes with the spatial position of the screen. For some embodiments, the depth maps (which may be captured by a camera or received from a server, for example) may have a different resolution than the content (which may be, for example, a 2D image of a 2D screen captured by a camera, a 2D image retrieved from a server, or a 2D image of a 3D object captured by a camera).

For some embodiments, an example method may include detecting an asymmetry of the 2D content displayed on the screen, such that displaying the plurality of focal plane images includes adjusting the plurality of focal planes based on the asymmetry of the 2D content. For some embodiments, adjusting the plurality of high-frequency focal planes with respect to the viewing angle includes applying a transformation in real time, such as Eq. 1 for example. For some embodiments, a method may include identifying a spatial position of the screen, such that displaying the overlay includes aligning the plurality of focal planes to align with the spatial position of the screen.

The above alignment, in some embodiments, may be feasibly based on computationally deriving the tracked/captured display image properties and comparing the tracked/captured display image properties to the image received to the glasses over a network. In addition to automatic adjustment, brightness control may also be manual, in some embodiments. Not adapting or partially adapting to the external display brightness may show up either as relative attenuation or boost of high frequencies in the perceived 3D view. However, in some embodiments, the viewers may likely have some tolerance to these deviations.

Referring back to FIG. 10, in some embodiments, the method 1000 may include adjusting 1014 focal plane positions according to viewing distance. More specifically, depth-of-field of a 3D scene varies in some embodiments, and S3D representations are typically positioned both behind and in front of the display (for example, a stereoscopic pair or a texture associated with depth information). In stereoscopic content production, disparity (and depth, correspondingly) is limited in some embodiments between some commonly used, relatively small positive and negative values.

Note that in the figures, focal planes have been illustrated e.g., in front of the external display for simplicity. However, in some embodiments, especially if using existing stereoscopic or DIBR content, the focal planes may cover the depth range (depth map values) of both in front and behind the external display. Thus, in practice, MFP positions in accordance with some embodiments may be locked with respect to the external base display, irrespective of the viewing distance. For some embodiments, MFP positions may be adjusted with respect to the external base display to be proportional to the viewing distance.

Accordingly, some embodiments include requirements for the optical solution of the system. In some embodiments, as a user may want to see the content from varying distances, the properties of the optical components of the glasses, e.g., as shown in the eyepiece and objective lenses in FIG. 11, may be variable or selectable. In some embodiments, a user may search for a comfortable viewing position with respect to the display.

Optical components may also be replaced, in some embodiments, with variable-focal elements (e.g. liquid lenses), and an electronic or image-based measuring system for the viewing distance (e.g. when knowing the display dimensions, deriving the display distance from the tracking camera's video), to control the optics so that focal planes are rendered at desired distances. Note that adjusting eyepiece and objective optics does not necessarily require, in some embodiments, changes in the physical MFP display stack. Correspondingly, some embodiments, may or may not provide for using a time-multiplexed, vari-focal MFP approach. Some embodiments may not use a time-multiplexed vari-focal MFP approach, which may generally have the drawback of causing flicker and reduction of brightness. Such embodiments may be able to display focal planes at varying distances (with certain limitations) although using a fixed-structured focal plane display stack.

If the focal planes are positioned much aside of their real positions, in some embodiments, a vergence-accommodation conflict (VAC) may occur in spite of using multiple focal planes and an MFP display.

A human visual system (HVS), in some embodiments, favors placing focal planes at regular distances on dioptric scale. On the other hand, depth information is usually easiest to capture, in some embodiments, using a linear scale. Both options may be used in some embodiments of a system, if taken properly into account when forming focal planes and adjusting their distances for rendering. Use of either of these scales, and conversions between them will be appreciated by those of skill in the art.

In some embodiments, a method 1000 of rendering 1016 focal plane images in FIG. 10 is shown in FIGS. 15A-15E as a series of exemplary rendered focal plane images 1500, 1520, 1540, 1560, 1580.

Figure 15:
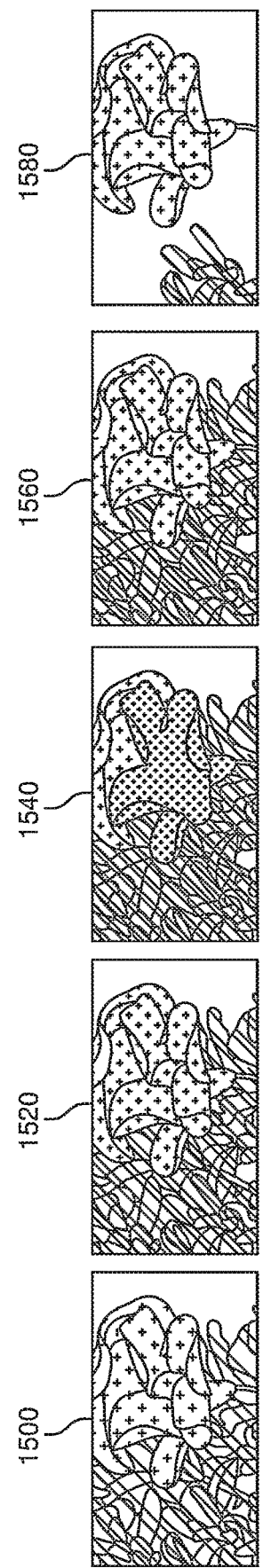
FIG. 15A is an illustration showing an example test image.
FIG. 15B is an illustration showing an example decomposing of the example test image of FIG. 15A into a low frequency focal plane according to some embodiments.
FIGS. 15C-15E are illustrations showing an example decomposing of the example test image of FIG. 15A into three high frequency focal planes according to some embodiments.

FIG. 15A is an illustration showing an example test image. FIG. 15B is an illustration showing an example decomposing of the example test image of FIG. 15A into a low frequency focal plane according to some embodiments. FIGS. 15C-15E are illustrations showing an example decomposing of the example test image of FIG. 15A into three high frequency focal planes according to some embodiments.

The image 1500 in FIG. 15A is the image seen on an external display. The image 1520 in FIG. 15B may be formed optically in the glasses, such as via an optical low-pass (diffusion) filter (OLPF). The three images 1540, 1560, 1580 of FIGS. 15C-15E may be high-frequency focal planes formed in the glasses. For some embodiments, the low-frequency focal plane 1520 and the high-frequency focal planes 1540, 1560, 1580 may be formed by a processor external to the glasses. The rendering sums up the low-pass filtered version and the three geometrically aligned high-frequency overlays to viewer's each eye.

Referring to FIGS. 11 and 15A-15E, for some embodiments, an original image (e.g., the image 1102 of FIG. 11 or the image 1500 of FIG. 15A) using depth data (e.g., the depth data 1104 of FIG. 11) may be decomposed into a low-frequency focal plane image (e.g., the low-frequency focal plane image 1122 of FIG. 11 or the low-frequency focal plane image 1520 of FIG. 15B) and a series of N high-frequency focal plane images (e.g., the series of N high-frequency focal plane images pic1.hf, pic2.hf, . . . , picN.hf 1124 of FIG. 11 or the series of N high-frequency focal plane images 1540, 1560, 1580 of FIG. 15C-15E). The decomposition process may include generation of a set of N depth weight maps such that the image is decomposed into a series of N+1 focal planes (e.g., a low-frequency focal plane plus N high-frequency focal planes) by weighting the high-frequency image by each of the depth weight maps. Depth weighting may be implemented also by a pixel-per-pixel weighting process. Both image-based or pixel-based approaches may use arithmetic operations and/or lookup table(s) for speeding up calculations).

In some embodiments, when a user moves or rotates his/her head a large amount, field-of-view for the glasses and/or the MFP display area may not be wide enough to show the whole overlays. A method in accordance with some embodiments, provides for cropping and/or dropping the overlays when they are only partially covering the external display.

Cropping the overlays, in some embodiments, combines knowledge from the detection and tracking of the base (marker) display and the properties (especially field of view) of the add-on glasses. Calculations for the mask or crop is basic geometry as will be appreciated by those of skill in the art with the benefit of this disclosure.

Figure 16:
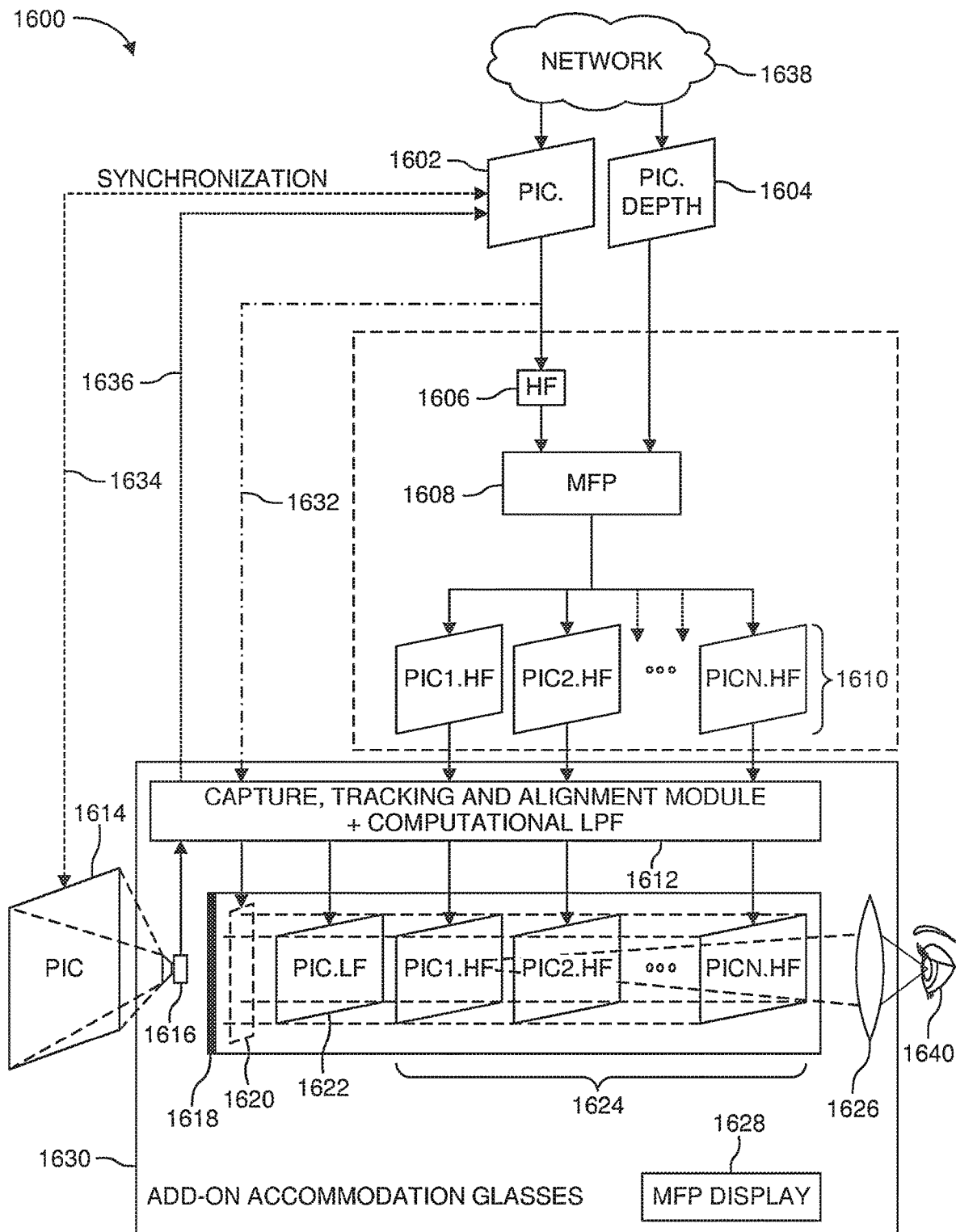
FIG. 16 is a process diagram illustrating an example video see-through MFP generation, alignment, and rendering process according to some embodiments.
Figure 17:
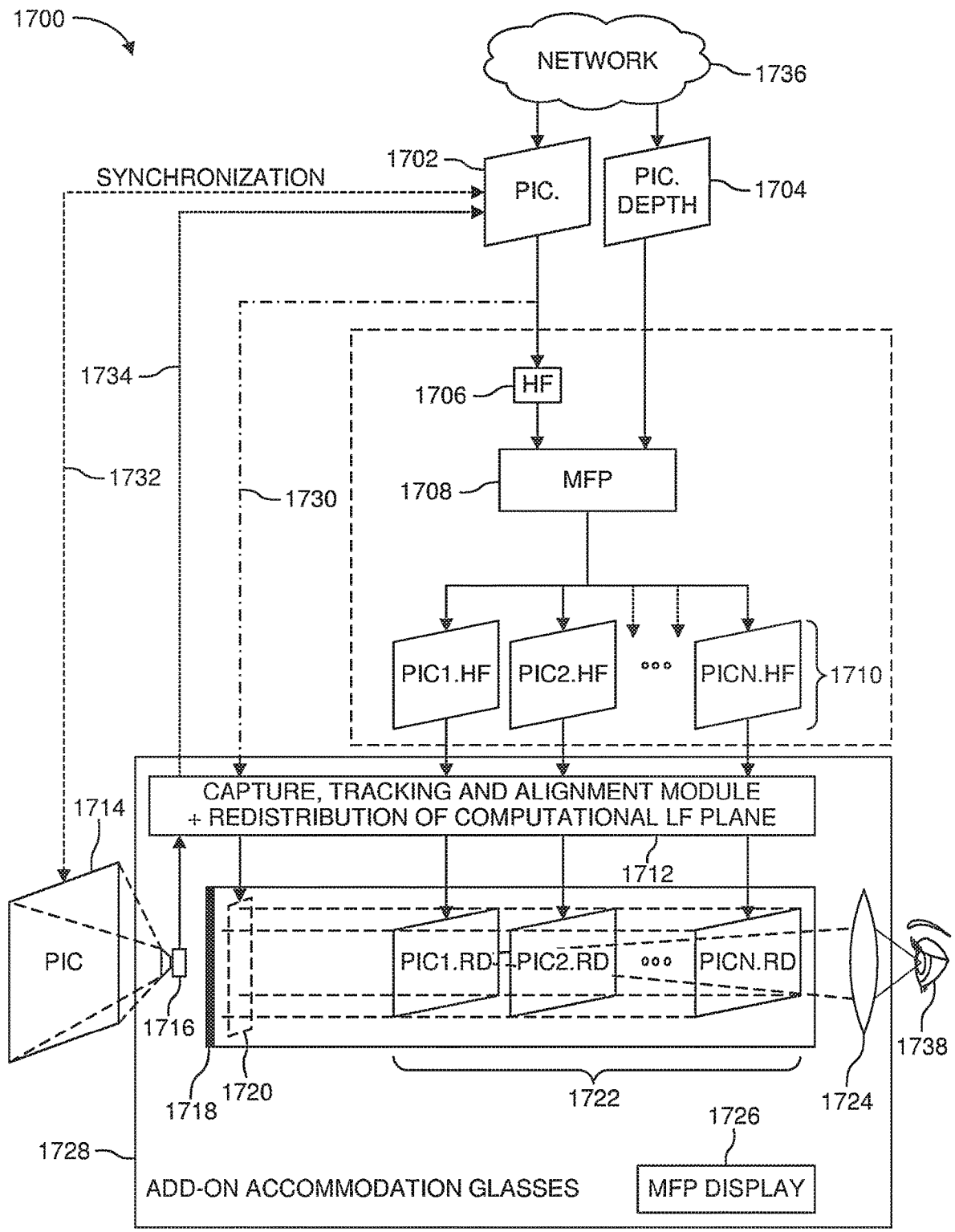
FIG. 17 is a process diagram illustrating an example video see-through MFP generation, alignment, and rendering process according to some embodiments.

Referring to FIGS. 16 and 17, two options for a video see-through (VST) variation are shown in accordance with some embodiments. As shown, the enhancing focal plane information 1622, 1624, 1722 may be available in some embodiments, in an electronic form in the glasses 1630, 1728. Note, however, that the base layer 1602, 1702 in some embodiments, may be, e.g., received via a communication channel, via, e.g., a local receiver or directly from a broadcast service, or e.g., may be captured by a camera 1612, 1636, 1712, 1734 by a camera 1616, 1716 from the external display 1614, 1714. In FIGS. 16 and 17, signal paths for the latter options are shown by dashed arrows 1636, 1734. For some embodiments, focal planes 1622, 1624, 1722 may be displayed as a see-through overlay synchronized and aligned with 2D content on display 1614, 1714. For example, such a see-through overlay may be one or more plane images, rendered in depth, and displayed to a user's eye 1640, 1738. A see-through overlay may be a series of one or more focal plane images that are optically rendered (positioned and displayed) to create an impression of distance within the user's eyes. For some embodiments, geometric alignments 1620, 1720 may be used to align each of the focal planes (LF and HFs) with an external display 1614, 1714. For example, geometric alignment 1620 may be the output of the module 1612 for aligning the LF focal plane 1622 and HF focal planes 1624.

In some embodiments, an embedded camera 1616, 1716 in the glasses 1630, 1728 performs the detection and tracking of the external display 1614, 1714. If the base layer 1602, 1702 is not received through a communication channel, in some embodiments, the base layer 1602, 1702 may be captured 1612, 1636, 1712, 1734 from the external display 1614, 1714 as part of a tracking process. In FIGS. 16 and 17, dashed arrows 1636, 1734 show signal paths for a captured base layer option. In VST variations, low frequency focal plane/component 1622 may be formed computationally, and optical filter may not be used in some embodiments. Video-through options may in general, in some embodiments, give more flexibility to technical implementations.

FIG. 16 is a process diagram illustrating an example video see-through MFP generation, alignment, and rendering process according to some embodiments. In FIG. 16, a low-frequency (LF) component 1622 is formed computationally by capturing the external display 1614 by the tracking camera 1616. Note that instead of rendering one separate LF plane 1622 and N high-frequency focal planes 1624, in some embodiments, there is a further close variation in which the captured low-frequency component is distributed and summed to N redistributed focal planes 1722 as shown in FIG. 17, for example. In some embodiments, the alignment 1620, 1720 of focal planes 1622, 1624, 1722 may be according to the user's viewpoint to an external display.

For some embodiments, a process 1600 may receive a base layer image 1602 and depth data 1604. In some embodiments, the process 1600 may high-pass filter 1606 the image 1602 and may use depth data 1604 with the high-pass filtering output to generate in an MFP block 1608 a set of high-frequency multi-focal planes 1610. A capture, tracking, and alignment module 1612 may receive 1632 the picture 1602 for forming a low-frequency focal plane 1622 computationally and may receive the set of multi-focal planes 1610 to render the focal planes 1622, 1624 to an MFP display 1628. For some embodiments, a capture of content 1614 may be made with the camera 1616 for forming a low-frequency focal plane 1622. For some embodiments, an optical lens 1626 may be embedded in the glasses 1630 to enable the user 1640 to see a focused set of MFPs. For some embodiments, a backplate 1618 may be part of the glasses 1630, preventing optical see-through of images located at distances further away from the user 1640 than the location of the backplate 1618 relative to the user 1640. For some embodiments, the picture data 1602 may be synchronized 1634 with the images displayed on the external display 1614.

For some embodiments, a method may include capturing 2D content with a camera attached to a wearable display device (such as a head-mounted display). For some embodiments, a method may include capturing the image of the real-world scene with a camera attached to the wearable display device; and displaying the content, such that the image of the real-world scene includes an image of content displayed on a screen external to the mobile device and/or located within the real-world scene.

For some embodiments, generating a plurality of focal plane images creates a three-dimensional depth effect. For some embodiments, each of a plurality of focal plane images may include high-spatial-frequency image information for an associated image depth. For some embodiments, the high-spatial-frequency image information includes focus and distance cues.

FIG. 17 is a process diagram illustrating an example video see-through MFP generation, alignment, and rendering process according to some embodiments. Some embodiments of a process 1700 for forming and rendering redistributed MFPs may include getting image information (such as picture data 1702 and depth data 1704) over a network 1736. Such embodiments may be more independent than those requiring external see-through information. In some embodiments, a base image 1702 may be synchronized 1732 with display information 1714. Generally, synchronization may be needed if processing time of system 1600 is not stable. Time delays for the synchronization are not illustrated in FIG. 16 or 17, but can be understood as part of (memory circuits for) image sources, for example 1614 and/or 1602 (and 1604, as the depth maps, may generally need also to be synchronized, although not shown in the diagram) in FIG. 16. In some embodiments, receiving information over a network 1736 enables viewing of different content than what is on the external display 1714. In some embodiments, receiving information over a network 1736 enables switching to an independent mode, and avoiding tracking and aligning to an external display. For example, if a user 1738 goes outside a TV room and wants to continue seeing the program using a default geometry and size, switching modes enables continuous content delivery.

For some embodiments, a process 1700 may receive an image 1702 and depth data 1704. In some embodiments, the process 1700 may high-pass 1706 the image 1702 and may use depth data 1704 with the high-pass filtering output to generate in an MFP block 1708 a set of high-frequency multi-focal planes 1710. A capture, tracking, and alignment module 1712 may receive 1730 the picture 1702 for forming computationally a low-frequency focal plane to be distributed to a received set of multi-focal planes 1710, and to render the thus obtained redistributed focal planes 1722 to an MFP display 1726. For some embodiments, an optical lens 1724 may be embedded in the glasses 1728 to enable the user 1738 to see a focused set of MFPs. For some embodiments, a backplate 1718 may be part of the glasses 1728, preventing optical see-through of images located at distances further away from the user 1738 than the location of the backplate 1718 relative to the user 1738.

Figure 18:
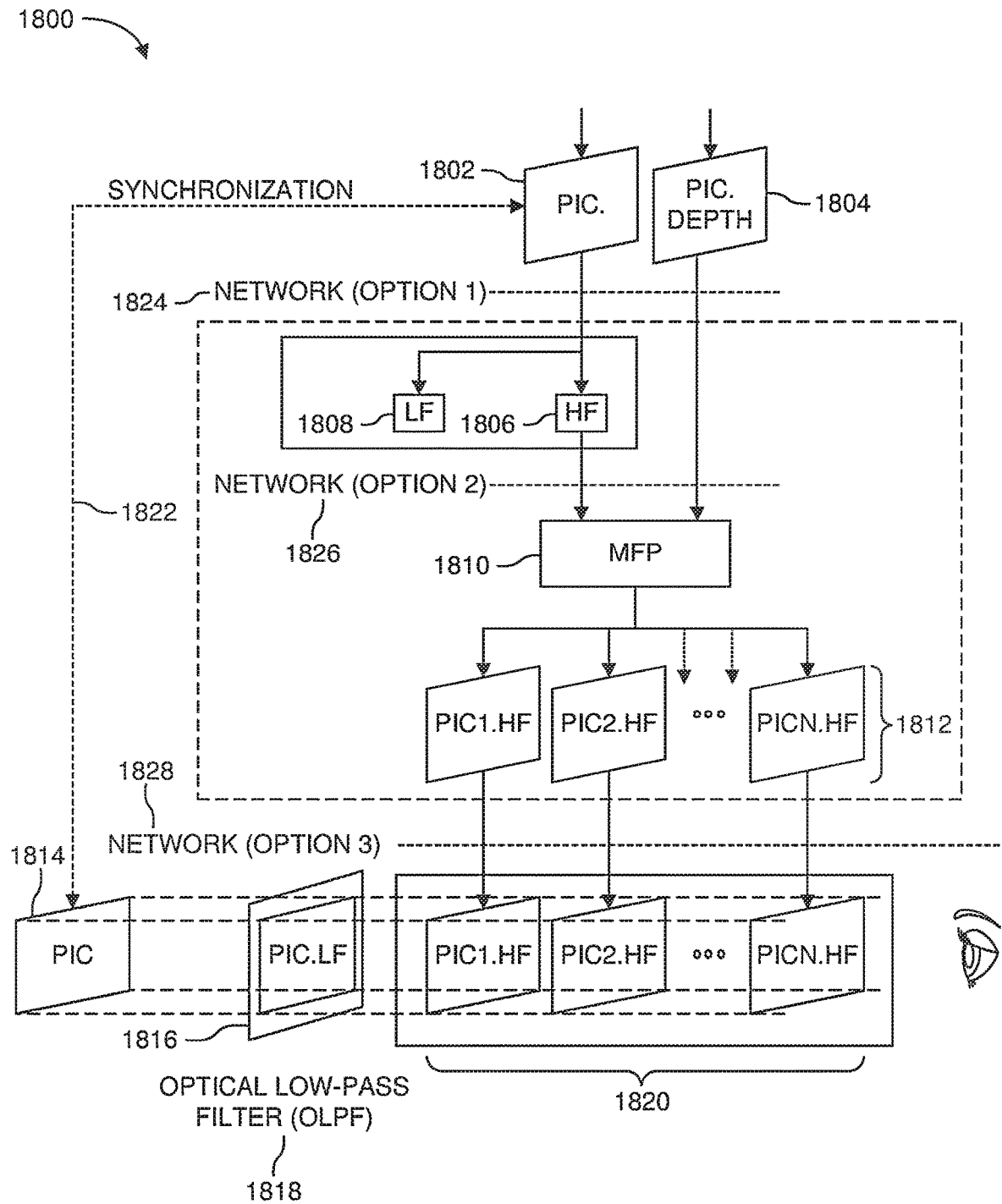
FIG. 18 is a process diagram illustrating an example optical see-through MFP generation, alignment, and rendering process according to some embodiments.

FIG. 18 is a process diagram illustrating an example optical see-through MFP generation, alignment, and rendering process according to some embodiments. In some embodiments, there are several options for data interfaces and distribution of system architectures. Some of these options are illustrated in the method 1800 shown in FIG. 18 for the optical see-through (OST) approach.

In Option 1 (1824), the glasses receive the information for forming the additional focal planes in commonly used depth plus texture format (e.g., image data 1802 and depth data 1804). Option 1 (1824) may include low-pass filtering 1808 and high-pass filtering 1806 of the image data 1802.

In Option 2 (1826), the glasses receive the already high pass filtered version of content, together with the depth map. For Option 2 (1826), the high-pass filter output and the depth data 1804 may be received by an MFP block 1810, which may output a set of N high-frequency images pic1.hf, pic2.hf, . . . , picN.hf 1812.

In Option 3 (1828), the glasses receive in advance formed high-frequency focal planes 1812. In this option 1828, focal plane formation is made, for example, in a local receiver or on a network server. For Option 3 (1828), a low-frequency focal plane 1816 may be generated by an optical low-pass filter (OLPF) 1818. For some embodiments, focal planes 1820 may be aligned in the glasses and may be modified from the inputs 1812. Note that, differing from FIGS. 16 and 17, the alignment is illustrated only by horizontal dashed lines connecting corners of focal planes with those of external display 1814.

Interfacing options 1824, 1826, 1828 are illustrated in FIG. 18 for optical see-through (OST) embodiments. More particularly, some embodiments are directed to variations forming stereoscopic viewpoints from one MFP stack. For each option 1824, 1826, 1828, full stereoscopy information (one set of image information for each eye) or a single set of information with virtual viewpoint generation (e.g., DIBR) may be used. For some embodiments, tradeoffs may be made between, e.g., quality, bitrates, processing power, and other related parameters. For some embodiments, image data 1802 may be synchronized 1822 with images displayed on an external display 1814. For some embodiments, 3D image information may include a plurality of high-frequency focal plane images. For some embodiments, receiving a plurality of high-frequency focal plane images may include receiving additional data for focal plane distances from a base layer image 1802, or corresponding (content on) external display 1814.

Figure 19:
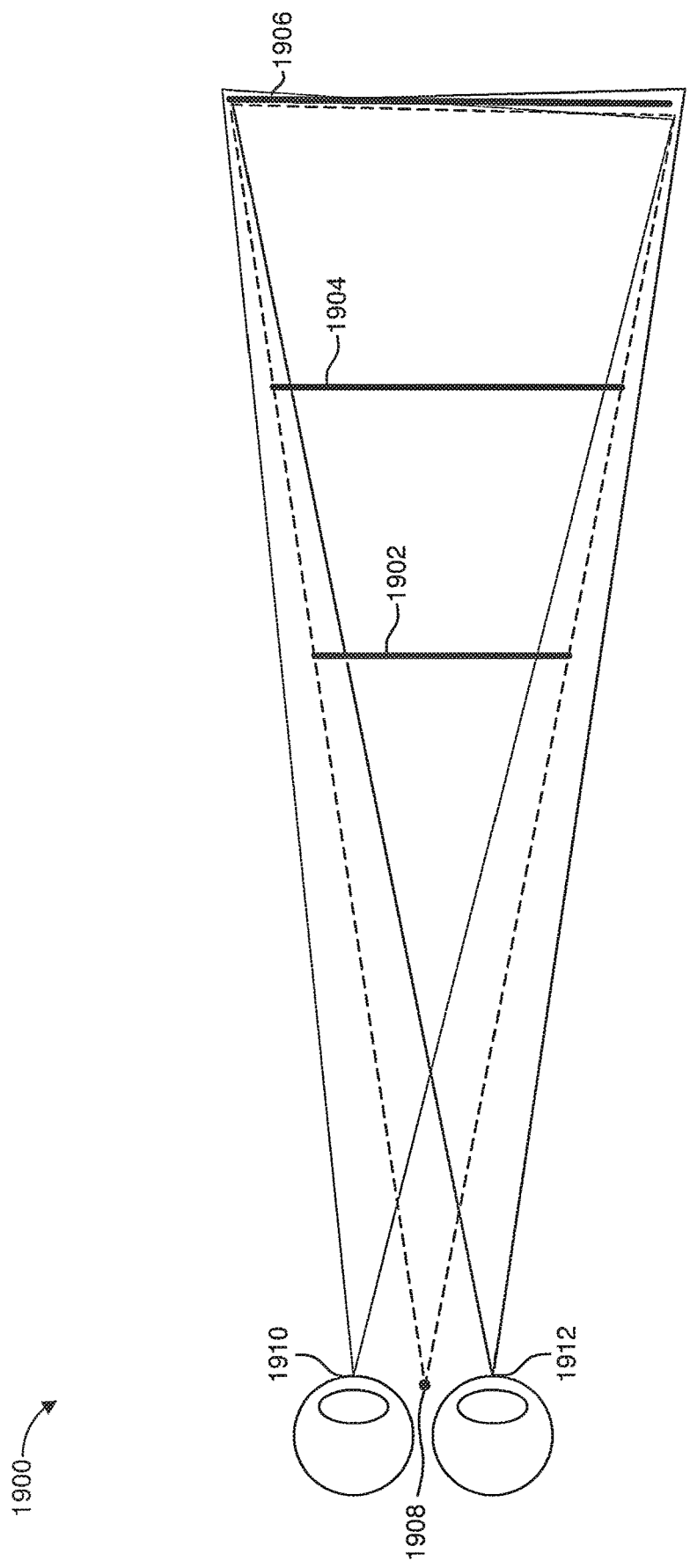
FIG. 19 is a process diagram illustrating an example shifting of focal planes to form different viewpoints for left and right eyes according to some embodiments.

FIG. 19 is a process diagram illustrating an example shifting of focal planes to form different viewpoints for left and right eyes according to some embodiments. Forming stereoscopic viewpoints from one MFP stack avoids the capture, transmission, and processing of two (stereoscopic) viewpoints with separate texture and depth. In some embodiments, a method includes capturing and sending depth and texture for one MFP stack only and forming stereoscopic (two) MFP stacks from this monoscopic stack by shifting.

Instead of the stereoscopic viewing situation shown in FIG. 9, the viewing situation 1900 is as shown in FIG. 19. In this variation, one stack of MFPs 1902, 1904, 1906 is formed (from the average eye-point 1908), and the same focal planes are shifted to form slightly different viewpoints for the left eye 1910 and the right eye 1912. For the right eye 1912, shown on the bottom, focal planes 1902, 1904, 1906 seem shifted to the left by an amount depending on the distance. Correspondingly, for the left eye 1910, shown above the right eye 1912, focal planes 1902, 1904, 1906 seem to be shifted to the right. Shifting a monoscopic stack of MFPs may thus be used to form two sets of focal planes, with synthetic but realistic disparity. In some embodiments, generating virtual stereoscopic viewpoints is made by 3D warping comparable to depth image-based rendering (DIBR). According to some embodiments, formed stereoscopic MFP stacks are rendered to an MFP display. According to some embodiments, formed stereoscopic MFP stacks are projected to form a stereoscopic image pair, and rendered to a stereoscopic display, for example if an MFP display is not available. The validity of the approach may be illustrated by forming stereoscopic image pairs from shifted MFPs. In some embodiments, focal stacks may include one low-frequency plane and N high frequency planes. For some embodiments, a method may include forming a stereoscopic stack of two pluralities of high-frequency focal plane images by shifting the plurality of high-frequency focal plane images if the plurality of high-frequency focal plane images is a monoscopic stack. For some embodiments, shifting a monoscopic stack of MFPs may include shifting in lateral and/or transversal directions compared to a depth axis. If synthesizing motion parallax, shifting focal planes along a depth axis and scaling of focal planes corresponding to the direction and amount of axial shift may be made.

Figure 20A:
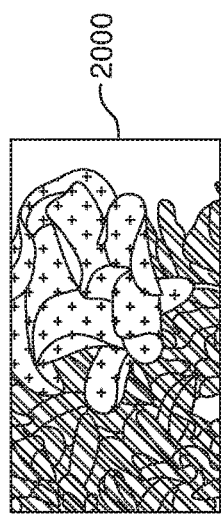
FIG. 20A is an illustration showing an example test image.
Figure 20E:
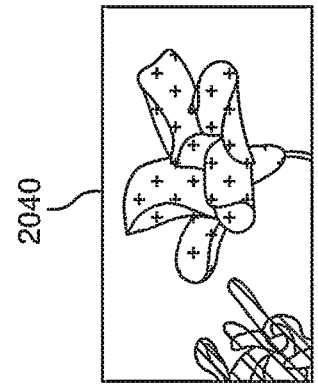
FIGS. 20C-20E are illustrations showing an example decomposing of the example test image of FIG. 20A into three high frequency focal planes according to some embodiments.
Figure 20D:
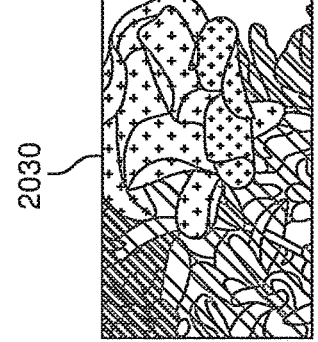
Figure 20C:
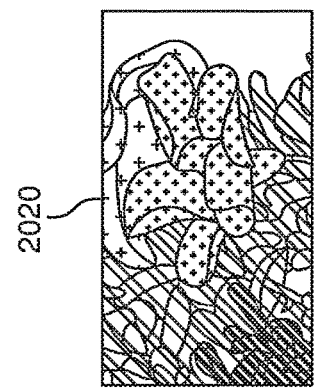
Figure 20B:
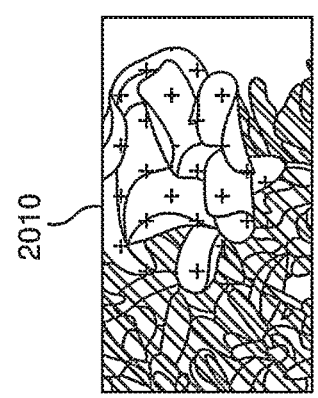
FIG. 20B is an illustration showing an example decomposing of the example test image of FIG. 20A into a low frequency focal plane according to some embodiments.
Figure 20G:
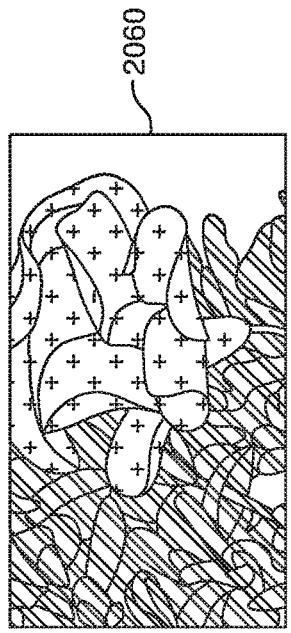
FIGS. 20F-20G are illustrations showing an example stereoscopic image pair synthesized using the decomposed focal planes of FIGS. 20B-20E according to some embodiments.
Figure 20F:
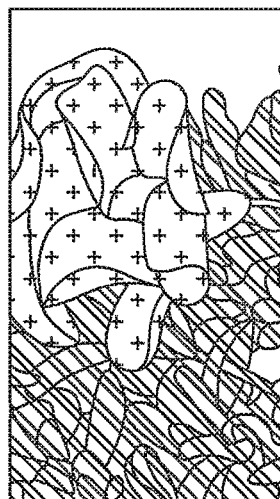

FIG. 20A is an illustration showing an example test image. FIG. 20B is an illustration showing an example decomposing of the example test image of FIG. 20A into a low frequency focal plane according to some embodiments. FIGS. 20C-20E are illustrations showing an example decomposing of the example test image of FIG. 20A into three high frequency focal planes according to some embodiments. FIGS. 20F-20G are illustrations showing an example stereoscopic image pair synthesized using the decomposed focal planes of FIGS. 20B-20E according to some embodiments. FIG. 20A shows an original test image 2000. FIG. 20B shows a low-frequency plane 2010 of the original test image 2000. FIGS. 20C-20E show high-frequency planes 2020, 2030, 2040 of the original test image 2000. FIGS. 20F-20G show a stereoscopic pair for crossed eyes, with the image 2050 for the right eye in FIG. 20F and the image 2060 for the left eye in FIG. 20G.

FIGS. 20F and 20G illustrate MFPs shifted by up to 6 pixels, corresponding to synthetic disparity of 2.76% of the image width. For printability, the high frequency plane values in FIGS. 20C-20E are multiplied by three pixels, and the zero level is shifted to 128. According to some embodiments, illustrating the result as a stereo pair does not enable natural (VAC free) accommodation, unlike if rendering the same MFPs to an MFP display.

Generally, however, in some embodiments, the above way of visualizing focal planes reveals effectively also their depth dependent properties and quality. When shifting, in some embodiments, differences in depth are namely transformed into stereoscopic disparity, for which human vision (HVS) is very sensitive. From a stereoscopic pair, again, these differences are accurately transferred back to 3D perception.

Referring back to the example of FIG. 8 illustrating people watching same TV set either with bare eyes (in 2D) or with new glasses (in 3D), the display structure supports 3D perception in accordance with some embodiments. Some embodiments provide methods and systems that will enable producers and users of 3D image content and services, as well as manufacturers of either wearable or tabletop displays to provide 3D content. Embodiments include providing 3D content to existing displays and services, e.g. TV broadcast. More particularly, some embodiments enable VAC-free perception, which may be supported in a compatible way with existing devices and content services.

As described above, some embodiments may provide an enhanced view of 2D content (e.g., as presented on an external 2D display) to a wearer of a head mounted display (HMD) device, based on identifying the 2D content, retrieving metadata to provide depth information associated with the 2D content, and processing the 2D content together with the metadata to generate and display in the HMD a multiple focal plane (MFP) representation of the content. For some embodiments, depth information may be obtained, for example, from a database (such as local or external storage) or an external server or device via a network. For some embodiments, depth information may be calculated (which may be performed locally to a device). For some embodiments, depth information may be generated in whole or in part. For some embodiments, depth information may be determined for an object or image pattern. For some embodiments, deriving 3D from 2D content may be made as, e.g., by some current S3D TV sets, and this 3D information (with synthesized depth data) may be used to display content.

In some embodiments, the same or a similar process may be used to add or modify depth information for real-world objects and imagery that are more generally encountered as the HMD user explores the world. That is, some embodiments may provide depth-enhanced views of real-world content that is not sourced from or that does not involve an external 2D display. Several use cases embodying such embodiments are described below.

As previously described, a user may be wearing an HMD which has a multiple-focal plane display capability. The HMD also may have a front-facing camera capable of capturing imagery of the scene in front of the user. The front facing camera may be a depth camera, for example. The HMD may use the front-facing camera to capture real-world imagery, and this imagery may be analyzed (e.g., using stored (e.g., "known") object or pattern recognition algorithms) to detect image patterns or objects for which depth enhancement may be used. The object or pattern recognition step may be performed, e.g., on the HMD device itself, on a computing device tethered to the HMD device, or on a remote computing device (e.g., "in the Cloud").

If an object or image pattern is detected for which depth enhancement may be available, the additional depth or modified depth for the object or image pattern may be determined. For example, the HMD may have rules for adding a depth offset to certain objects to make the objects appear closer to the user. Such objects may be made to "pop out" in the user's view. As another example, the HMD may have rules for adding different depth offsets to detected objects to make them appear further away from the user. These objects may recede into the background of the user's view, so that other objects which do not receive a depth offset adjustment may appear more prominently to the user.

The rules for detecting objects and for determining an added or modified depth for certain objects or classes of objects may be present and may be performed on, e.g., the HMD device, on a computing device tethered to the HMD device, or on a remote computing device (e.g. "in the Cloud"). For example, the depth enhancement information for a detected object may be determined by the HMD, or the depth enhancement information may be retrieved from a server using a query which identifies the object or object class.

The depth adjustment may be used to generate a modified depth field for the scene which adjusts the depth of one or more detected objects or image patterns within the user's view. The modified depth field may be modified from an original depth field determined by the HMD. For example, the original depth field may be determined using a depth camera of the HMD, or if the HMD has dual cameras, the original depth field may be determined using a depth from a stereo analysis of the dual captured images.

The modified depth field may be used to generate a multiple focal plane (MFP) representation of the real-world scene, which may be displayed to the user. Any of the various techniques previously described for generating an MFP representation of depth-enhanced content from a 2D external display may be used in a similar fashion to produce the depth-enhanced or depth-modified view of the real-world imagery. For some embodiments, the position and extent (visual footprint) of the detected object or image pattern to be enhanced may be tracked using the HMD camera similar to tracking the 2D external display described above for some embodiments. For some embodiments, the real world scene may be presented using an optical pass-through path, if the HMD has this capability, with additional high-frequency overlay MFPs generated to represent the depth information for the scene including the added or modified depth corresponding to the objects or image patterns for which depth enhancement was determined. In another case, the captured imagery from the HMD camera may be processed together with the modified depth field to generate the MFP representation. The MFP representation may have an explicit low-frequency focal plane (e.g., as shown in FIG. 13), or the low-frequency scene information may be distributed among the various focal planes as previously described (e.g., as shown in FIG. 17). For some embodiments, depth cues may be determined or detected for an image pattern or object identified in a captured video. For some embodiments, depth cues may include information regarding distance, focus, and/or texture. For some embodiments, the depth cues may include high frequency components of the image pattern. For some embodiments, the depth cues may reflect and/or indicate the modified depth field of the image pattern or object.

The above process may be performed continually (such as in a loop), so that certain objects may be continually updated with depth enhancements as the objects are encountered by the user while exploring the real world using the HMD device. The rules for which objects may be depth enhanced and how the depth of such objects may be adjusted, e.g., may be set by user preferences or may be part of the program logic (e.g., an application running on the HMD or on a connected computer may provide the rules or may use the rules as part of program execution). In some embodiments, the rules may include a list of objects or image patterns to be enhanced, information for identifying the objects or image patterns using an object recognition or pattern recognition algorithm, and a specification of how the depth of each object may be enhanced (e.g., a depth offset to add to the object's depth, or some other function for modifying or adjusting the depth of the object).

In a first example scenario, an HMD user is exploring an art museum. The museum provides an application which is capable of recognizing and classifying the museum's paintings and which interfaces to the user's HMD in order to provide depth enhancement functionality based on the user's preferences. The user specifies an interest in impressionist paintings by Edouard Manet and Pierre Auguste-Renoir. As the user walks around the museum, the front camera of the HMD captures imagery of the museum and an image recognition algorithm is used to identify and classify the paintings in the captured imagery. For each identified painting determined to be by Manet or Renoir, the depth field is modified to change the depth within the extent of the painting by three inches in the direction of the user. The modified depth field is used together with the real-world imagery to generate a multiple focal plane representation of the scene, which is then displayed to the user via the HMD. From the user's point of view, the paintings the user is interested to see "pop out" of the wall by 3 inches, while paintings by other artists may appear flat against the wall. In this way, the user may quickly identify the paintings which match the user's specified preference. Moreover, the enhanced depth effect may appear more natural to the user than if an artificial graphics outline or highlight were used to identify the paintings of interest.

In a second example scenario, an HMD user is building a model which has hundreds of plastic pieces. Instead of a paper instruction manual, the manufacturer of the model provides an instruction app which interfaces to the user's HMD to provide interactive instructions. The user spreads the model pieces on a table and runs the instruction app. A front facing camera captures imagery of the table and the plastic pieces, and object recognition is applied to the captured imagery to identify the next few pieces that the user will use to build the model. The depth of these next-needed pieces may be modified, e.g., so that they will appear to float slightly above the table. The depth of other pieces not yet needed may be modified, e.g., in the opposite direction so that the pieces not yet needed appear to recede slightly into the table. A modified depth field is generated, and the modified depth field is used together with the real-world imagery to generate a multiple focal plane representation of the scene, which is displayed to the user via the HMD. In this way, the user is able to identify easily the model pieces which are needed next in the instruction app, from among the many model pieces on the table.

In a third example scenario, an HMD user is reading a physical book, and the HMD provides a function to identify and depth-enhance words or text phrases entered by the user. The user is looking for a passage in which a character named Harold finds a treasure map. The user enters search terms "Harold" and "treasure map" into the user interface of the HMD, and the user proceeds to turn the pages of the book in the range of pages where he believes the passage to be. The HMD captures the imagery of the book pages using the HMD camera, and analyzes the imagery (e.g., using a text recognition algorithm) to identify instances of text "Harold" and "treasure map". If either of these two search terms are identified in the imagery, the depth field corresponding to the area of these identified terms is modified so that the words "pop out" of the book pages slightly. The modified depth map is used together with the captured imagery of the book pages to generate a multiple focal plane representation of the scene, which is displayed to the user via the HMD. In this way, the user may quickly identify where the search terms appear in the physical book pages, and the user more easily finds the passage for which the user is looking.

In a fourth example scenario, an HMD user is reading a physical book, such as a graphic novel with two-dimensional images on most pages. The HMD captures the images in the book using a camera attached to the HMD. The images may be analyzed, and depth information may be generated. The images with the depth information may be displayed to the user in the HMD so that the images appear three-dimensional. The generated depth map is used with the captured imagery of the book to generate a multiple focal plane representation of the scene, which is displayed to the user.

In general, some embodiments may be used to enhance or modify the depth of any real-world object or image pattern, which may be identified from imagery captured by the camera of the HMD.

Figure 21:
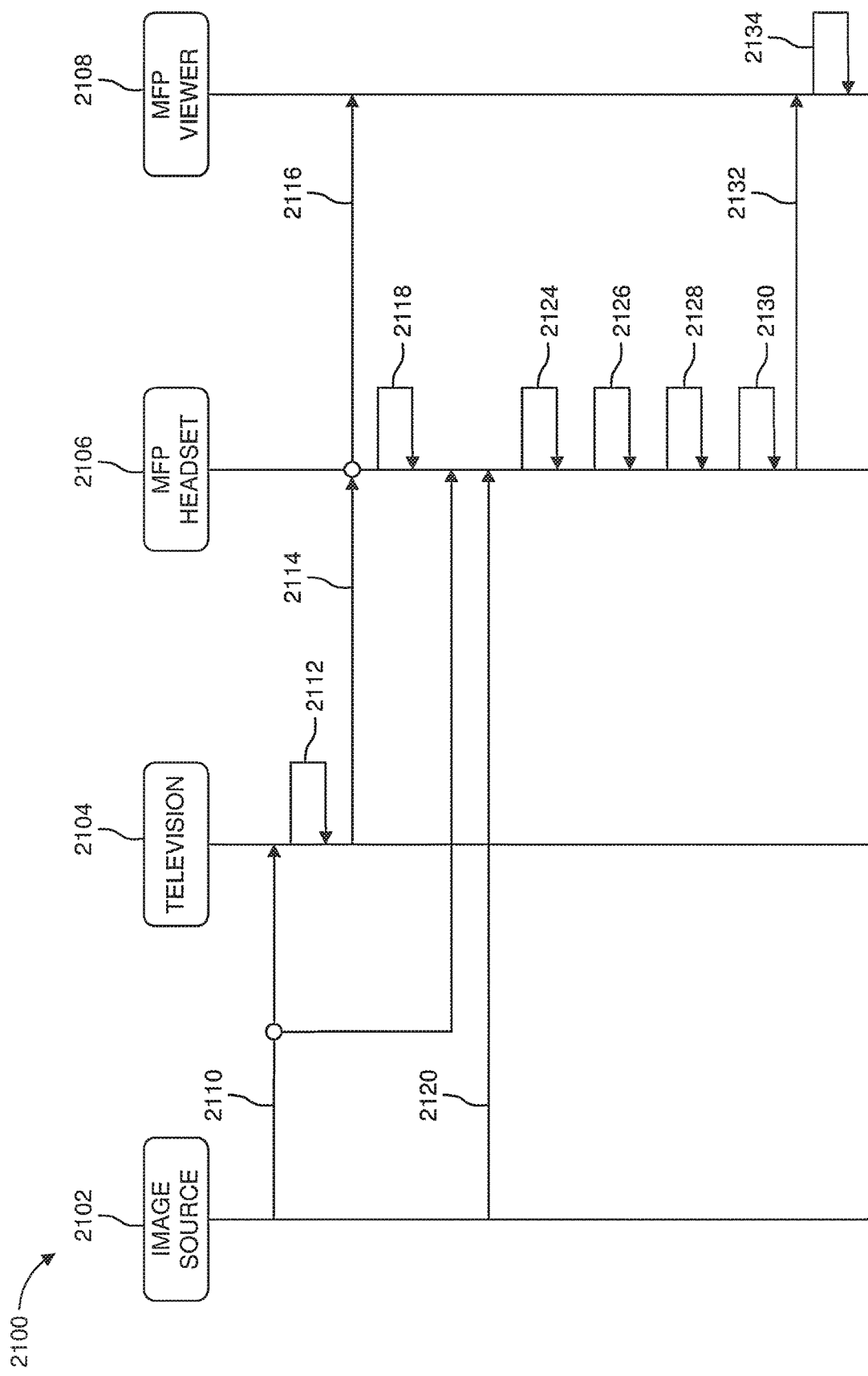
FIG. 21 is a message sequencing diagram illustrating an example MFP generation and displaying process according to some embodiments.

FIG. 21 is a message sequencing diagram illustrating an example MFP generation and displaying process according to some embodiments. For some embodiments of an example process 2100, a 2D video 2110 is sent from an image source 2102 to a television 2104 and to an MFP headset 2106. For some embodiments of the method 2100, the television 2104 displays 2112 the 2D video. For some embodiments of the method 2100, optical see-through (OST) data may be sent 2114 from the television 2104 to the MFP headset 2106. For some embodiments of the method 2100, optical see-through (OST) data may be seen 2116 by the MFP viewer 2108. For some embodiments of the method 2100, the MFP headset 2106 may locate and track 2118 the TV 2104 relative to the MFP headset 2106, for example. For some embodiments of the method 2100, the image source 2102 (or another image source separate from 2102) may send a depth map 2120 to the MFP headset 2106. For some embodiments of the method 2100, the MFP headset 2106 may perform 2124 a high pass filtering of the image data. For some embodiments of the method 2100, the MFP headset 2106 may form 2126 high frequency MFPs by decomposing high frequency image 2124 using a depth map 2120. For some embodiments of the method 2100, the MFP headset 2106 may compute 2128 a low frequency image plane as a complement of the high frequency result 2124, for example. For some embodiments of the method 2100, the MFP headset 2106 may display 2130 one low frequency image plane and N high frequency MFP overlay planes at their assigned focal distances. For some embodiments of the method 2100, the MFP viewer 2108 may see 2132 the MFP overlay planes. For some embodiments of the method 2100, the MFP viewer 2108 may see the sum 2134 of the optical signals. For some embodiments, decomposing 3D video information into a plurality of focal plane images may include: determining a depth of the 3D video information; forming a plurality of 2D weighting planes by processing the depth of the 3D video information with one or more depth-blending functions; and forming the plurality of focal plane images by weighting the 2D video content with the plurality of 2D weighting planes. For some embodiments, high pass filtering of the 2D video content to produce a high pass filtered signal may be performed inside and/or external to the MFP headset 2106. For some embodiments, a weighting plane or a depth weight map may be a 2D weighting plane.

FIG. 22 is a flowchart illustrating an example MFP generation and rendering process according to some embodiments. Some embodiments of an example method 2200 may include identifying 2202, using a camera coupled to the HMD, two-dimensional (2D) content displayed on a screen external to the HMD. Some embodiments of the example method 2200 may further include obtaining 2204 depth information associated with the 2D content. Some embodiments of the example method 2200 may further include generating 2206 a plurality of focal plane images using the depth information, the plurality of focal plane images including depth cues for the 2D content. Some embodiments of the example method 2200 may further include displaying 2208 the plurality of focal plane images as a see-through overlay synchronized with the 2D content. For some embodiments, a see-through overlay, for example, may be a series of one or more images through which a user may see and which are displayed between a base layer image and the user. The see-through overlay, for example, may be pixel data associated with a particular depth away from a user's viewpoint. For example, if a captured image shows a picture of a cone pointing directly at a user's viewpoint, a focal plane image associated with the distance from the user to the top of the cone may show a point indicating the top of the cone. Focal plane images associated with progressively larger distances from the user may show, for example, a progressively increasing series of respective circles. The base layer image may show, for example, the largest circle. The user may see the series of stacked focal plane images and may perceive a cone with a depth projecting directly at the user's viewpoint. For some embodiments, a camera may capture an image of 2D content. For some embodiments, the image may be filtered with a high pass filter to extract high frequency components of the image. Generating the plurality of focal plane images, for example, may include generating the series of focal plane images for the example cone described above. Generating the plurality of focal plane images, for example, may include a process similar to the process for generating high frequency focal plane images PIC1.HF, PIC2.HF, ..., PICN.HF 1110, 1710 shown and described in relation to FIGS. 11 and 17, respectively. For some embodiments, generating the plurality of focal plane images, for example, may include generating low and high frequency focal plane images, such as the focal plane images shown and described in relation to FIGS. 13, 16, and 18. For some embodiments, displaying the plurality of focal plane images may include, for example, a process similar to displaying the focal plane images as shown and described in relation to FIGS. 16, 17, and/or 18. For some embodiments, a device may include a camera, a multi-focal plane display, a processor, and a non-transitory computer-readable medium storing instructions that are operative, when executed by the processor, to perform the method 2200.

For some embodiments, a method may include identifying content present in an image of a real-world scene; retrieving metadata including depth information associated with the content; generating a plurality of focal plane images using the metadata, the plurality of focal plane images including depth cues for the content; and displaying an overlay including the plurality of focal plane images synchronized with the content. For some embodiments, identifying the content may include capturing an image of the content with a camera (which may be attached to an HMD) and identifying the content present in the captured image.

Figure 23:
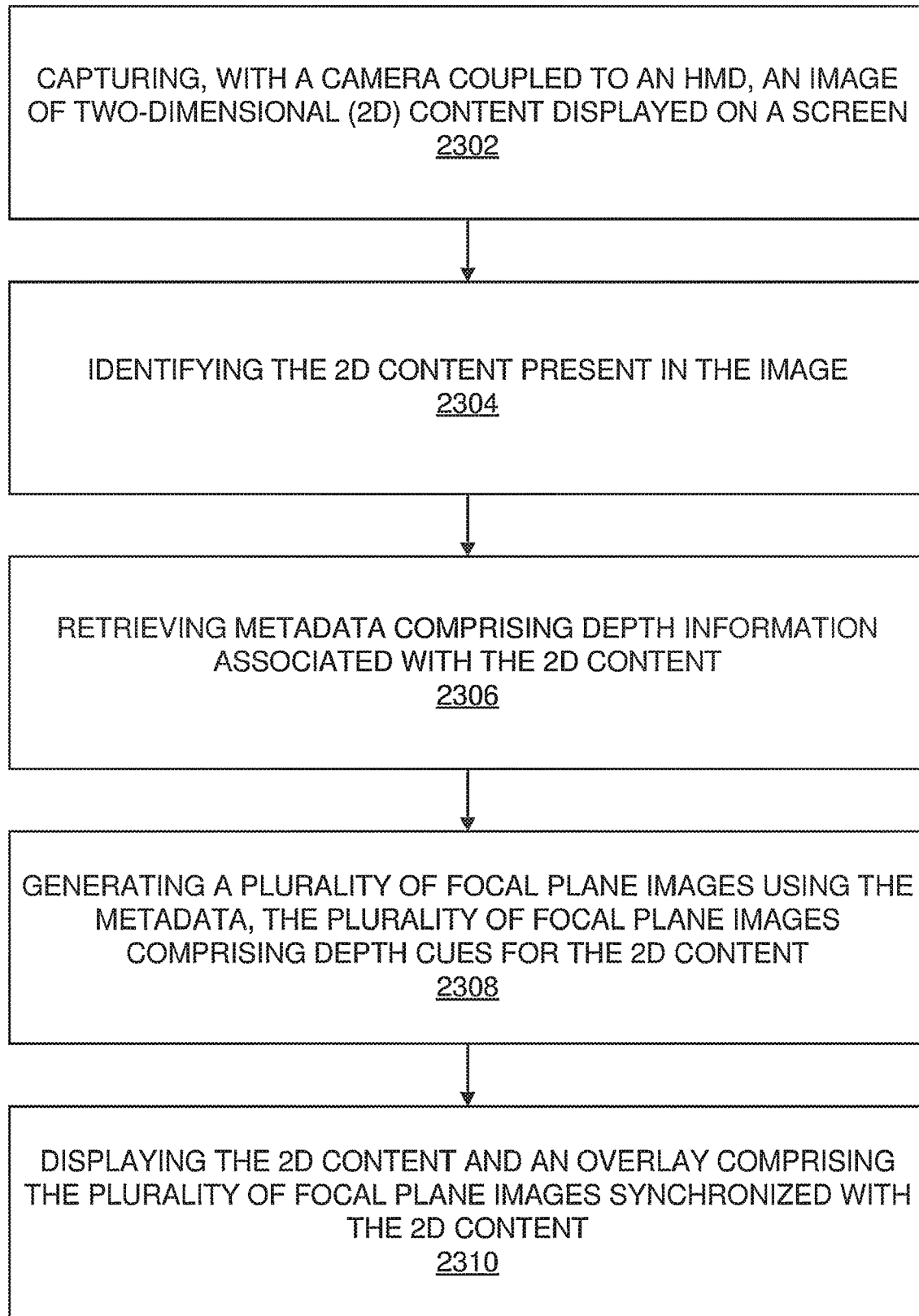
FIG. 23 is a flowchart illustrating another example MFP generation and rendering process according to some embodiments.

FIG. 23 is a flowchart illustrating another example MFP generation and rendering process according to some embodiments. Some embodiments of an example method 2300 may be performed by an HMD and may include capturing 2302, with a camera coupled to the HMD, an image of two-dimensional (2D) content displayed on a screen external to the HMD. Some embodiments of the example method 2300 may further include identifying 2304 the 2D content present in the image. Some embodiments of the example method 2300 may further include retrieving 2306 metadata including depth information associated with the 2D content. Some embodiments of the example method 2300 may further include generating 2308 a plurality of focal plane images using the metadata, the plurality of focal plane images including depth cues for the 2D content. Some embodiments of the example method 2300 may further include displaying 2310 the 2D content and an overlay including the plurality of focal plane images synchronized with the 2D content. For some embodiments, a device may include a camera, a multi-focal plane display, a processor, and a non-transitory computer-readable medium storing instructions that are operative, when executed by the processor, to perform the method 2300. For some embodiments, the device may be an HMD.

FIG. 24 is a flowchart illustrating a further example MFP generation and rendering process according to some embodiments. Some embodiments of an example method 2400 may be performed by an HMD and may include capturing 2402, with a camera coupled to the HMD, a video image of a real-world scene. Some embodiments of the example method 2400 may further include identifying 2404 an image pattern present in the captured video image. Some embodiments of the example method 2400 may further include determining 2406 a depth adjustment associated with the identified image pattern. Some embodiments of the example method 2400 may further include generating 2408 a plurality of focal plane images including depth cues for the identified image pattern, the depth cues reflecting a modified depth of the identified image pattern based on the determined depth adjustment. Some embodiments of the example method 2400 may further include displaying 2410 a 3D representation of the identified image pattern including the plurality of focal plane images. For some embodiments, a device may include a camera, a multi-focal plane display, a processor, and a non-transitory computer-readable medium storing instructions that are operative, when executed by the processor, to perform the method 2400. For some embodiments, the device may be an HMD.

While the methods and systems in accordance with some embodiments are discussed in the context of augmented reality (AR), some embodiments may be applied to mixed reality (MR)/virtual reality (VR) contexts as well. Also, although the term "head mounted display (HMD)" is used herein in accordance with some embodiments, some embodiments may be applied to a wearable device (which may or may not be attached to the head) capable of, e.g., VR, AR, and/or MR for some embodiments.

An example method performed by a head-mounted display (HMD) in accordance with some embodiments may include: identifying, using a camera coupled to the HMD, two-dimensional (2D) content displayed on a screen external to the HMD; obtaining depth information associated with the 2D content; generating a plurality of focal plane images using the depth information, the plurality of focal plane images comprising depth cues for the 2D content; and displaying the plurality of focal plane images as a see-through overlay synchronized with the 2D content.

For some embodiments of the example method, the screen is part of a real-world scene.

For some embodiments of the example method, the depth cues for the 2D content may include information regarding at least one of distance and texture.

For some embodiments of the example method, each of the plurality of focal plane images may include high-spatial-frequency image information for an associated image depth.

For some embodiments of the example method, the high-spatial-frequency image information may include accommodation cues for focusing at varying distances.

In some embodiments, the example method may further include: low-pass-filtering the 2D content; and displaying the low-pass-filtered 2D content, wherein displaying the plurality of focal plane images displays the plurality of focal plane images as an overlay over the low-pass-filtered 2D content.

In some embodiments, the example method may further include capturing the 2D content with the camera.

In some embodiments, the example method may further include identifying a spatial position of the screen, wherein displaying the plurality of focal plane images may include aligning the plurality of focal plane images with the spatial position of the screen.

For some embodiments of the example method, obtaining the depth information may include retrieving metadata that may include the depth information, wherein the metadata may include timing information to enable synchronously aligning the displayed plurality of focal plane images with the 2D content, and wherein displaying the plurality of focal plane images may include synchronously aligning the plurality of focal plane images with the 2D content using the timing information.

For some embodiments of the example method, obtaining the depth information may include retrieving metadata comprising the depth information, wherein the metadata may include three-dimensional (3D) depth information for the 2D content, and wherein the 3D depth information for the 2D content may include a time sequence of depth maps synchronized to the 2D content.

In some embodiments, the example method may further include converting a resolution of the depth maps to match a resolution of the 2D content, wherein the resolution of the depth maps may be different than the resolution of the 2D content.

In some embodiments, the example method may further include detecting an asymmetry of the 2D content displayed on the screen, wherein displaying the plurality of focal plane images may include adjusting the plurality of focal plane images based on the asymmetry of the 2D content.

For some embodiments of the example method, displaying the see-through overlay may enable a user to view the screen via a direct optical path.

An example apparatus in accordance with some embodiments may include: a camera; a multi-focal plane display; a processor; and a non-transitory computer-readable medium storing instructions that are operative, when executed by the processor, to perform any of the methods listed above.

In some embodiments, the example apparatus may further include: an optical lens structure configured to adjust direct optical viewing of the screen; and an optical low-pass filter.

Another example method performed by a head-mounted display (HMD) in accordance with some embodiments may include: detecting, using a camera coupled to the HMD, presence, spatial position, and orientation information relating to 2D video content displayed on a 2D display external to the HMD; receiving 3D video information corresponding to the 2D video content; synchronizing in time the 3D video information with the 2D video content; tracking the spatial position information and orientation information relating to the 2D video content; decomposing the 3D video information into a plurality of focal plane images; filtering one or more of the plurality of focal plane images to remove one or more respective low frequency representations from the plurality of focal plane images; and displaying the filtered focal plane images.

For some embodiments of another example method, filtering one or more of the plurality of focal plane images may include high-pass-filtering at least one of the plurality of focal plane images.

For some embodiments of another example method, decomposing the 3D video information into the plurality of focal plane images may include: determining a depth of the 3D video information; forming a plurality of 2D weighting planes by processing the depth of the 3D video information with one or more depth-blending functions; and forming the plurality of focal plane images by weighting the 2D video content with the plurality of 2D weighting planes.

For some embodiments of another example method, the 3D video information may include depth information.

For some embodiments of another example method, the 3D video information may include 2D texture information.

For some embodiments of another example method, the 3D information may include a plurality of high-frequency focal plane images and positions in a common axial coordinate system of the plurality of high-frequency focal plane images.

For some embodiments of another example method, detecting presence, spatial position, and orientation information relating to 2D video content may include detecting presence, spatial position, and orientation information relating to the 2D display, and tracking the spatial position information and orientation information relating to the 2D video content may include tracking the spatial position information and orientation information relating to the 2D display.

Another example apparatus in accordance with some embodiments may include: a camera; a multi-focal plane display; a processor; and a non-transitory computer-readable medium storing instructions that are operative, when executed by the processor, to perform any of the methods listed above.

A further example method performed by a head-mounted display (HMD) in accordance with some embodiments may include: capturing video data with a camera coupled to a multi-focal plane (MFP) display of the HMD; detecting a viewing angle between the HMD and a two-dimensional (2D) display present within the captured video data, the 2D display being external to the HMD and in a field of view of the video camera; receiving depth data corresponding to the captured video data; forming a plurality of high-frequency focal plane images corresponding to 2D content shown on the 2D display using the depth data; forming one or more low-frequency focal plane images corresponding to the 2D content shown on the 2D display; and rendering, via the MFP display, the plurality of adjusted high-frequency focal plane images and the one or more low-frequency focal plane images.

In some embodiments, the further example method may further include synchronizing the depth data with the 2D content shown on the 2D display.

For some embodiments of the further example method, receiving depth data corresponding to the captured video data further may include receiving the depth data and the captured video data corresponding to the 2D content shown on the 2D display.

For some embodiments of the further example method, adjusting the plurality of high-frequency focal plane images with respect to the viewing angle may include applying a coordinate transformation in real time.

For some embodiments of the further example method, receiving depth data corresponding to the captured video data further may include receiving additional 3D video information comprising texture information corresponding to the 2D content.

For some embodiments of the further example method, receiving depth data corresponding to the captured video data further may include receiving additional 3D video information comprising the plurality of high-frequency focal plane images.

In some embodiments, the further example method may further include forming a stereoscopic stack of two pluralities of high-frequency focal plane images if the plurality of high-frequency focal plane images is a monoscopic stack by shifting the plurality of high-frequency focal plane images into the two pluralities of high-frequency focal plane images to thereby form the stereoscopic stack.

A further example apparatus in accordance with some embodiments may include: a camera; a multi-focal plane display; a processor; and a non-transitory computer-readable medium storing instructions that are operative, when executed by the processor, to perform any of the methods listed above.

For some embodiments of the further example method, the multi-focal plane display is a near-eye multi-focal plane display.

Another further example method performed by a head-mounted display (HMD) in accordance with some embodiments may include: capturing, with a camera coupled to the HMD, an image of two-dimensional (2D) content displayed on a screen external to the HMD; identifying the 2D content present in the image; retrieving metadata comprising depth information associated with the 2D content; generating a plurality of focal plane images using the metadata, the plurality of focal plane images comprising depth cues for the 2D content; and displaying the 2D content and an overlay comprising the plurality of focal plane images synchronized with the 2D content.

Another further example apparatus in accordance with some embodiments may include: a camera; a multi-focal plane display; a processor; and a non-transitory computer-readable medium storing instructions that are operative, when executed by the processor, to perform any of the methods listed above.

An additional example method performed by a head-mounted display (HMD) in accordance with some embodiments may include: capturing, with a camera coupled to the HMD, a video image of a real-world scene; identifying an image pattern present in the captured video image; determining a depth adjustment associated with the identified image pattern; generating a plurality of focal plane images comprising depth cues for the identified image pattern, the depth cues reflecting a modified depth of the identified image pattern based on the determined depth adjustment; and displaying a 3D representation of the identified image pattern comprising the plurality of focal plane images.

An additional example apparatus in accordance with some embodiments may include: a camera; a multi-focal plane display; a processor; and a non-transitory computer-readable medium storing instructions that are operative, when executed by the processor, to perform any of the methods listed above.

A further additional example method performed by a mobile device in accordance with some embodiments may include: identifying, using a camera coupled to the mobile device, content present in an image of a real-world scene; retrieving metadata comprising depth information associated with the content; generating a plurality of focal plane images using the metadata, the plurality of focal plane images comprising depth cues for the content; and displaying an overlay comprising the plurality of focal plane images synchronized with the content.

For some embodiments of the further additional example method, the image of the real-world scene may include an image of content displayed on a screen external to the mobile device, and the overlay may include a see-through overlay.

In some embodiments, the further additional example method may further include capturing the content with the camera.

For some embodiments of the further additional example method, displaying the overlay enables a user to view the screen via a direct optical path.

In some embodiments, the further additional example method may further include: capturing, with the camera coupled to the mobile device, the image of the real-world scene; and displaying the content, wherein the image of the real-world scene may include an image of content displayed on a screen external to the mobile device.

In some embodiments, the further additional example method may further include identifying a spatial position of the screen, wherein displaying the overlay may include aligning the plurality of focal plane images to align with the spatial position of the screen.

In some embodiments, the further additional example method may further include detecting an asymmetry of the content displayed on the screen, wherein displaying the overlay may include adjusting the plurality of focal plane images based on the asymmetry of the content.

In some embodiments, the further additional example method may further include: determining an original depth field for the real-world scene; and adjusting, based on the metadata, a portion of the original depth field corresponding to the identified content to produce an adjusted depth field, the identified content corresponding to an image pattern recognized in the image, wherein the plurality of focal plane images are generated using the adjusted depth field.

For some embodiments of the further additional example method, generating the plurality of focal plane images creates a three-dimensional depth effect.

For some embodiments of the further additional example method, each of the plurality of focal plane images may include high-spatial-frequency image information for an associated image depth.

For some embodiments of the further additional example method, the high-spatial-frequency image information may include accommodation cues for focusing at varying distances.

In some embodiments, the further additional example method may further include: low-pass-filtering the content; and displaying the low-pass-filtered content, wherein displaying the plurality of focal plane images displays the plurality of focal plane images as an overlay over the low-pass-filtered content.

For some embodiments of the further additional example method, the metadata may include timing information to enable synchronously aligning the displayed plurality of focal plane images with the content, and displaying the overlay may include synchronously aligning the plurality of focal plane images with the content using the timing information.

For some embodiments of the further additional example method, the metadata may include three-dimensional (3D) depth information for the content, and the 3D depth information for the content may include a time sequence of 2D depth maps synchronized to the content.

For some embodiments of the further additional example method, the depth maps have a different resolution than the content.

For some embodiments of the further additional example method, the mobile device may include a hand-held multiple focal plane-enabled mobile phone.

For some embodiments of the further additional example method, the mobile device may include a head-mounted display.

A further additional example apparatus in accordance with some embodiments may include: a camera; a multi-focal plane display; a processor; and a non-transitory computer-readable medium storing instructions that are operative, when executed by the processor, to perform any of the methods listed above.

In some embodiments, the further additional example apparatus may further include: one or more optical lenses configured to adjust direct optical viewing of a screen external to the apparatus; and an optical low-pass filter.

For some embodiments of the further additional example apparatus, the apparatus may be a hand-held multiple focal plane-enabled mobile device.

For some embodiments of the further additional example apparatus, the apparatus may be a head-mounted display that may include the multi-focal plane display.

An example method for enhancing two-dimensional (2D) content on a 2D display by a multi-focal plane (MFP) representation in accordance with some embodiments may include: capturing the 2D content from the 2D display with a camera on a wearable display device; identifying the 2D content; receiving, via a network connection, metadata based on the identification, the metadata associated with the identified 2D content and including three-dimensional (3D)

depth information for the 2D content; producing a plurality of focal planes based on one or more frames of the 2D content by applying the metadata to process the 2D content; and rendering the plurality of focal planes as the MFP representation on the wearable display device.

For some embodiments, the example method may include identifying a location of the 2D display; and aligning the rendered plurality of focal planes to coincide with the location.

For some embodiments, the metadata may include timing information to enable time synchronization of the rendered plurality of focal planes.

For some embodiments, the metadata may be received in response to a request to a remote server, the request including an identifier associated with the 2D content.

For some embodiments, the three-dimensional (3D) depth information for the 2D content may include a time sequence of depth maps synchronized to the 2D content.

For some embodiments, the depth maps of the time sequence of depth maps may be of a different resolution than the 2D content.

For some embodiments, the camera on the wearable display device may include a high-speed camera configured to capture MFP display information to detect asymmetry in the plurality of focal planes.

Another example method for avoiding vergence accommodation conflict (VAC) and enhancing the view of a two-dimensional (2D) display to provide an enhanced three-dimensional (3D) image when viewed through an optical see-through (OST) multi-focal plane (MFP) display in accordance with some embodiments may include: detecting presence, location, and orientation information of the 2D display and 2D video content via a camera coupled to the OST MFP display; receiving 3D video information at the OST MFP display, the 3D video information corresponding to the 2D video content; synchronizing the 3D video information with the 2D video content with respect to time; tracking the location and orientation information of the 2D display, the tracking enabling an alignment of one or more image overlays; decomposing the 3D video signal into a plurality of image planes via one or more depth-blending functions; filtering one or more of the plurality of image planes to remove one or more low frequency representations of the plurality of images; and displaying the filtered plurality of image planes through the MFP display.

For some embodiments, the filtering the one or more of the plurality of image planes may include applying a high-pass filter to each image plane of the plurality of image planes.

For some embodiments, the method may include capturing 2D video information and a corresponding depth map of a 3D view (for example a real-world view), denoted here together as 3D video information; forming a plurality of weighting planes using the depth of the 3D view; and using the weighting planes to form a plurality of depth blended focal planes representing (approximating) the 3D view.

For some embodiments, the 3D video information may include depth information.

For some embodiments, the 3D video information may include depth information and 2D texture information.

For some embodiments, the 3D information may include a stack of high-frequency MFP images.

A further example method in accordance with some embodiments may include: capturing video data with a camera coupled to the MFP display; detecting a viewing angle with respect to a two-dimensional (2D) display within the captured video data; receiving depth data corresponding to the captured video data; forming a plurality of high frequency focal planes corresponding to content shown on the 2D display; adjusting the high frequency focal planes with respect to the viewing angle; and rendering one or more low frequency focal planes and the adjusted high frequency focal planes via the MFP display.

For some embodiments, the further example method may include synchronizing the captured video data with the content shown on the 2D display.

For some embodiments, receiving depth data corresponding to the captured video data may further include receiving, over a network, the depth data and video data corresponding to the content shown on the 2D display and captured by the camera, the 2D display being a television.

For some embodiments, adjusting the high frequency focal planes with respect to the viewing angle may include applying a transformation in real time.

For some embodiments, receiving depth data corresponding to the captured video data may further include receiving additional 3D video information over a network including 2D texture information.

For some embodiments, receiving depth data corresponding to the captured video data may further include receiving additional 3D video information over a network including a stack of high-frequency MFP images.

For some embodiments, the further example method may include processing a monoscopic stack of high-frequency MFP images to form a stereoscopic MFP stack (i.e. two MFP stacks) by shifting the monoscopic stack of high-frequency MFP images.

For some embodiments, the MFP display may be a near-eye MFP display.

An example apparatus in accordance with some embodiments may include a processor and memory for implementing one or more of the methods listed above in accordance with some embodiments.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method for enhancing the depth of real-world image content in a user's view, comprising:
    obtaining metadata, wherein the metadata comprises:
        a list of objects or image patterns to be depth-enhanced;
        information for identifying the objects or image patterns from real-world imagery; and
        specification of how to adjust the depth of each identified object or image pattern;
    capturing real world imagery using a camera, the real-world imagery having associated depth information;
    identifying, based on the metadata, an object or image pattern in the real world imagery;
    modifying the depth information in an area associated with the identified object or image pattern according to the specification of how to adjust the depth of the identified object or image pattern; and
    displaying a three-dimensional (3D) view of the real-world imagery to a user using the modified depth information.

2. The method of claim 1, wherein the camera is a depth camera and the real-world imagery and the associated depth information are captured using the depth camera.

3. The method of claim 1, further comprising:
    capturing stereo images of the real-world imagery; and
    generating the associated depth information using a depth from stereo analysis of the stereo images.

4. The method of claim 1, wherein the specification of how to adjust the depth comprises an offset to add to the depth information of the identified object or image pattern.

5. The method of claim 1, wherein the specification of how to adjust the depth comprises a function for modifying or adjusting the depth information of the identified object or image pattern.

6. The method of claim 1, wherein identifying the object or image pattern in the real-world imagery makes use of one of an object recognition algorithm and a pattern recognition algorithm.

7. The method of claim 1, wherein obtaining metadata comprises retrieving the metadata from a server.

8. The method of claim 1, further comprising:
    generating a plurality of focal plane images based on the real-world imagery and the modified depth information, the plurality of focal plane images comprising depth cues for the identified object or image pattern; and
    displaying a 3D representation of the plurality of focal plane images to the user using a multi-focal plane display.

9. The method of claim 8, wherein the 3D representation is displayed to the user in an optical see-through configuration.

10. The method of claim 8, wherein the 3D representation is displayed to the user in a video see-through configuration.

11. An apparatus comprising:
    a processor; and
    a memory storing instructions that are operative, when executed by the processor, to cause the apparatus to:
        obtain metadata, wherein the metadata comprises:
            a list of objects or image patterns to be depth-enhanced;
            information for identifying the objects or image patterns from real-world imagery; and
            specification of how to adjust the depth of each identified object or image pattern;
        capture real world imagery using a camera, the real-world imagery having associated depth information;
        identify, based on the metadata, an object or image pattern in the real world imagery;
        modify the depth information in an area associated with the identified object or image pattern according to the specification of how to adjust the depth of the identified object or image pattern; and
        display a three-dimensional (3D) view of the real-world imagery to a user using the modified depth information.

12. The apparatus of claim 11, further comprising the camera.

13. The apparatus of claim 11, further comprising a multi-focal plane display.

14. The apparatus of claim 11, wherein the apparatus is a head-mounted device (HMD).

15. The apparatus of claim 11, wherein the apparatus is a mobile device.

16. A method for enhancing the depth of real-world image content in a user's view, comprising:
    capturing real world imagery using a camera, the real-world imagery having associated depth information;
    identifying an object or image pattern in the real-world imagery;
    obtaining metadata comprising depth adjustment information for the identified object or image pattern, the depth adjustment information specifying a function for adjusting the depth information associated with the identified object or image pattern;
    modifying the depth information associated with the identified object or image pattern in accordance with the metadata; and
    displaying a three-dimensional (3D) view of the real-world imagery to a user using the modified depth information.

17. The method of claim 16, wherein the function for adjusting the depth information specifies a depth offset.

18. The method of claim 16, wherein obtaining the metadata comprises retrieving the metadata from a server.

* * * * *